(12) United States Patent
Suzuki

(10) Patent No.: US 6,961,518 B2
(45) Date of Patent: Nov. 1, 2005

(54) STROBE LIGHT EMITTING APPARATUS AND CAMERA

(75) Inventor: Takashi Suzuki, Hino (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 11/031,384

(22) Filed: Jan. 7, 2005

(65) Prior Publication Data

US 2005/0135797 A1 Jun. 23, 2005

Related U.S. Application Data

(62) Division of application No. 10/449,524, filed on May 30, 2003, now Pat. No. 6,892,029.

(30) Foreign Application Priority Data

| Jun. 6, 2002 | (JP) | 2002-165724 |
| Jun. 20, 2002 | (JP) | 2002-180136 |
| Jun. 27, 2002 | (JP) | 2002-188366 |
| Jul. 1, 2002 | (JP) | 2002-192449 |
| Jul. 12, 2002 | (JP) | 2002-204365 |
| Jul. 12, 2002 | (JP) | 2002-204367 |

(51) Int. Cl.$^7$ .......................... G03B 15/03; G03B 17/00
(52) U.S. Cl. ......................................... 396/52; 396/155
(58) Field of Search ........................... 396/52–55, 155; 348/208.12, 208.15

(56) References Cited

U.S. PATENT DOCUMENTS

| 4,941,070 A | | 7/1990 | Ogawa et al. | |
| 5,239,334 A | * | 8/1993 | Matsushima | 396/52 |
| 6,035,132 A | * | 3/2000 | Washisu et al. | 396/55 |
| 6,101,332 A | * | 8/2000 | Satoh | 396/52 |
| 6,122,447 A | * | 9/2000 | Washisu | 396/55 |
| 6,625,396 B2 | * | 9/2003 | Sato | 396/52 |

FOREIGN PATENT DOCUMENTS

| JP | 55-084925 B2 | 6/1980 |
| JP | 55-106444 B2 | 8/1980 |
| JP | 63-048537 A | 3/1988 |

* cited by examiner

Primary Examiner—W. B. Perkey
(74) Attorney, Agent, or Firm—Frishauf, Holtz, Goodman & Chick, P.C.

(57) ABSTRACT

A camera having a camera-blur warning function which is adapted to switch between executing a camera-blur detecting mode and stopping the camera-blur detecting mode by the setting of a camera strobe mode. In a photographing scene where occurrence of a camera-blur is on a user's mind, a camera-blur detecting mode is set, thereby to detect vibration. In case any camera-blur occurs, warning is made so that the user may recognize it. Furthermore, at the time of determining holding, a conventional optical sensor which is already mounted as a sensor for measuring distance is utilized for determining the camera-blur.

4 Claims, 51 Drawing Sheets

FIG.26A  $V_{SW}$
FIG.26B  $ST_1$
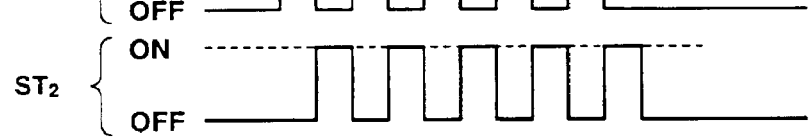
FIG.26C  $ST_2$
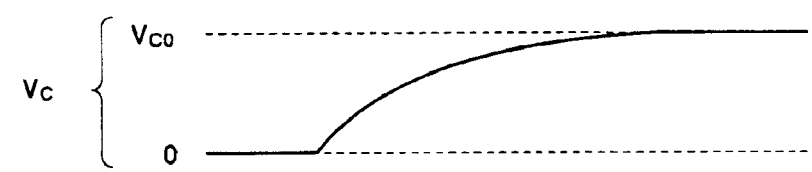
FIG.26D  $V_C$

FIG.27A $V_{SW}$ {ON/OFF}

FIG.27B $ST_1$ {ON/OFF}

FIG.27C $ST_2$ {ON/OFF}

FIG.27D $V_{IG}$ {ON/OFF}

FIG.27E $I_{xe}$

FIG.27F SHUTTER OPENING WAVEFORM {OPEN/SHUT}

FIG.27G RELEASE SWITCH {ON/OFF}

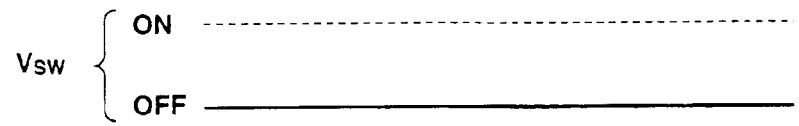
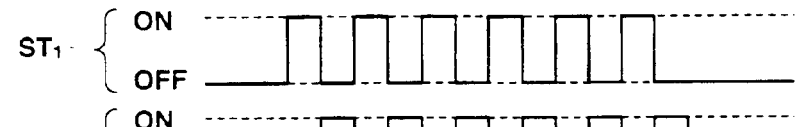
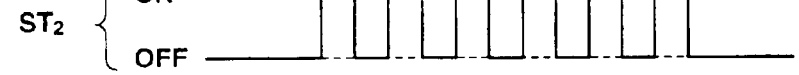
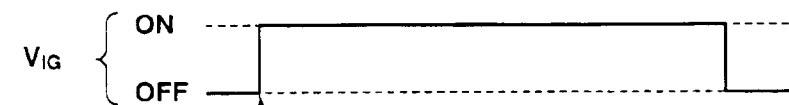
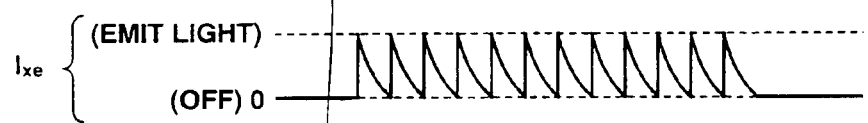
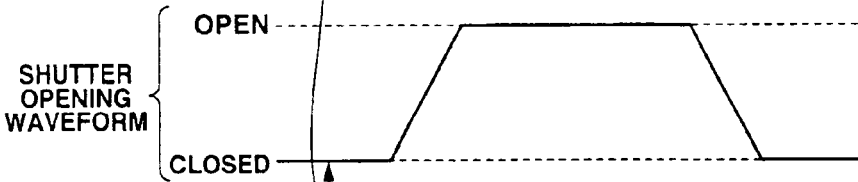
FIG. 28A $V_{SW}$
FIG. 28B $ST_1$
FIG. 28C $ST_2$
FIG. 28D $V_{IG}$
FIG. 28E $I_{xe}$
FIG. 28F SHUTTER OPENING WAVEFORM
FIG. 28G RELEASE SWITCH

FIG.35F Xe TUBE

FIG.35G SHUTTER OPENING WAVEFORM

FIG.35H RELEASE SWITCH

→ ELAPSED TIME

FIG. 46A TERMINAL 460 OUTPUT 
FIG. 46B TERMINAL 450 OUTPUT 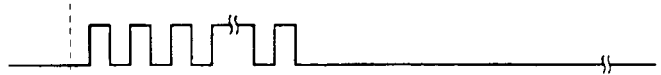
FIG. 46C TERMINAL 440 OUTPUT 
FIG. 46D TERMINAL 470 OUTPUT 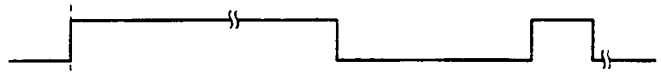
FIG. 46E Ixe 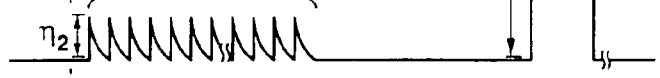
FIG. 46F 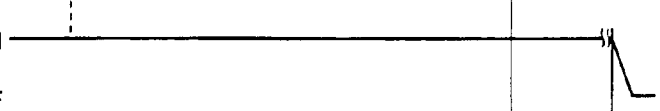

FIG.47A  RELEASE
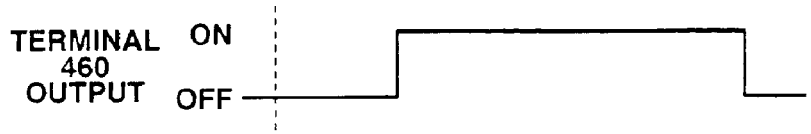
FIG.47B  TERMINAL 460 OUTPUT
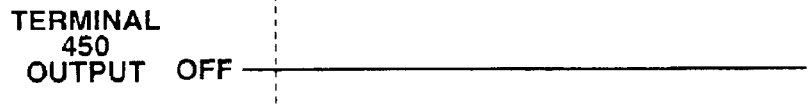
FIG.47C  TERMINAL 450 OUTPUT
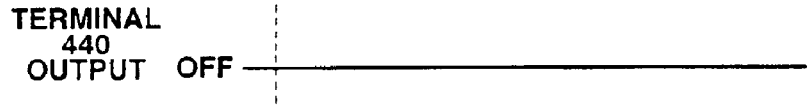
FIG.47D  TERMINAL 440 OUTPUT
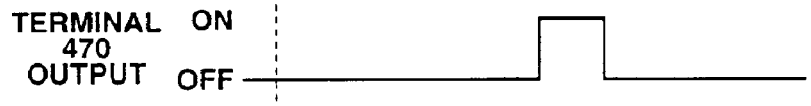
FIG.47E  TERMINAL 470 OUTPUT
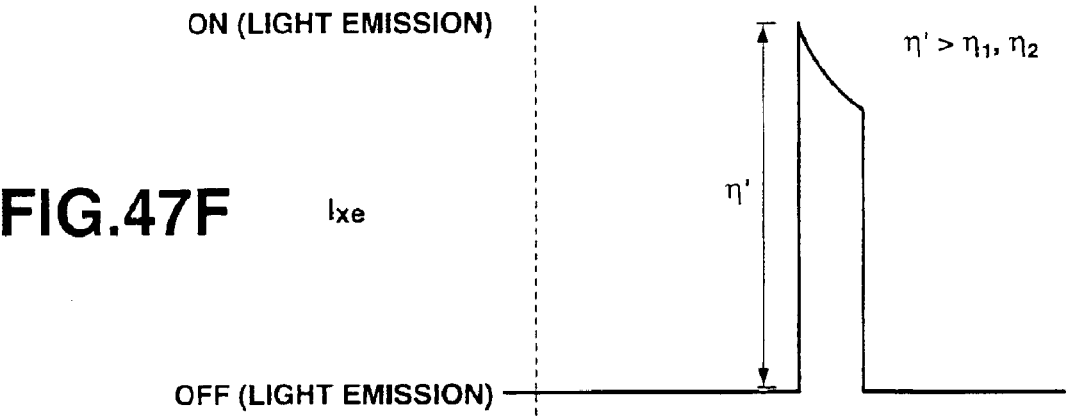
FIG.47F  Ixe   $\eta' > \eta_1, \eta_2$
FIG.47G  SHUTTER

FIG.53A RELEASE
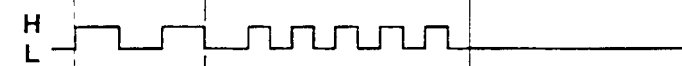
FIG.53B ST₁
FIG.53C ST₂
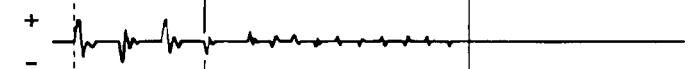
FIG.53D V564b
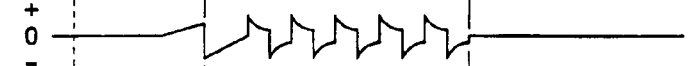
FIG.53E I$_{xe}$
EMITTING LIGHT
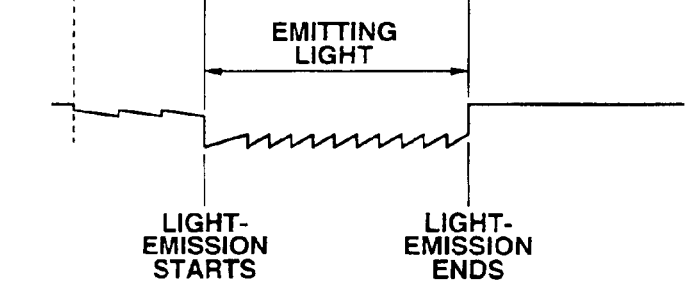
FIG.53F V$_B$
LIGHT-EMISSION STARTS     LIGHT-EMISSION ENDS

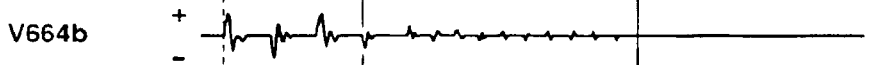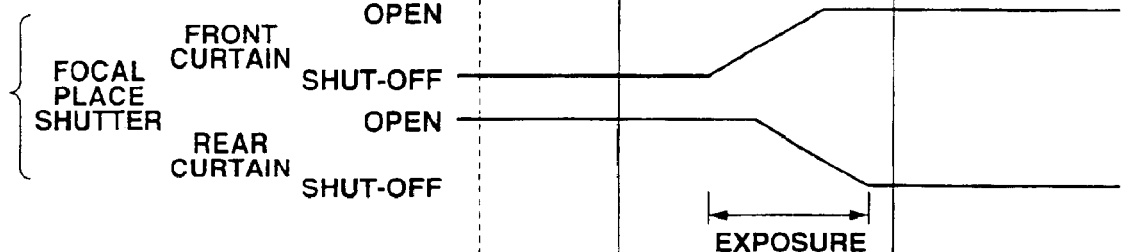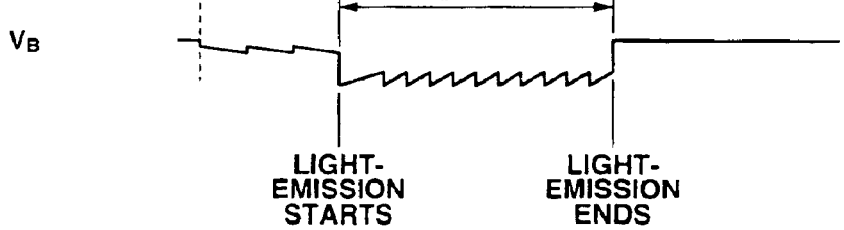

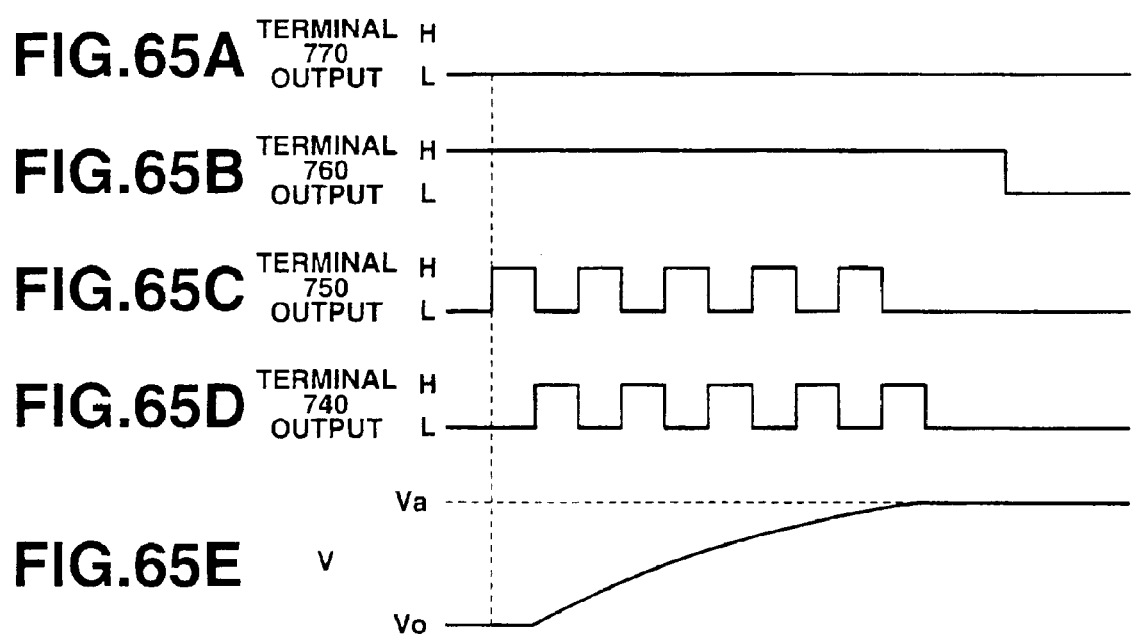

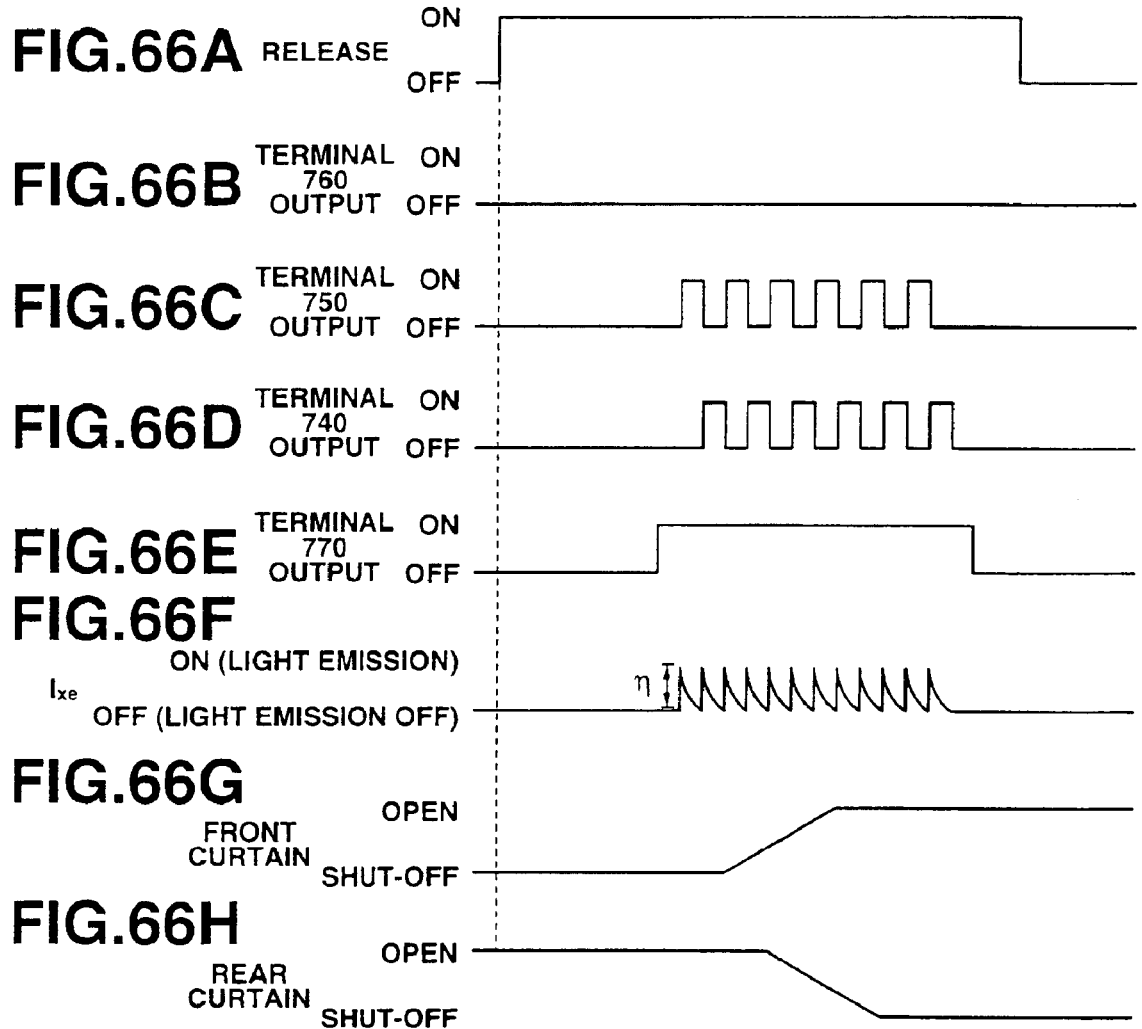

FIG.67A  RELEASE
FIG.67B  TERMINAL 760 OUTPUT
FIG.67C  TERMINAL 750 OUTPUT
FIG.67D  TERMINAL 740 OUTPUT
FIG.67E  TERMINAL 770 OUTPUT
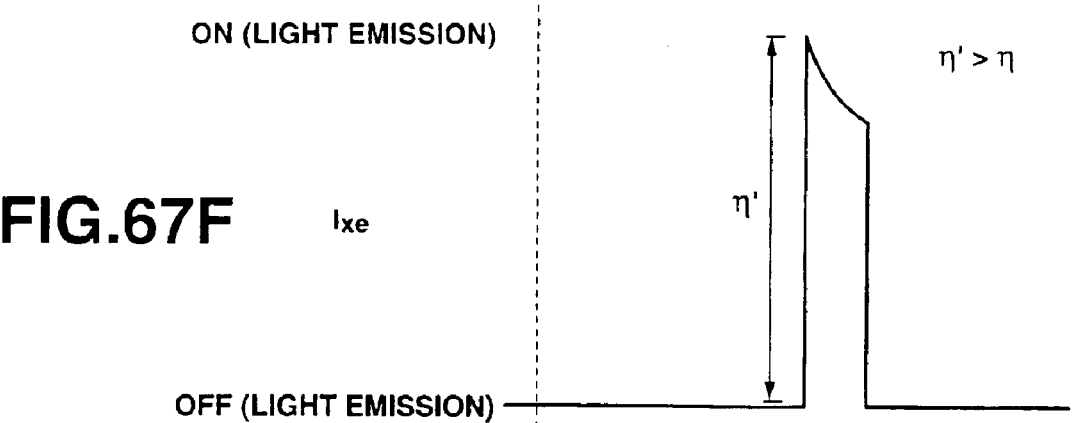
FIG.67F  Ixe
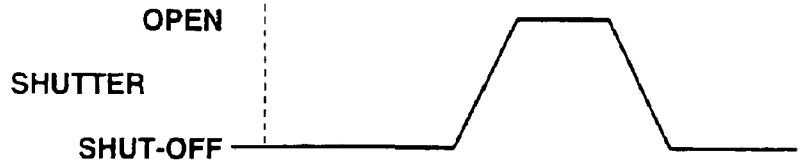
FIG.67G  SHUTTER

STROBE LIGHT EMITTING APPARATUS AND CAMERA

CROSS-REFERENCE TO RELATED APPLICATIONS

The present application is a Divisional application of U.S. application Ser. No. 10/449,524, filed May 30, 2003, now U.S. Pat. No. 6,892,029 which claims the priority of Japanese Applications No. 2002-165724 filed in Japan on Jun. 6, 2002, No. 2002-180136 filed in Japan on Jun. 20, 2002, No. 2002-188366 filed in Japan on Jun. 27, 2002, No. 2002-192449 filed in Japan on Jul. 1, 2002, No. 2002-204365 filed in Japan on Jul. 12, 2002 and No. 2002-204367 filed in Japan on Jul. 12, 2002, the entire contents of which are incorporated herein by reference.

BACKGROUND OF THE INVENTION

1. Field of the Invention

The present invention relates to a strobe light emitting apparatus (strobe apparatus) for emitting light by using a strobe light emitting discharge tube, a light system construction of a strobe light emitting apparatus, a light emitting circuit for a strobe light emitting apparatus and a camera having a camera blur preventing function.

2. Related Art Statement

Conventionally, in a strobe apparatus (strobe light emitting apparatus) using a parabolic reflection umbrella of a camera including a digital camera, trigger voltage may be applied to a discharge tube by causing an elastic material to touch the head of a midget-lamp shaped discharge tube as disclosed in Japanese Unexamined Patent Application Publication No. 63-48537.

When a shooting person generally shoots by holding a camera, a camera blur may occur during the exposure, which results in a mistake photograph. In order to prevent camera blurs, various kinds of blur-preventing technologies have been reviewed. The blur-preventing technologies can be divided into two groups of vibration detection and solutions against detected vibrations. The solutions against detected vibrations can be categorized into a warning technology for causing users to recognize a blur state and a technology for preventing the image deterioration due to camera blurs by driving and controlling a shooting lens.

Among them, a technology for warning blurs when a blur amount detected by a blur detecting unit using an optical sensor exceeds a set value (acceptable shift amount) depending of the shutter speed is disclosed in Japanese Examined Patent Application Publication No. 62-027686. Also, a warning apparatus for comparing a signal detected by a vibration detector using an acceleration meter and a reference signal for identifying vibration in accordance with the set shutter speed and for warning after shooting is disclosed in Japanese Patent Examined Patent Application Publication no. 62-037771.

In a conventional camera strobe apparatus, a main capacitor is applied for storing discharged charges, and strobe light is emitted by discharging the charges (energy) charged in the main capacitor to a xenon tube.

For example, a cassette installing room and a spool room are provided on the side of the lens barrel within a conventional camera containing the strobe light emitting apparatus. A strobe light emitting capacitor is provided on the exterior of the cassette installing room. A strobe window is provided above the spool room and a strobe light emitting unit and a power source battery are provided at the back of the strobe window.

The strobe light emitting unit has a Xe (xenon) tube and a reflection umbrella. The discharging electrode of the Xe$^-$ tube is spaced apart by a predetermined distance L1.

As is generally known, an AF camera having a conventional AF distance measuring function cannot measure a distance when an object is dark. Therefore, auxiliary light for AF distance measurement is irradiated from the camera side to the object and the light reflected from the object is used for distance measurement. Then, the AF function can operate even when the object is dark. On the other hand, a camera having a light emitting function for minimizing red-eye has been generally known. By using the light emitting function for minimizing red-eye, irises of eyes of an object such as a human being and/or animal are closed (miosis) by irradiating light with low intensity from the strobe apparatus to the object in advance.

Furthermore, as is generally known, when a camera having a conventional focal plane shutter uses a strobe apparatus, and when a exposure time for shooting is faster than a strobe tuning time of the place shutter, a small amount of energy stored in the capacitor may be intermittently discharged. Thus, the light of the Xe tube (xenon discharging tube) is emitted for a certain period of time continuously to irradiate an object. That is, a so-called flat light emission is used.

SUMMARY OF THE INVENTION

According to one aspect of the invention, there is provided a strobe apparatus, including a strobe light emitting discharge tube having a discharge light emitting portion and a terminal portion, and a reflection umbrella for reflecting light emitted from the strobe light emitting discharge tube into a predetermined direction, wherein the strobe light emitting discharge tube includes a transparent electrode from the discharge light emitting portion to the terminal portion, and trigger voltage is applied to the strobe light emitting discharge tube through the transparent electrode.

According to another aspect of the inventions, there is provided a camera, including a vibration detecting portion for detecting a vibration state of the camera, a first operating member for setting a camera mode to a vibration detecting mode for operating the vibration detecting portion, a second operating member for setting a strobe light emitting mode of the camera, and a control portion for controlling the implementation and termination of the operation of the vibration detecting portion in accordance with the type of the strobe light emitting mode set by the second operating member when the vibration detecting mode is set.

According to another aspect of the invention, there is provided a strobe apparatus, including a single discharge tube, a first light emitting portion for causing the discharge tube to emit light, a second light emitting portion for causing the discharge tube to emit light, and a control portion for controlling the first light emitting portion to cause light emission in shooting where an amount of light required for exposure exceeds a predetermined value and for controlling the second light emitting portion to cause light emission in shooting where an amount of light required for exposure is equal to or below the predetermined value.

According to another aspect of the invention, there is provided a discharge light emitting apparatus, including a power source, a transformer having an iron core, a primary winding wound about the iron core and connected to the power source, a first secondary winding wound about the iron core, and a second secondary winding wound about the iron core and is connected to the first secondary winding in series, a light emitting discharge tube having a discharging electrode and a trigger electrode, both ends of the first secondary winding connected to the discharging electrode and one end of the second secondary winding connected to the trigger electrode, a switching element provided between the power source and the primary winding, and a control portion for turning on/off the switching element.

According to another aspect of the invention, there is provided a strobe apparatus, including a discharge tube for emitting strobe light for illuminating an object, a first light emitting portion for causing the discharge tube to emit light by using energy stored in a main capacitor, a second light emitting portion for causing the discharge tube to emit light by using a battery without the main capacitor, and a control portion for causing the discharge tube to emit light through the first light emitting portion in shooting and for causing the discharge tube to emit light through the second light emitting portion before shooting.

According to another aspect of the invention, there is provided a camera, including a focal plane shutter, a discharge tube for emitting strobe light for illuminating an object, a first light emitting portion for causing the discharge tube to emit light by using energy stored in a main capacitor, a second light emitting portion for causing the discharge tube to emit light for plurality of times by using a battery without the main capacitor, and a control portion for causing the discharge tube to emit light through the first light emitting portion when the exposure time in second for shooting is longer than the flash synchronization time in second of the focal plane shutter and for causing the discharge tube to emit light through the second light emitting portion when the exposure time in second for shooting is shorter than the flash synchronization time in second of the focal plane shutter.

According to another aspect of the invention, there is provided a strobe apparatus for a camera having a focal plane shutter, the strobe apparatus including a discharge tube for emitting strobe light for illuminating an object, a first light emitting portion for causing the discharge tube to emit light, a second light emitting portion for causing the discharge tube to emit light, and a control portion for causing light emission through the first light emitting portion when the exposure time in second for shooting is longer than the flash synchronization time in second of the focal plane shutter and for causing light emission through the second light emitting portion when the exposure time in second for shooting is shorter than the flash synchronization time in second of the focal plane shutter.

The other characteristics and advantages of the present invention will be apparent from the description below.

BRIEF OF DESCRIPTION OF THE DRAWINGS

FIG. 26A is a time chart of an output waveform of a V-SW output terminal of a control circuit portion in charging to a light-emission main capacitor in the strobe apparatus in FIG. 25;

FIG. 26B is a time chart of an output waveform of an ST-1 output terminal of a control circuit portion in charging to a light-emission main capacitor in the strobe apparatus in FIG. 25;

FIG. 26C is a time chart of an output waveform of an ST-2 output terminal of a control circuit portion in charging to a light-emission main capacitor in the strobe apparatus in FIG. 25;

FIG. 26D is a time chart of charging voltage Vc in charging to a light-emission main capacitor in the strobe apparatus in FIG. 25;

FIG. 27A is a time chart of an output waveform of an V-SW output terminal of a control circuit portion during an operation for emitting a large amount of light in the strobe apparatus in FIG. 25;

FIG. 27B is a time chart of an output waveform of an ST-1 output terminal of the control circuit portion during an operation for emitting a large amount of light in the strobe apparatus in FIG. 25;

FIG. 27C is a time chart of an output waveform of an ST-2 output terminal of the control circuit portion during an operation for emitting a large amount of light in the strobe apparatus in FIG. 25;

FIG. 27D is a time chart of an output waveform of an V-IG output terminal of the control circuit portion during an operation for emitting a large amount of light in the strobe apparatus in FIG. 25;

FIG. 27E is a time chart of light emitting current I-xe during an operation for emitting a large amount of light in the strobe apparatus in FIG. 25;

FIG. 27F is a time chart of a shutter opening waveform during an operation for emitting a large amount of light in a camera containing the strobe apparatus in FIG. 25;

FIG. 27G is a time chart of a release switch signal during an operation for emitting a large amount of light in the strobe apparatus in FIG. 25;

FIG. 28A is a time chart of an output waveform of an V-SW output terminal of a control circuit portion during an operation for emitting a small amount of light in the strobe apparatus in FIG. 25;

FIG. 28B is a time chart of an output waveform of an ST-1 output terminal of the control circuit portion during an operation for emitting a small amount of light in the strobe apparatus in FIG. 25;

FIG. 28C is a time chart of an output waveform of an ST-2 output terminal of the control circuit portion during an operation for emitting a small amount of light in the strobe apparatus in FIG. 25;

FIG. 28D is a time chart of an output waveform of an V-IG output terminal of the control circuit portion during an operation for emitting a small amount of light in the strobe apparatus in FIG. 25;

FIG. 28E is a time chart of light emitting current I-xe during an operation for emitting a small amount of light in the strobe apparatus in FIG. 25;

FIG. 28F is a time chart of a shutter opening waveform during an operation for emitting a small amount of light in a camera containing the strobe apparatus in FIG. 25;

FIG. 28G is a time chart of a release switch signal during an operation for emitting a small amount of light in the strobe apparatus in FIG. 25;

FIG. 35A is a time chart of an output waveform of an ST-1 output terminal of a control circuit portion in the strobe apparatus of the camera in FIG. 31;

FIG. 35B is a time chart of an output waveform of an ST-2 output terminal of the control circuit portion in the strobe apparatus of the camera in FIG. 31;

FIG. 35C is a time chart of trigger voltage V-tr of the control circuit portion in the strobe apparatus of the camera in FIG. 31;

FIG. 35D is a time chart of light emitting current I-xe in the strobe apparatus of the camera in FIG. 31;

FIG. 35E is a time chart of an output waveform of a VB detecting terminal for power source voltage in the strobe apparatus of the camera in FIG. 31;

FIG. 35F is a time chart showing ON/OFF states of an Xe tube in the strobe apparatus of the camera in FIG. 31;

FIG. 35G is a time chart of a shutter opening waveform in the camera in FIG. 31;

FIG. 35H is a time chart of a release switch signal in the camera in FIG. 31;

FIG. 46A is a time chart showing an output waveform of the output terminal 460 of the control circuit in the light emitting circuit in order to emit red-eye reducing light by using the light emitting circuit in FIG. 41;

FIG. 46B is a time chart showing an output waveform of the output terminal 450 of the control circuit in the light emitting circuit in order to emit red-eye reducing light by using the light emitting circuit in FIG. 41;

FIG. 46C is a time chart showing an output waveform of the output terminal 440 of the control circuit in the light emitting circuit in order to emit red-eye reducing light by using the light emitting circuit in FIG. 41;

FIG. 46D is a time chart showing an output waveform of the output terminal 470 of the control circuit in the light emitting circuit in order to emit red-eye reducing light by using the light emitting circuit in FIG. 41;

FIG. 46E is a time chart of light emitting current I-xe in the light emitting circuit in order to emit red-eye reducing light by using the light emitting circuit in FIG. 41;

FIG. 46F is a time chart showing a shutter driving waveform in order to emit red-eye reducing light by a camera containing the strobe apparatus in FIG. 41;

FIG. 47A is a time chart of a release switch signal for a camera containing the strobe apparatus in FIG. 41;

FIG. 47B is a time chart showing an output waveform of the output terminal 460 of the control circuit in the light emitting circuit during an actual light-emitting operation in the light emitting circuit shown in FIG. 41;

FIG. 47C is a time chart showing an output waveform of the output terminal 450 of the control circuit in the light emitting circuit during an actual light-emitting operation in the light emitting circuit shown in FIG. 41;

FIG. 47D is a time chart showing an output waveform of the output terminal 440 of the control circuit in the light emitting circuit during an actual light-emitting operation in the light emitting circuit shown in FIG. 41;

FIG. 47E is a time chart showing an output waveform of the output terminal 470 of the control circuit in the light emitting circuit during an actual light-emitting operation in the light emitting circuit shown in FIG. 41;

FIG. 47F is a time chart of light emitting current I-xe in the light emitting circuit during an actual light-emitting operation in the light emitting circuit shown in FIG. 41;

FIG. 47G is a time chart of shutter opening waveform during an actual light-emitting operation in the light emitting circuit shown in FIG. 41;

FIG. 53A is a time chart of a release switch signal for a camera containing the strobe apparatus in FIG. 52;

FIG. 53B is a time chart of an output waveform of an ST1 output terminal of a control circuit during an operation for emitting auxiliary light for AF distance measurement or red-eye reducing light by the light emitting circuit shown in FIG. 52;

FIG. 53C is a time chart of an output waveform of an ST2 output terminal of a control circuit during an operation for emitting auxiliary light for AF distance measurement or red-eye reducing light by the light emitting circuit shown in FIG. 52;

FIG. 53D is a time chart of transformer secondary side output voltage V564$b$ during an operation for emitting auxiliary light for AF distance measurement or red-eye reducing light by the light emitting circuit shown in FIG. 52;

FIG. 53E is a time chart of light emitting current I-xe during an operation for emitting auxiliary light for AF distance measurement or red-eye reducing light by the light emitting circuit shown in FIG. 52;

FIG. 53F is a time chart of an waveform of a VB measuring terminal for power source voltage during an operation for emitting auxiliary light for AF distance measurement or red-eye reducing light by the light emitting circuit shown in FIG. 52;

FIG. 59A is a time chart of a release switch signal for a camera containing the strobe apparatus in FIG. 58;

FIG. 59B is a time chart of an output waveform of an ST1 output terminal of a control circuit during an operation for emitting strobe light by the strobe apparatus in FIG. 58;

FIG. 59C is a time chart of an output waveform of an ST2 output terminal of a control circuit during an operation for emitting strobe light by the strobe apparatus in FIG. 58;

FIG. 59D is a time chart of a transformer secondary side output voltage V664b during an operation for emitting strobe light by the strobe apparatus in FIG. 58;

FIG. 59E is a time chart of light emitting current I-xe during an operation for emitting strobe light by the strobe apparatus in FIG. 58;

FIG. 59F is a time chart of a shutter driving waveform of a camera containing the strobe apparatus in FIG. 58;

FIG. 59G is a time chart of an output waveform of a VB measuring terminal for power source voltage of a camera containing the strobe apparatus in FIG. 58;

FIG. 65A is a time chart of an output waveform of an output terminal 770 in charging to a main capacitor in the light emitting circuit shown in FIG. 64;

FIG. 65B is a time chart of an output waveform of an output terminal 760 in charging to a main capacitor in the light emitting circuit shown in FIG. 64;

FIG. 65C is a time chart of an output waveform of an output terminal 750 in charging to a main capacitor in the light emitting circuit shown in FIG. 64;

FIG. 65D is a time chart of an output waveform of an output terminal 740 in charging to a main capacitor in the light emitting circuit shown in FIG. 64;

FIG. 65E is a time chart of main capacitor charging voltage V in the light emitting circuit shown in FIG. 64;

FIG. 66A is a time chart of a release switch signal of a camera containing the strobe apparatus shown in FIG. 64;

FIG. 66B is a time chart of an output waveform of an output terminal 760 during a flat light emitting operation in the light emitting circuit shown in FIG. 64;

FIG. 66C is a time chart of an output waveform of an output terminal 750 during a flat light emitting operation in the light emitting circuit shown in FIG. 64;

FIG. 66D is a time chart of an output waveform of an output terminal 740 during a flat light emitting operation in the light emitting circuit shown in FIG. 64;

FIG. 66E is a time chart of an output waveform of an output terminal 770 during a flat light emitting operation by the light emitting circuit shown in FIG. 64;

FIG. 66F is a time chart of light emitting current I-xe during a flat light emitting operation by the light emitting circuit shown in FIG. 64;

FIG. 66G is a time chart of a waveform for driving a shutter front curtain during a flat light emitting operation of the camera containing the strobe apparatus shown in FIG. 64;

FIG. 66H is a time chart of a waveform for driving a shutter rear curtain during a flat light emitting operation of the camera containing the strobe apparatus shown in FIG. 64;

FIG. 67A is a time chart of a release switch signal of the camera containing the strobe apparatus shown in FIG. 64;

FIG. 67B is a time chart of an output waveform of the output terminal 760 during an operation for emitting a large amount of light in the light emitting circuit shown in FIG. 64;

FIG. 67C is a time chart of an output waveform of the output terminal 750 during an operation for emitting a large amount of light in the light emitting circuit shown in FIG. 64;

FIG. 67D is a time chart of an output waveform of the output terminal 740 during an operation for emitting a large amount of light in the light emitting circuit shown in FIG. 64;

FIG. 67E is a time chart of an output waveform of the output terminal 770 during an operation for emitting a large amount of light in the light emitting circuit shown in FIG. 64;

FIG. 67F is a time chart of light emitting current I-xe during an operation for emitting a large amount of light in the light emitting circuit shown in FIG. 64; and FIG. 67G is a time chart of a shutter opening waveform during an operation for emitting a large amount of light of the camera containing the strobe apparatus shown in FIG. 64.

DETAIL DESCRIPTION OF THE PREFERRED EMBODIMENT

Embodiments of the present invention will be described below with reference to drawings.

First of all, a strobe apparatus will be described as a first embodiment of the invention.

Figure 1:
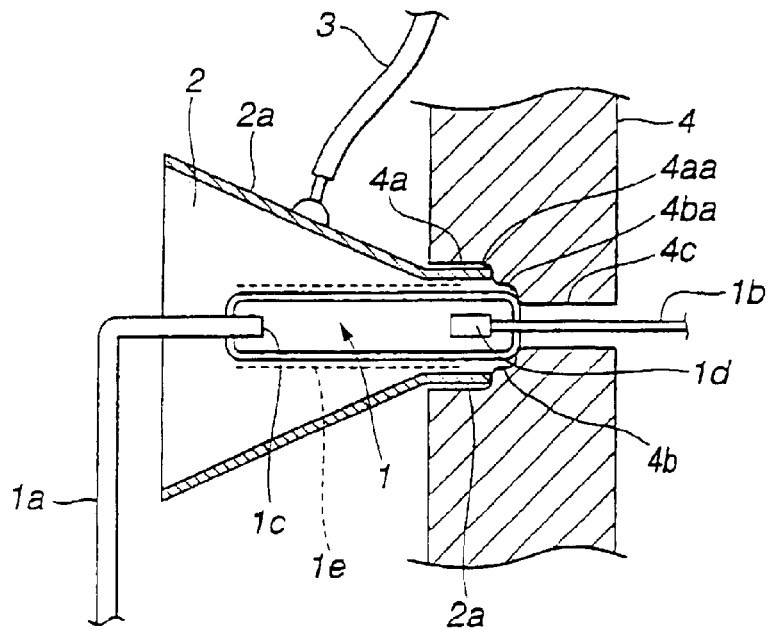
FIG. 1 is a section diagram showing a construction of a strobe apparatus according to a first embodiment.
Figure 2:
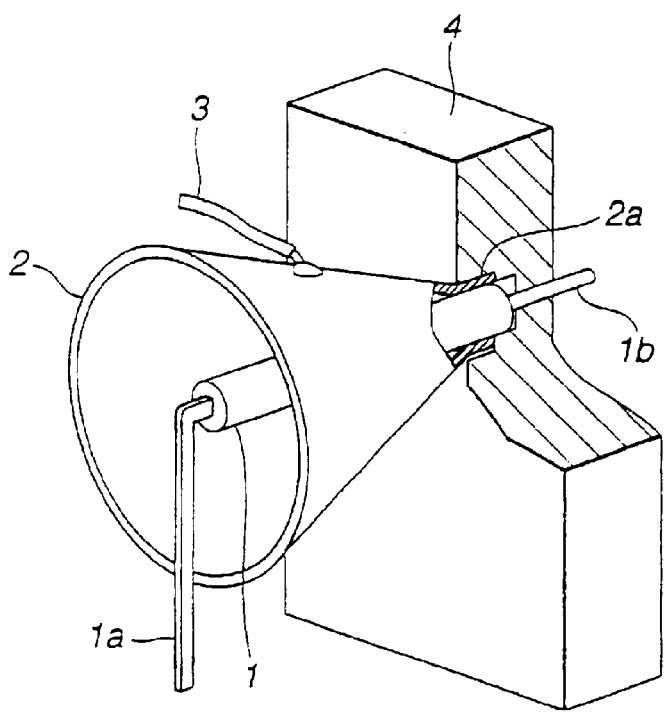
FIG. 2 is a perspective diagram showing a light emitting part of the strobe apparatus of the first embodiment having a partial section.

FIG. 1 is a section diagram showing a construction of the strobe apparatus according to the first embodiment. FIG. 2 is a perspective diagram showing a light emitting part of the strobe apparatus having a partial section.

Xenon gas is filled within a xenon tube 1, which is strobe light emitting discharge tube. The xenon tube 1 has terminals 1a and 1b extending outward from the both sides. The terminal 1a extends in a light irradiating direction. The terminal 1b extends in the direction of a fixed member 4 of the body. The terminal 1a bends in a direction at right angles to the xenon tube 1 and is electrically connected to a lead line or substrate, not shown. On the other hand, the terminal 1b extends linearly to the xenon tube 1 and is electrically connected to a lead line or a substrate, not shown.

The terminals 1a and 1b extend from the end within the xenon tube 1. An anode 1c is provided at the end of the terminal 1a on the object side. A cathode 1d is provided at the end of the terminal 1b in the body side. This is because the electrode shape of the cathode 1d is larger than that of the electrode of the anode 1c, and many shadows of the electrode may occur. Thus, the amount of irradiated light and oriented light cannot be influenced.

The surface of the xenon tube 1 is coated with a transparent electrode 1e called nesa coat (SNO2). The nesa coat has a function for applying high voltage to the entire discharge part of the xenon tube 1 instantly and for exciting xenon gas filled in the xenon tube 1. The nesa coat is coated only on the part for arc discharging. In the xenon tube according to the invention, the cathode 1d part outside of the arc discharging portion is also coated with the nesa coat as shown.

A reflection umbrella 2 has a parabolic shape, and the center part has an opening for being in close contact with the xenon tube 1 closely. The part around the center of the reflection umbrella 2 is closely in contact with the xenon tube as a holding portion 2a such that the terminal 1b can lie through the xenon tube 1 from the opening. Since the holding part 2a is coated with the transparent electrode 1e, the reflection umbrella 2 and the xenon tube 1 are electrically connected. In order to clearly show the range coated with the transparent electrode 1e in the figures, a space is provided between the reflection umbrella 2 and the xenon tube 1.

The reflection umbrella 2 is closely in contact with the cathode 1d part of the xenon tube 1 and has a parabolic shape from the arc discharge part of the xenon tube 1. In order to remove the leak of high voltage to be applied to the reflection umbrella 2, the end surface in the object side of the reflection umbrella 2 and the terminal 1a are spaced apart enough. Furthermore, a lead line 3 is connected to the outer surface side of the reflection umbrella 2.

The xenon tube 1 and the umbrella 2 are fixed through a body fixing member 4 so as to irradiate light in a predetermined direction. In the part fixed by the fixing member 4, the two components are press-fitted such that the degree of the contact between the xenon tube 1 and the reflection umbrella 2 can be improved.

The fixing member 4 functions as a base and has a through-hole for fixing the reflection umbrella 2 and xenon tube 1. The reflection umbrella 2 lies through the through-hole. The xenon tube 1 is press-fitted inside of the reflection umbrella 2. Thus, the xenon tube 1 and the reflection umbrella 2 can be electrically connected as described above.

The fixing member 4 has three through-holes in series having different diameters. In other words, viewing from the direction that the reflection umbrella 2 and xenon tube 1 are inserted, a hole 4a having the largest diameter, a hole 4b having a smaller diameter than that of the hole 4a and a hole 4c having the smallest diameter are provided.

In the hole 4a, the reflection umbrella 2 is fixed by the periphery of a holding portion 2a, and the end of the holding portion 2a is abutted with a bottom 4aa of the hole 4a. Thus, the axial position of the reflection umbrella 2 about the fixing member 4 can be restricted. The hole 4b is spaced apart from the periphery of the xenon tube 1 by a predetermined amount. Thus, the end of the xenon tube 1 can be abutted with a bottom 4ba of the hole 4b. The hole 4c has a diameter only enough for the terminal 1b to lie. In this way, the fixing positions of the xenon tube 1 and reflection umbrella 2 can be determined by the positions of the holes 4a to 4c.

Figure 3:
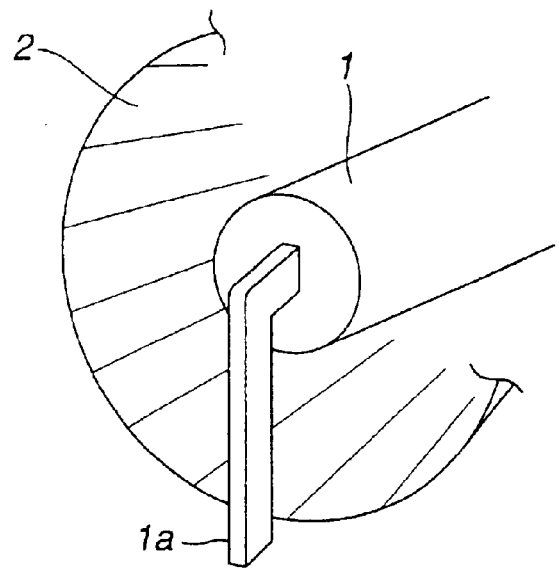
FIG. 3 is a perspective diagram showing a sectional form of a terminal 1a according to the first embodiment.

As shown in FIG. 3, the sectional shape of the terminal 1a is a substantially rectangular plate shape. The direction of thickness is arranged to be the direction to an object. Because of the terminal 1a in this shape, less light to be reflected by the reflection umbrella 2 and be irradiated to an object is blocked by the terminal 1a or goes in the other directions than a predetermined value, therefore more light is irradiated on the subject.

Next, an electric circuit of the strobe apparatus will be described with reference to FIG. 4.

Figure 4:
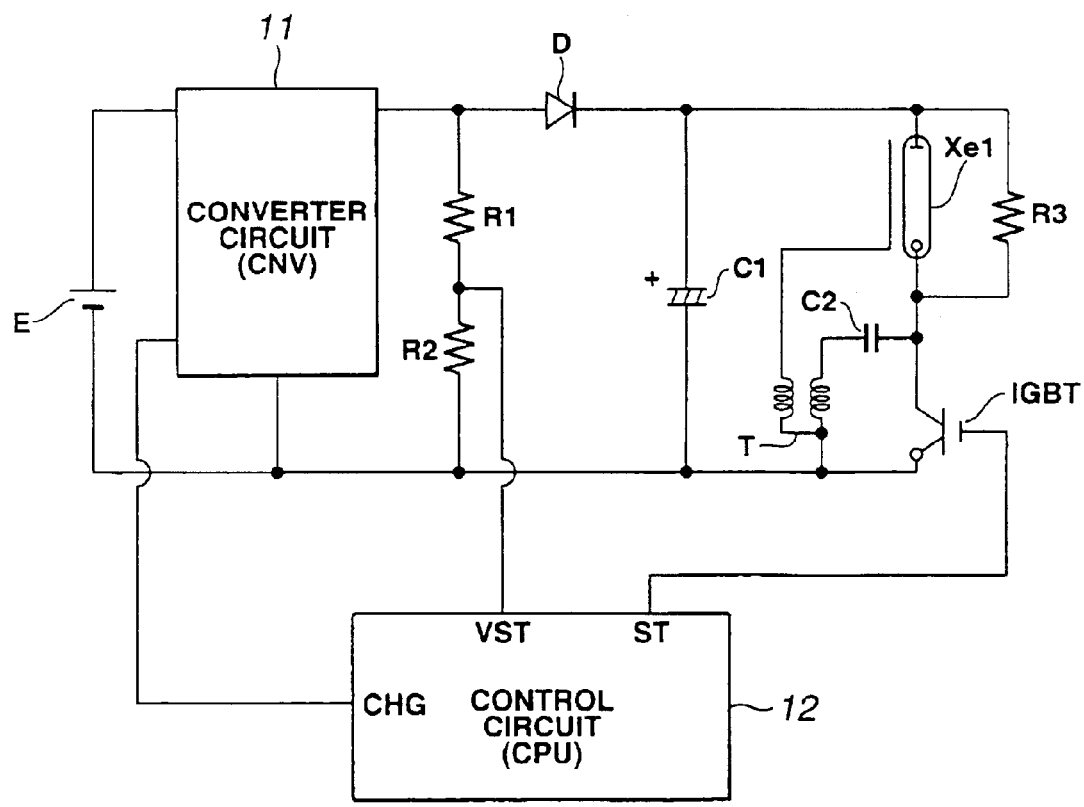
FIG. 4 is a circuit diagram showing a construction of an electric circuit for driving a strobe apparatus according to the first embodiment.

In FIG. 4, a converter circuit (CNV) 11 and a serial circuit of resistances R1 and R2 are connected in parallel with the power source E generally including a battery. The converter circuit 11 steps up the voltage of the power source E when a charge signal is output from a control circuit (CPU) 12. The converter circuit 11 sends the stepped-up charges to a main capacitor C1 for light emission through a diode D.

The serial circuit is a circuit for measuring an output voltage value of the converter circuit 11. An amount of voltage resulting from the multiplication of the output voltage of the converter circuit 11 by [1/resistance rate] times is generated between the resistances R1 and R2. When the resistance rate is known in advance, the voltage value of the converter circuit 11 can be obtained.

The diode D is a diode for preventing backflow. The diode D is provided for preventing charges stored in the main capacitor C1 for light emission from flowing out from the serial circuit of the resistances R1 and R2. The main capacitor C1 for light emission is provided for storing light emission energy of the xenon tube (Xe) 1 for light emission and is connected to the converter circuit 11 in parallel through the diode D.

A serial circuit of the xenon tube 1 for light emission and a switching element IGBT for controlling light-emission current is connected to the main capacitor C1 for light emission in parallel. The xenon tube 1 irradiates light to an object, and the light is used for camera-shooting. The switching element IGBT is an element for controlling light-emission current of the xenon tube 1 and is provided for adjusting an amount of emitted light.

A trigger circuit having a serial circuit of a trigger capacitor C2 and a primary winding of a trigger coil T is connected to the switching element IGBT in parallel. In order to supply energy of the trigger capacitor C2, a resistance R3 is connected to the xenon tube 1 in parallel. A secondary side output terminal of the trigger coil T is connected to the external wall of the xenon tube 1.

Next, operations of the electric circuit having the above-described construction will be described.

First of all, a charge signal is output from a CHG terminal of the control circuit 12 to the converter circuit 11. Then, charging is started by the converter circuit 11, and the voltage of the power source E is stepped-up. Then, the charging voltage to be charged in the main capacitor C1 for light emission through the diode D is input to the VST terminal of the control circuit 12 in the charging voltage detecting circuit having the serial circuit of the resistances R1 and R2.

An amount of terminal voltage of a VST terminal of the control circuit 12 reaches a predetermined amount of voltage during the charging, the voltage of the main capacitor C1 for light emission becomes light-emittable full-charging voltage. At that time, an OFF signal is output from the CHG terminal of the control circuit 12, and the charging stops. The charging current is charged to the main capacitor C1 for light emission, and the same amount of voltage is also charged to the trigger capacitor C2 through the resistance R3.

Upon the completion of charging, a light-emission start signal is output from an ST terminal of the control circuit 12 to the switching element IGBT. When the switching element IGBT operates, charges of the trigger capacitor C2 are discharged. Then, current changes in the primary winding side of the trigger coil T.

When the current changes in the primary side of the trigger coil T, the energy is conducted to the secondary side. Since the output end of the secondary coil is connected to the external wall of the xenon tube 1, the resistance value is infinite. Therefore, high voltage occurs at the output end of the secondary winding side of the trigger coil T, and xenon gas within the xenon tube 1 is excited.

The high voltage may cause failures in light emission and/or other failures when discharging (trigger leak) to the other components, not shown, occurs. When xenon gas is excited, the resistance within the xenon tube 1 decreases. Thus, current flows, and the current release light.

When ON time of the switching element IGBT reaches a predetermined time, an OFF signal is output from the ST terminal of the control circuit 12. When the OFF signal is input to the switching element IGBT, the operation of the switching element IGBT is stopped. Then, current is cut. When current is cut, current in the xenon tube 1 is stopped, and the light emission is stopped.

The strobe apparatus according to the first embodiment having the above-described construction has nesa coat on the exterior of the discharging portion of the xenon tube 1. Furthermore, nesa coat is coated on the contact part of the xenon tube 1 and the parabolic reflection umbrella 2. Thus, trigger voltage having been applied to the reflection umbrella 2 can be directly applied to the surface of the xenon tube 1. Therefore, a strobe apparatus can be provided which can easily emit light. Furthermore, since no trigger electrodes exist between the strobe apparatus and an object, even light can be distributed, and an enough amount of light can be supplied.

Since the xenon tube is provided at a proper position by being press-fitted in the reflection umbrella, a better contact characteristic can be obtained, which can cause triggering easily.

In FIG. 3, the sectional shape of the terminal 1a is illustrated as a substantially rectangular place. However, the sectional shape is not limited thereto. For example, the sectional shape of an electrode in the thickness direction may be round.

Next, variation examples of the first embodiment will be described.

Figure 5A:
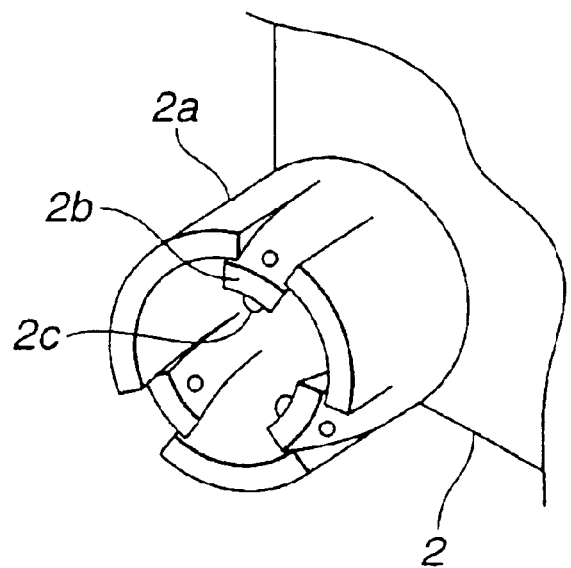
FIG. 5A is a perspective diagram of a holding portion of a reflection umbrella as a variation example of the strobe apparatus according to the first embodiment.
Figure 5B:
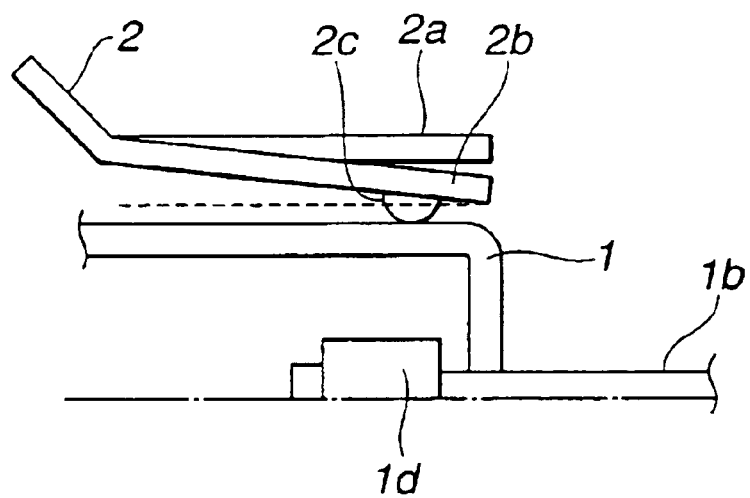
FIG. 5B is a section diagram of the holding portion of the reflection umbrella and a xenon tube in the variation example in FIG. 5A.

While, according to the first embodiment, the entire holding portion 2a at the center of the parabolic reflection umbrella 2 is connected and is fixed to the end of the xenon tube 1 through the transparent electrode 1e, a part of the holding portion 2a may be cut out as shown in FIGS. 5A and 5B for using the elasticity.

FIGS. 5A and 5B show a construction of a variation example of the first embodiment. FIG. 5A is an exterior perspective diagram showing a construction of a holding portion of a reflection umbrella. FIG. 5B is a section diagram of a holding portion of the reflection umbrella and a xenon tube.

For example, a notch 2b for press-connection is provided at three circumferential positions of the holding portion 2a of the reflection umbrella 2. The notch 2b for press-connection is elastic in the direction of the center axis of the holding portion 2a and has a projection 2c integrally provided near the pointed end. Because of the elasticity, when the projection 2c is in contact with the xenon tube 1 through the transparent electrode 1e, the xenon tube 1 and the reflection umbrella 2 are electrically connected.

Also with this construction, the same effects as those of the first embodiment can be obtained.

Next, a second embodiment of the invention will be described.

Since the construction of a strobe apparatus according to the second embodiment is substantially the same as that of the strobe apparatus according to the first embodiment, the same reference numerals are given to the same components as those of the first embodiment and the descriptions will be omitted below.

Figure 6:
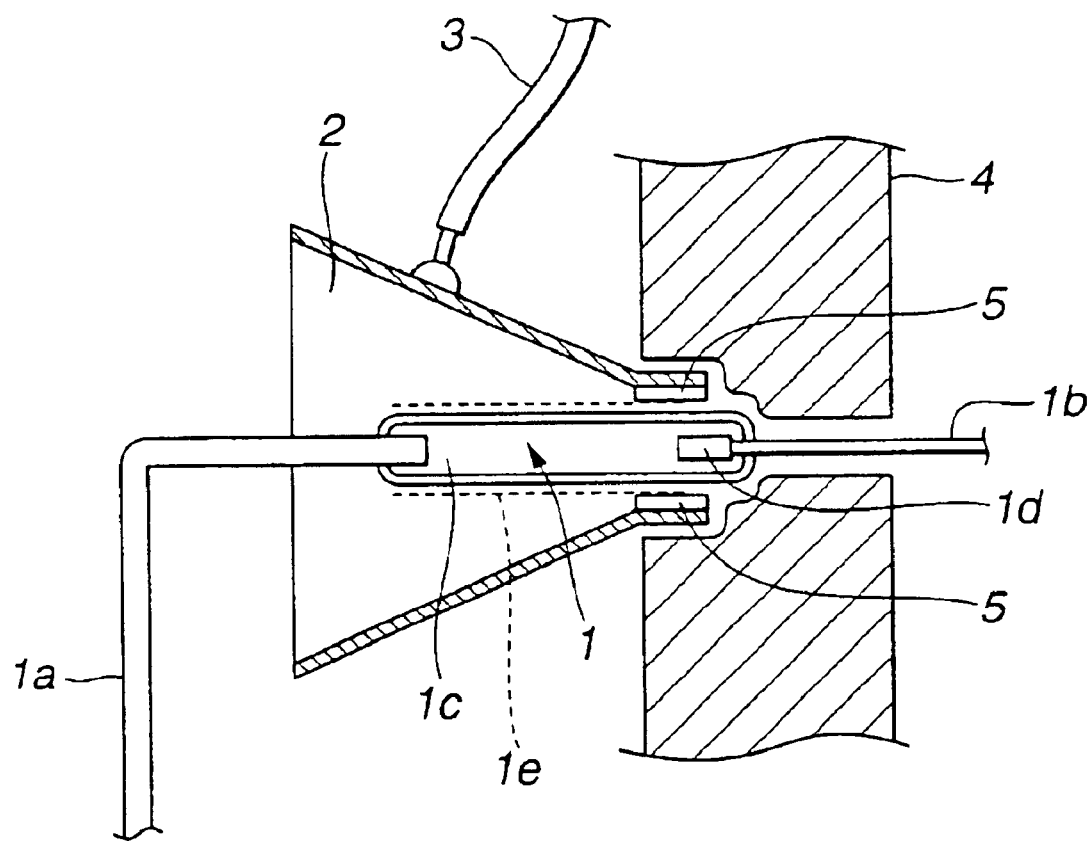
FIG. 6 is a section diagram showing a construction of a strobe apparatus according to a second embodiment of the invention.

FIG. 6 is a section diagram showing a construction of the strobe apparatus according to the second embodiment of the invention.

A ring 5 containing a conductive material is provided at a part connecting the xenon tube 1 and the reflection umbrella 2. The ring 5 also contains an elastic material and can be closely attached to both of the xenon tube 1 and the reflection umbrella 2. The ring 5 may contain a transparent or white material, such as lubber and resin, which does not absorb heat generated when the xenon tube 1 emits light.

Figure 7:
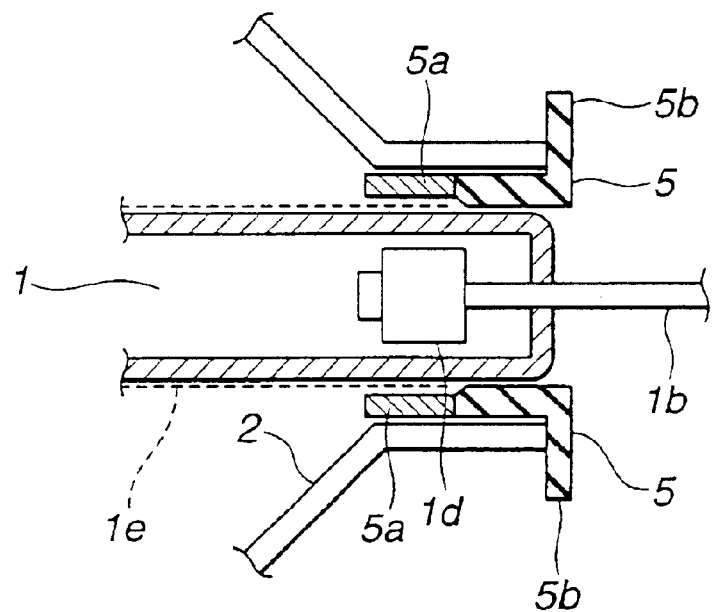
FIG. 7 is a section diagram showing a construction of a ring and the surrounding portion in the strobe apparatus according to the second embodiment.

The ring 5 is closely in contact with the xenon tube 1 and the reflection umbrella 2 as shown in FIG. 7. The ring 5 includes a conductive portion 5a and an insulating portion 5b. The conducting portion 5a is the pointed end on which a transparent electrode 1e of the xenon tube 1 is coated. The insulating portion 5b is the other part containing an insulator.

Trigger voltage caused in the reflection umbrella 2 is blocked by the end of he insulating portion 5b. Trigger voltage caused in the xenon tube 1 is blocked by a part of the insulating portion 5b closely in contact with the xenon tube 1. Therefore, the trigger leak to the other components, not shown, does not occur.

In this way, a ring for connecting the parabolic reflection umbrella and the xenon tube is provided in the strobe apparatus having the construction according to the second embodiment. Thus, a strobe apparatus can be provided in which trigger voltage can be easily applied by the xenon tube.

Since the part to be triggered of the ring material is arranged to be conductive while the other part is arranged to be insulating, trigger voltage can be applied easily. Furthermore, the trigger leak does not occur. Since no trigger electrodes exist between the strobe apparatus and an object, even light can be distributed, and an enough amount of light can be supplied.

Next, variation examples of the second embodiment of the invention will be described.

Figure 8:
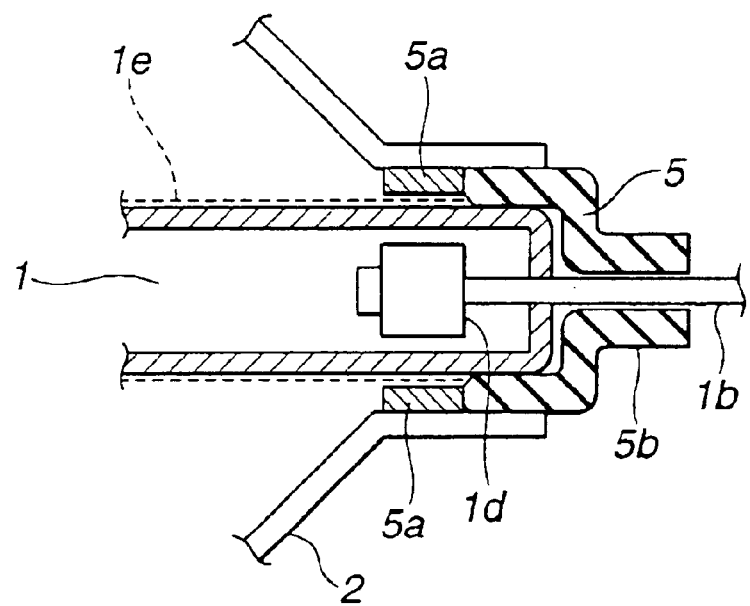
FIG. 8 is a section diagram of a holding portion of a reflection umbrella and a xenon tube as a variation example of the strobe apparatus according to the second embodiment.

FIG. 8 shows a construction of a variation example of the second embodiment and is a section diagram of a holding portion of the reflection umbrella and the xenon tube.

According to the second embodiment shown in FIG. 7, the end of the insulating portion 5b of the ring 5 opens from the center axis of the reflection umbrella 2 toward the outside. On the other hand, in this variation example, as shown in FIG. 8, the insulating portion 5b of the ring 5 covers the periphery of the terminal 1b extending from the xenon tube 1.

Also with this construction, the same effects as those of the second embodiment can be obtained.

As described above, according to the first and second embodiments, an electrode for trigger application is provided on the exterior of the discharging part of the discharge tube, and the electrode part is in contact with the reflection umbrella. Then, trigger voltage is applied to the discharge tube. Thus, a strobe apparatus can be provided which can easily emit light. Furthermore, since no trigger electrodes exist between the strobe apparatus and an object, even light can be distributed, and an enough amount of light can be supplied.

Since the discharge tube is press-fitted in the reflection umbrella, a strobe apparatus can be provided with a better contact characteristic and without failed light emission and trigger noise.

Since an elastic ring is provided at a contact part of the discharge tube and reflection umbrella, a strobe apparatus can be provided with a higher contact characteristic between the discharge tube and the reflection umbrella.

Furthermore, since the contact part between the elastic ring and the transparent electrode of the discharge tube is conductive and the other part is insulating, a strobe apparatus can be provided which can achieve applicability of trigger voltage and the prevention of trigger leak.

Figure 9:
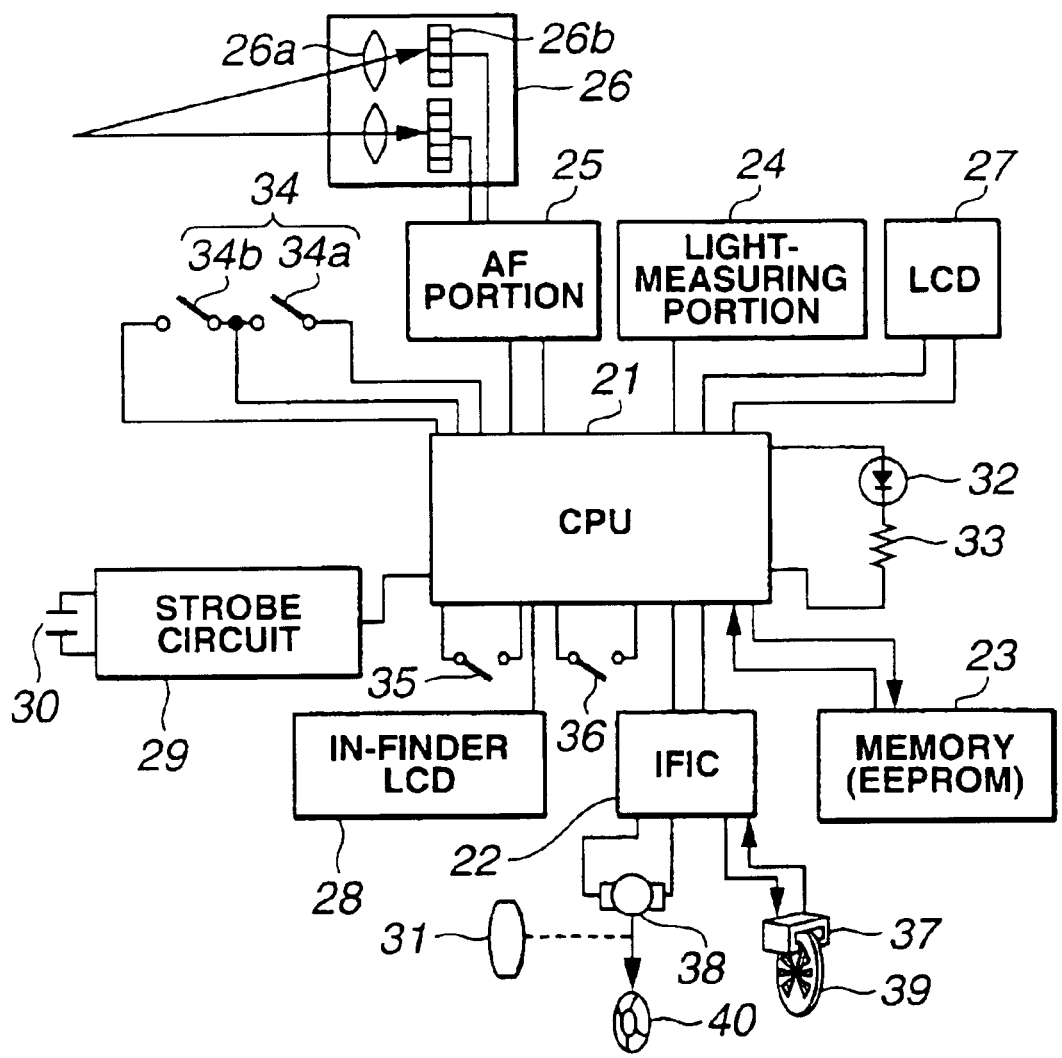
FIG. 9 is a diagram showing a construction of a camera according to a third embodiment of the invention.

Next, a camera having a camera-blur warning function according to a third embodiment of the invention will be described with reference to FIG. 9 showing the block construction.

The camera having a camera-blur warning function according to this embodiment includes a CPU 21, an IFIC 22, a memory (EEPROM) 23, a light-measuring portion 24, an auto-focus (AF) portion 25, an auto-focus (AF) sensor 26, a liquid crystal display element (LCD) 27, an in finder LCD 28, a strobe circuit 29, a main capacitor 30, a shooting lens 31, a warning display portion 32, a resistance 33, switches (release switches) 34a and 34b, a mode switching switch 35 (first operating member), a strobe mode switch 36 (second operating member), a motor 38, a rotational blades 39, and a photo interrupter 37. The CPU 21 controls the entire camera. The EEPROM 23 stores data for adjustment. The LCD 27 displays information relating to a setting state of the camera and relating to shooting. The in finder LCD 28 is provided in a finder for displaying information relating to shooting. The strobe circuit 29 includes a light emitting tube for emitting auxiliary light and so on. The main capacitor 30 charges for causing the light-emitting tube to emit light. The shooting lens 31 has a zooming function. The warning display portion 32 includes an LED. The resistance 33 is serially connected to the warning display portion 32. The switches 34a and 34b are used for starting a shooting sequence of the camera. The mode switching switch 35 sets camera modes including a camera-blur detecting mode (vibration detecting mode). The strobe mode switch 36 is for changing a light emitting state of a strobe apparatus of the camera. The motor 38 drives driving mechanisms such as a shooting lens, shutter and film-feeding. The rotational blade 39 rotates in connection with the motor 38. The photo interrupter 37 optically detects a hole of the rotating rotational blade 39 for controlling the driving of the motor 38.

In order to drive driving mechanisms such as a shutter 40 and a zoom lens body frame, the one to be driven by the motor 38 can be switched by a switching mechanism. Alternatively, a motor may be provided in each driving mechanism separately.

In this construction, the CPU 21 performs a camera shooting sequence in accordance with the operation states of the release switches 34a and 34b. In other words, in accordance with the output of the AF sensor 26, in addition to the warning indication by the in-finder LCD 28 for camera-blur warning, the AF portion 25 during shooting and the light-measuring portion 24 for measuring the intensity of an object for exposure control are driven. Then, the motor 38 is controlled through the IFIC 22 in response to the receipt of a required signal. In this case, the rotation of the motor 38 is conducted to the rotational blade 39, and the IFIC 22 matches waveforms of a signal output by the photo-interrupter 37 in accordance with the position of the presence of a hole for the adjustment. Then, the CPU 21 monitors the rotational state of the motor 38. Furthermore, the strobe circuit 29 emits auxiliary light as required.

Figure 10:
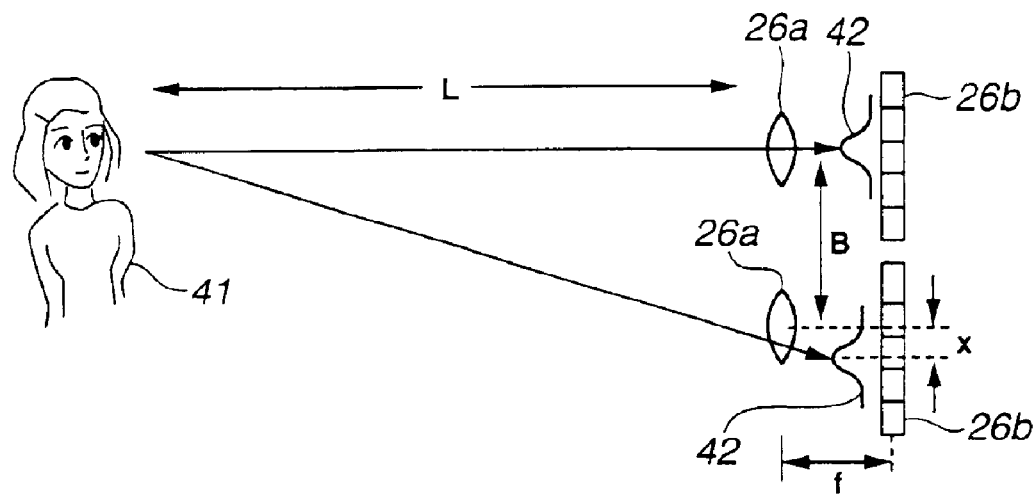
FIG. 10 is a diagram describing a triangulation distance-measurement principle in the camera in FIG. 9.

FIG. 10 shows a principle of distance measuring by the AF sensor, which is a distance-measuring sensor.

A distance between main points of two photo-receptive lenses 26a is called base line length B. A relative position difference x of an image 42 of an object 41 formed on a pair of sensor arrays 26b is calculated. A focal distance f of the photo-receptive lenses is used to obtain an object distance L based on the triangulation distance-measuring principle and based on the relationship, L=B*f/x. The sensor array 26a outputs an electric signal in accordance with the image variation of light and shades from multiple pixels and forms an image signal.

Figure 11:
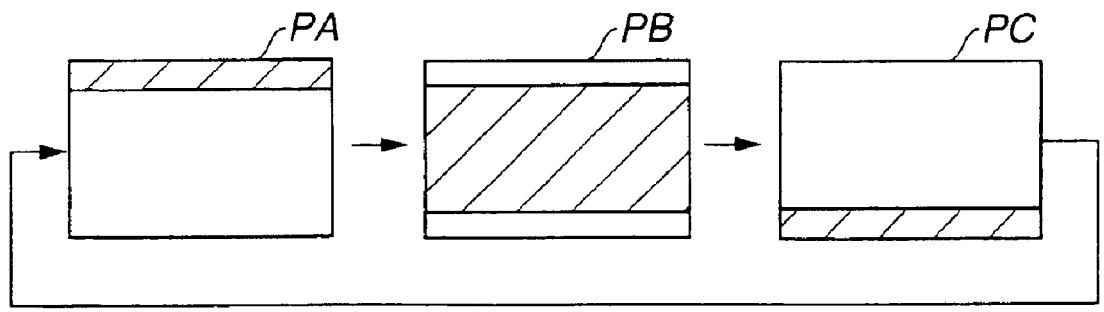
FIG. 11 is a diagram showing a display example of a warning pattern displayed on an LCD within a finder in the camera in FIG. 9.

FIG. 11 is an example of a warning pattern to be displayed on the in-finder LCD 28. The one used for the screen display in panorama mode and for blackout display indicating the firing of the shutter is also used as the in-finder LCD 28.

A light-shield pattern for a screen PA and screen PC shown in FIG. 11 is a light-shield pattern to be displayed in the panorama shooting setting, which is used. First of all, as shown in the screen PA, the light in the upper area is only shielded. Next, as shown in the screen PB, the light in the center area indicating a range to be shot in the panorama shooting is only shielded. Finally, the light of the lower area of the panorama light-shielding portion is only shielded as shown in the screen PC. These steps are sequentially repeated in the light-shield pattern. By repeating the display pattern, the occurrence of camera blurs can be informed to a user looking into the finder. When the PA, PB and PC patterns are used for light-shielding at the same time, a blackout display can be obtained.

Figure 12A:
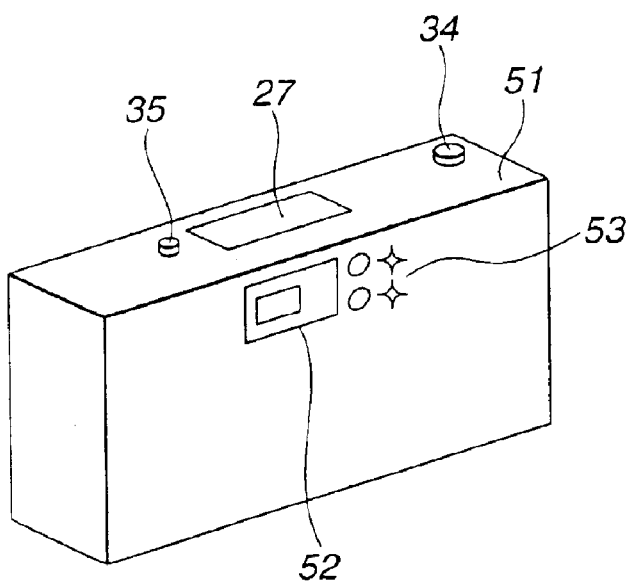
FIG. 12A is an exterior diagram of a camera having a camera-blur detecting mode in FIG. 9, which is diagonally viewed from the back.
Figure 12B:
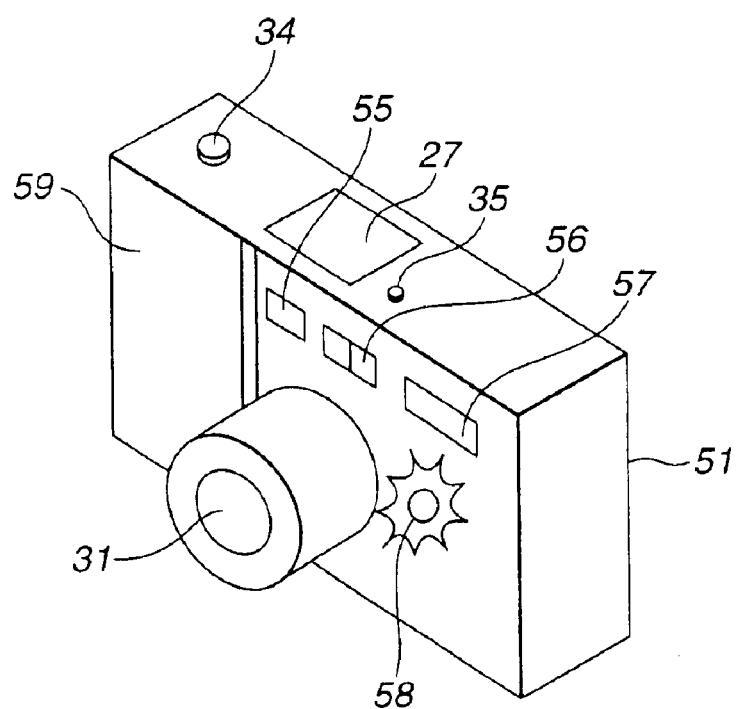
FIG. 12B is an exterior diagram of a camera having a camera-blur detecting mode in FIG. 9, which is diagonally viewed from the front.

FIGS. 12A and 12B show an exterior of one construction example of a camera having this kind of camera-blur detecting mode. Here, FIG. 12A shows a construction viewed from the back side of the camera. FIG. 12B is a perspective diagram of a front construction. An operation for warning the occurrence of camera blurs based on the camera-blur detection will be described with reference to these drawings. Furthermore, an operation for warning the occurrence of camera blurs based on the camera-blur detection without the in-finder LCD will be described.

Figure 13:
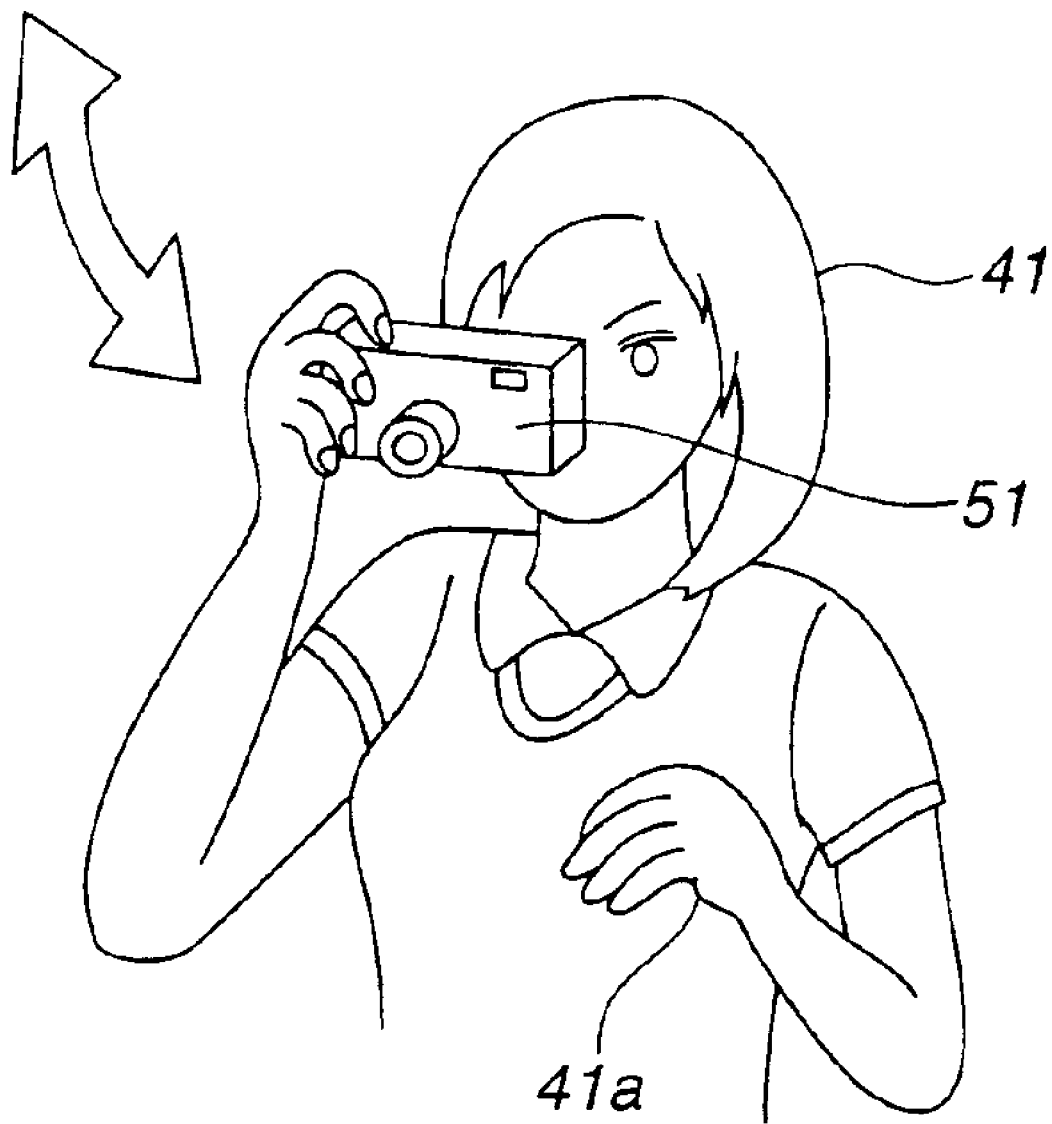
FIG. 13 is a diagram showing a state where a shooting person holds the camera in FIG. 9 by one hand for shooting.
Figure 14:
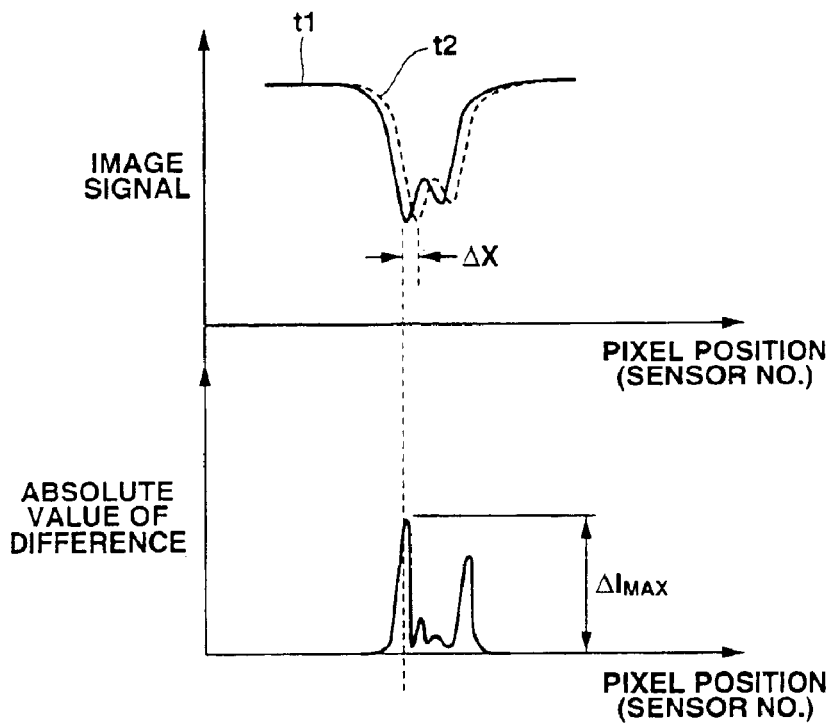
FIG. 14 is a diagram showing a relationship between image signals and difference absolute values with respect to the pixel position for horizontal shifts in the camera in FIG. 9.
Figure 15:
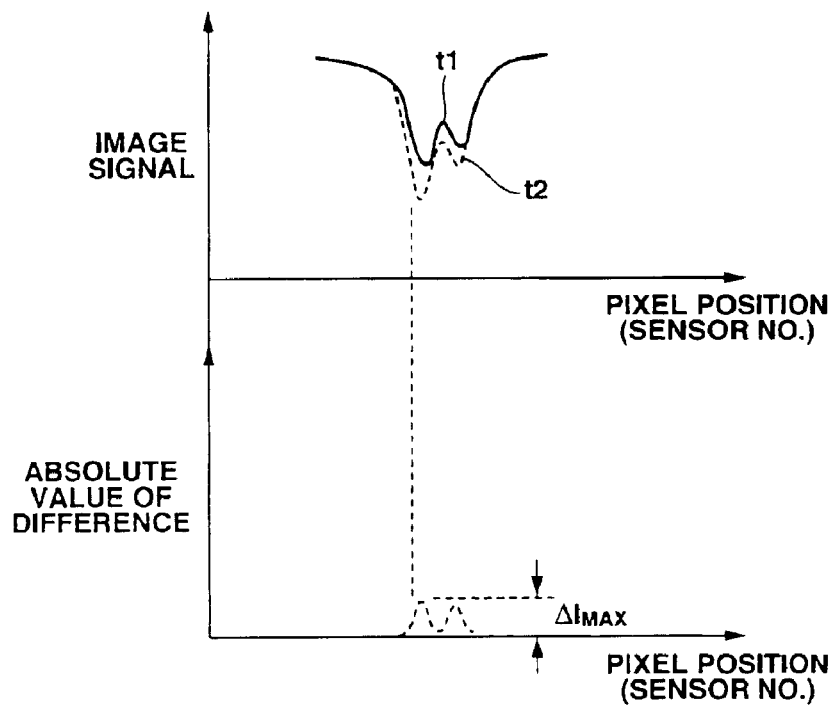
FIG. 15 is a diagram showing a relationship between image signals and difference absolute values with respect to the pixel position for vertical shifts in the camera in FIG. 9.

FIG. 13 shows a state where a shooting person is holding a camera in one hand. FIG. 14 shows relationships of an image signal and differences of absolute values with respect to pixel positions in a horizontal shift. FIG. 15 shows relationships of an image signal and differences of absolute values with respect to pixel positions in a vertical shift.

As shown in FIG. 12A, a finder eyepiece 52 is provided on the back of a camera 51. A light emitting diode (LED) 53 is provided next to the finder eyepiece 52. When a camera blur occurs, the LED 53 flashes. Thus, a user can recognize the warning even when he/she is holding the camera. When the shooting person 41 recognizes the warning, the shooting person 41 can give his/her left hand to the camera 51 being held by one hand (right hand) as shown in FIG. 13. Then, the shooting person 41 can hold the camera 51 more tightly in order to take measures for preventing the blurs. An LCD 27 for mode indication, a switch 35 for mode setting and a release button (or release switch) 34 are provided on the camera 51.

As shown in FIG. 12B, a shooting lens 31 is provided on the front surface of the camera 51. A finder objective lens 55 and photo-receptive lenses for a light-measuring and distance-measuring unit 56 are provided above the shooting lens 31. Furthermore, a strobe light-emitting portion 57 and a self-timer LED 58 are provided. When the LED 58 is caused to flush upon the occurrence of camera blurs, a user in front of the camera can recognizes whether a shooting person whom the user asks to shoot causes camera blurs or not.

As shown in FIG. 12B, a barrier 59 is provided on the front of the camera 51. The barrier 59 is slidable and can cover the shooting lens 31, the finder objective lens 55 and the photo-receptive lens of the light-measuring and distance-measuring unit 56 when the camera is being carried. The barrier 59 may also function as a power-source switch. When the barrier 59 is opened, the power source can be turned on and the collapsing shooting lens 31 can be let out to a predetermined position. Then, the shootable state can be obtained. On the other hand, when the barrier 59 is attempted to close, the shooting lens 31 is collapsed, and the power source is turned off.

The LED 53 near the finder eyepiece lens 52 on the back of the camera may be also used as the LED for the indication of the state where an existing strobe apparatus is being charged and/or for the indication of AF focusing.

After the camera-blur detecting mode is set, when the camera is being held in an unstable manner and is shaking, the in-finder LCD 28 may flash as described above. Alternatively, as shown in FIG. 12A, the LED 53 near the camera finder eyepiece 52 may flash for warning.

Furthermore, while the camera is shaking, the LED 58 for a self-timer indication on the front of the camera may flash. Thus, the user of the camera can recognize the state that the camera being held by a shooting person whom the user asks to shoot the user is shaking.

The AF sensor 26 further includes a vibration detecting portion. A method for determining camera blurs based on the image output from the AF sensor 26 will be described.

Figure 16A:
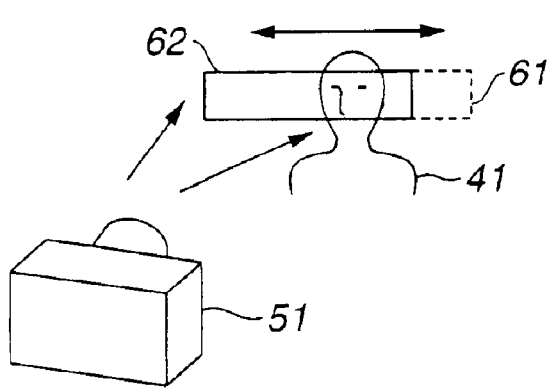
FIG. 16A is a diagram showing a change in monitored range when the camera in FIG. 9 is moved horizontally.

Here, a pair of photo-receptive lenses is aligned in the horizontal direction of the camera shown in FIG. 12B, and the direction of the base line length is the horizontal direction. As shown in FIG. 16A, when the camera 51 is moved horizontally, a monitor range 62 of the AF sensor changes to a monitor range 61. The image data of the object 41 is shifted horizontally (in the direction of the pixel position: sensor No.) by the difference ΔX between timing t1 and timing t2 as indicated by the image signal in FIG. 14.

Figure 16B:
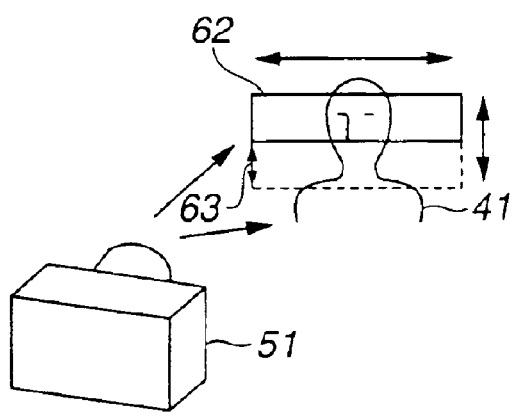
FIG. 16B is a diagram showing a change in monitored range when the camera in FIG. 9 is moved vertically.

As shown in FIG. 16B, when the camera 51 is moved vertically, the monitor range 62 of the AF sensor changes to a monitor range 63. Thus, a large change in monitor position, that is, change in image may occur. For example, a part monitoring the eyes may come to monitor the mouse. As indicated by the image signal in FIG. 15, the shape of the image signal itself may be different in the timing t1 and timing t2.

Therefore, as indicated by the absolute value of the difference in FIG. 15, whether any change has occurred or not can be determined based on the difference between pixels. The maximum change value ΔIMAX may be used to determine a change in image, that is, the magnitude of a camera blur. However, when the ΔIMAX alone is used for the determination, the sensor data output by the same pixel may change significantly largely in the horizontal shift as shown in by the image signal in FIG. 14 as indicated by the absolute value of the difference in FIG. 15 for a not-so-large camera blur.

Figure 17:
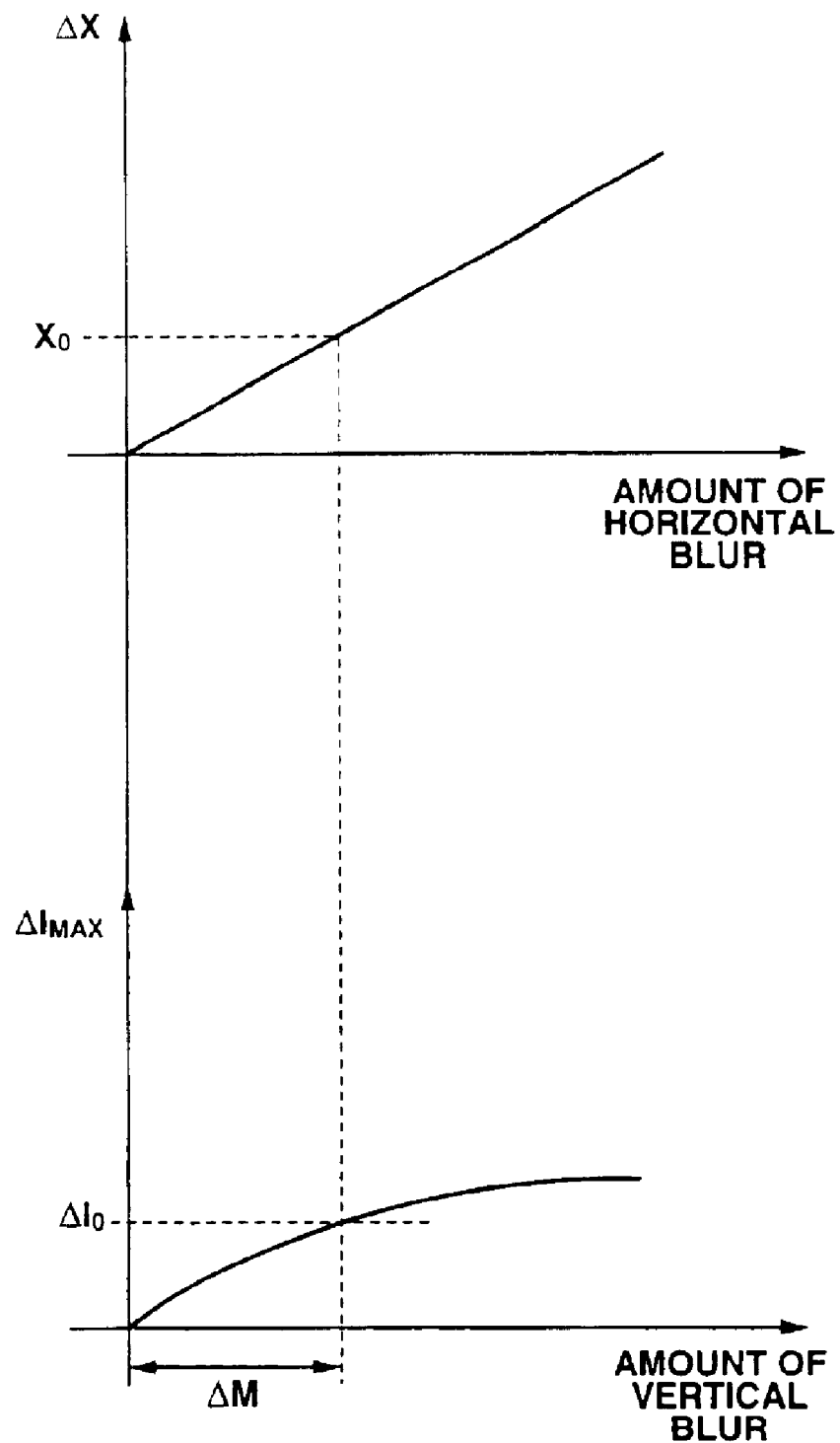
FIG. 17 is a diagram showing a relationship between changes in image signal and amounts of camera blur in the camera in FIG. 9.

In other words, in the method for determining a camera blur amount by using the ΔIMAX, the horizontal blur is determined as a significantly large blur. Conversely, the vertical blur is determined as a small blur. In order to solve the problem, according to this embodiment, when the camera blurs horizontally (by a horizontal blur amount of ΔX), the blur is not determined by using the ΔIMAX. Then, the proper change in image signal and the magnitude relationship in camera-blur amount are used to determine the magnitude of the blur correctly. FIG. 17 shows the relationship. Thus, camera blurs can be determined in a highly reliable manner.

Figure 18:
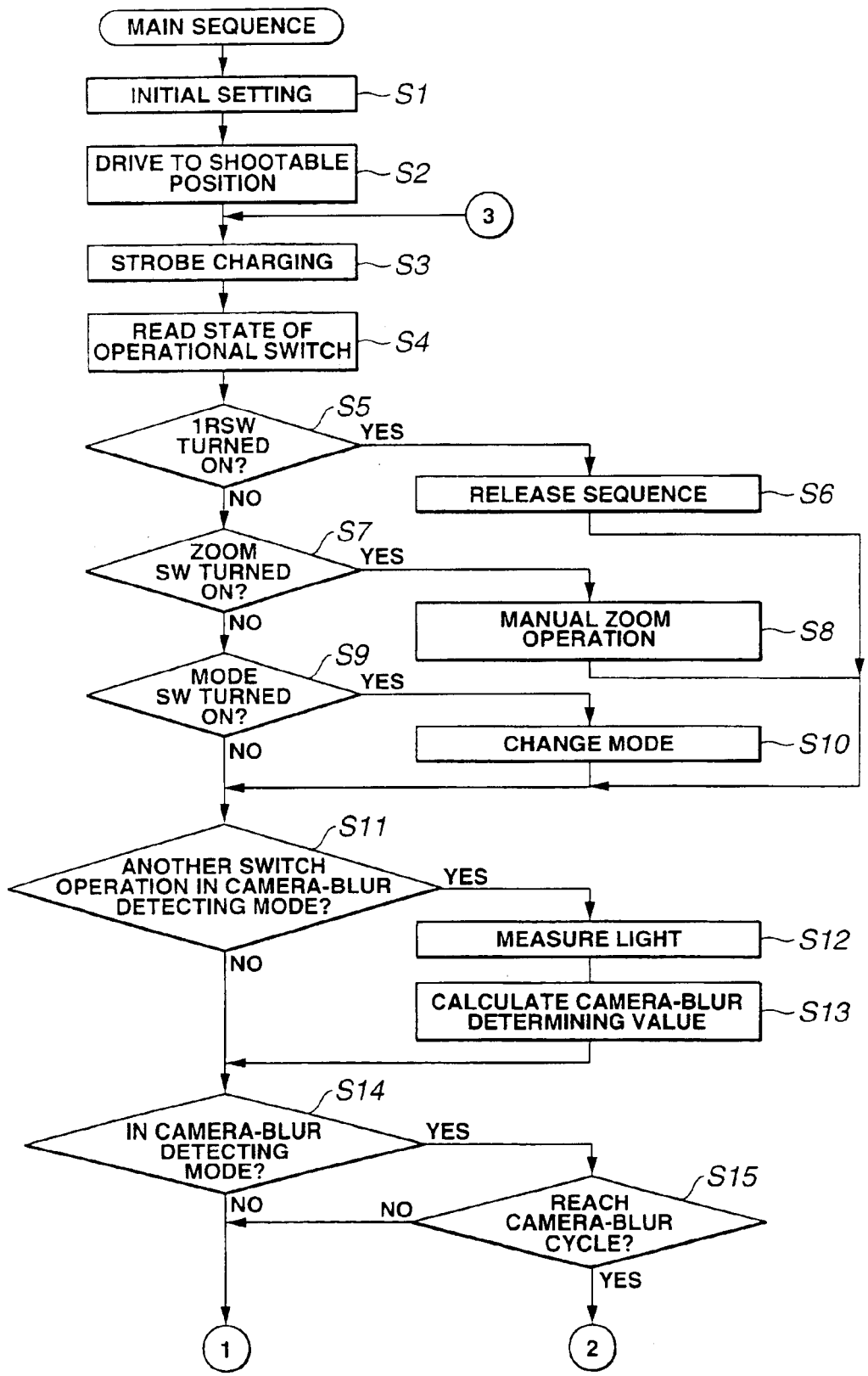
FIG. 18 is the first half of a flowchart for describing a sequence for determination control in a camera-blur determining method for the camera in FIG. 9.
Figure 19:
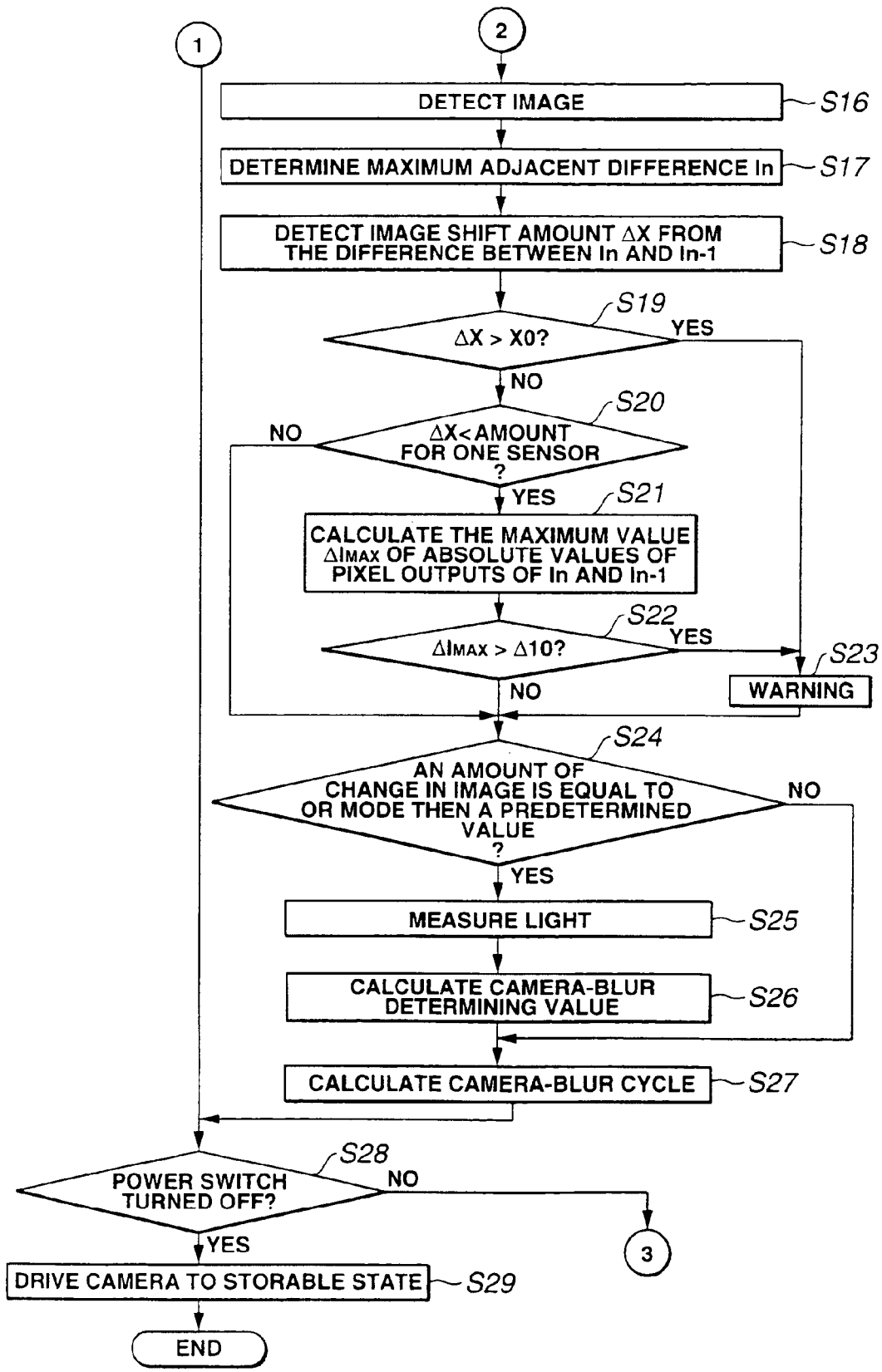
FIG. 19 is the second half of the flowchart for describing the determination control sequence following FIG. 18.

A camera main sequence for implementing the camera-blurs determination with the above-described construction will be described with reference to flowcharts shown in FIGS. 18 and 19.

First of all, the power source switch of the camera is turned on (the barrier 59 is opened), and the components are activated and are initialized (step S1). For the initialization, ports within the CPU 21 and the RAM are set. Then, data stored in the EEPROM 23 is read and is expanded to the RAM in the CPU 21. The state of the battery within the camera is checked. If the battery voltage is not enough, an indication for empty battery is displayed on the LCD panel 26 for a predetermined period of time. Then, the camera operation is inhibited. If the enough amount of battery remains, a number of frames and/or the mode are displayed on the LCD panel 27.

Next, the shooting lens 31 is let out from the storage position to the shootable position (step S2). When the main capacitor 30 does not have strobe charging voltage, the main capacitor 30 is charged (step S3). While charging, states (ON/OFF states) of operation switches in the camera are checked (step S4). Here, the camera is operated in accordance with the state of the read operation switch.

Next, whether the release button 34 has been pressed by a shooting person or not is determined (step S5). If it is determined that the release switch 1RSW 34a and 2RSW 34b have been pressed (YES), the processing goes to a release sequence (step S6) for distance measuring and light measuring. A distance to an object and the intensity of the object are measured and are adjusted so as to obtain proper exposure. After the exposure, the processing goes to a step S11.

If the release switch 1RSW 34a has not been turned on at the step S5 (NO), whether the zoom switch, that is zoom-in or zoom-out SW has been operated or not is determined (step S7). Here, if the zoom switch has been operated (YES) a manual zooming operation is performed for operating in accordance with the manipulated amount. Then, the focal distance data of the camera is computed (step S8), and the processing goes to the step S1. On the other hand, at the step S7, if the zoom switch has not been manipulated (NO) whether the mode switching switch 35 has been manipulated or not is determined (step S9). If the switch 35 has been manipulated (YES), the camera shooting mode is switched (step S10).

Next, the shooting mode is set in the camera-blur detecting mode, and the whether a zooming operation or other operations have been performed or not is determined based on the changes in the release switch and/or zoom switch (step S11). When these switching operations have been performed (YES), the camera-blur detection is stopped while the zooming operation and/or release operation is being performed. Since the shooting condition is not known, the intensity of the object is measured and the shutter speed is computed (step S12) for computing the camera-blur determining level. The obtained shutter speed and the focal distance data computed at the step S8 are used for computing the camera-blur determining level again (step S13).

Then, whether the camera-blur detecting mode is set or not is determined (step S14). If the camera-blur detecting mode is set (YES), whether it is camera-blur detecting timing or not is determined (step S15). Generally, the camera-blur detecting cycle is about 5 to 10 Hz. In this embodiment, the cycle is about 50 msec.

Apparently, this numeral value is an example and is not limited thereto. If the camera-blur detecting mode is not set (NO), the processing goes to a step S28, which will be described later. If it is determined at the step S15 that it is the camera-blur detecting timing (YES), an image is detected (step S16). On the other hand, if it is not the camera-blur detecting timing (NO), the processing goes to the step S28, which will be described later.

Since the part having the largest change in image (large contrast) in the result from the image detection is needed in order to increase an amount of information, an image signal In of the part having the largest output difference between adjacent sensors (pixels) is obtained (step S17). Next, a horizontal shift amount $\Delta X$ (see the image signal in FIG. 14) is detected (step S18) from the difference between the maximum adjacent difference In-1 computed at the step S17 in the previous timing and the maximum adjacent difference In computed in this timing.

Next, it is determined whether the obtained horizontal shift amount $\Delta X$ is equal to or more than a predetermined value X0, which is a predetermined standard or not (step S19). If it is determined that the amount $\Delta X$ is equal to or more than the predetermined value X0 (YES), the large horizontal shift is determined and a warning is displayed (step S23). The method for displaying the warning is the same as the display method as shown in FIGS. 11, 12A and 12B. On the other hand, if it is determined at the step S19 that the horizontal shift amount is below the predetermined value X0 (NO), it is determined that the horizontal shift amount is equal to or below the amount for one sensor (step S20). If it is determined that the amount is equal to or more than one sensor (NO), the processing goes to a step S24, which will be described later However, if the shift amount is above the amount for one sensor (YES), the maximum value $\Delta IMAX$ for each pixel between the maximum adjacent differences In and In-1 is detected (step S21).

Then, the obtained MAX value $\Delta IMAX$ and a predetermined value $\Delta I0$ are compared (step S22). If the amount of change is large, the processing goes to a step S23 and a warning indication is given. On the other hand, the amount of change is small (NO), no warning indications are given. Then, it is determined whether the amount of image change obtained by computing is equal to or more than a predetermined value or not (step S24).

Here, if the image change is equal to or more than the predetermined value (YES), the composition being formed by the shooting person may be changed and his/her viewing place may be changed or the intensity may be changed largely. Then, the light is measured again (step S25), and the camera-blur determining amount is calculated again (step S26).

Next, the camera-blur detecting cycle is calculated in accordance with the amount in image change and the measured intensity information (step S27). It is determined whether the power switch has been turned off or not (step S28). If the power switch has not been turned off, the processing returns to the step S3 and then the same sequence is implemented. If the power switch has been turned off (YES), the shooting lens 31 of the camera is accommodated into the camera. Then, the camera is switched to the low-power-consumption mode, and the processing ends.

Here, the types of the strobe mode for the camera according to this embodiment will be described.

The strobe mode for the camera includes (1) auto mode, in which a dark place, a back light state, an artificial light such as a fluorescent light or the like is detected and strobe light is emitted automatically;

(2) red-eye reducing mode, in which, for preventing a photograph of an object having red-eyes, the pupils of the object is contracted by multiple times of strobe preparation light emission or the lighting-up of the self-LED before the exposure starts when the strobe light emission is required in the auto mode;

(3) strobe-off mode, in which strobe light emission is forcibly stopped for shooting in a place where strobe shooting is inhibited or for taking photographs with the mood of the place;

(4) forced-light-emission mode, in which strobe light must be emitted in order to eliminate an unnatural shadow on an object, for example, or shades on the face of an object in a back-light scene;

(5) night-view mode, in which the exposure is adjusted for the background intensity and the brightness of the object is optimized through strobe light emission in order to take night-view photographs; and (6) night-view and red-eye reducing mode, in which the red-eye reducing effect is added to the night-view mode.

The strobe mode is sequentially changed by manipulating the strobe mode switch 36. The normal mode, self-timer using mode, remote control mode and camera-blur detecting mode are sequentially switched by operating the mode switching switch 35.

Figure 20:
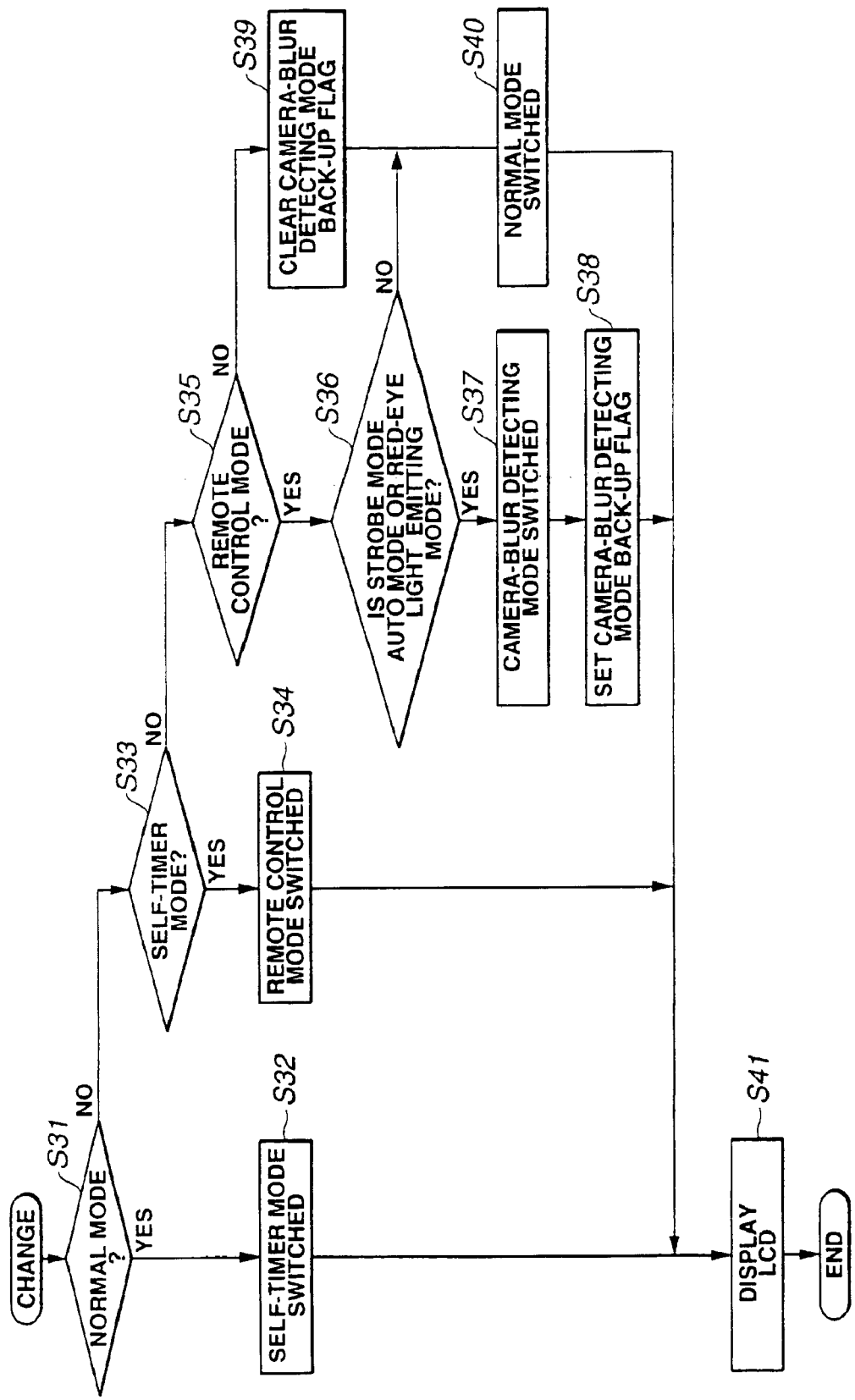
FIG. 20 is a flowchart for describing a mode change to the camera-blur detecting mode in the camera in FIG. 9.

Next, the mode switching to the camera-blur detecting mode (vibration detecting mode) will be described with reference to a flowchart shown in FIG. 20.

Since a user needs to set a mode, this sequence is started when the mode switching switch 35 is manipulated. First of all, it is determined whether the current mode is set in the normal mode or not (step S31). If it is determined that the normal mode is set (YES), the mode is switched to the self-timer mode (step S32). On the other hand, if it is determined that the current mode is not the normal mode (NO), it is determined whether the self-timer mode is set or not (step S33). Here, if the self timer mode is set (YES), the mode is changed to the remote control mode (step S34). On the other hand, if the self-timer mode is not set (NO), it is determined whether the remote control mode is set or not (step S35).

Here, if the remote control mode is set (YES), it is determined whether the current strobe mode is set in either auto mode or red-eye light emission mode before the mode is switched to the camera-blur detecting mode (step S36). If the current strobe mode is set in either one (YES), the mode is switched to the camera-blur detecting mode (step S37). Furthermore, the back-up flag for the camera-blur detecting mode is set (step S38).

Under a condition where the camera-blur detecting mode is set, the mode for inhibiting camera-blur detection is selected by manipulating the strobe mode switch 36 for clearing the camera-blur detecting mode. Then, the strobe mode for allowing the camera-blur detecting mode is set again. In this case, the back-up flag allows the automatic setting of the camera-blur detecting mode without the manipulation of the mode switching switch 35.

At the step S36, if the other strobe mode than the auto mode and the red-eye light emission mode is set (NO) and if the strobe forced-light-emission mode is set, a camera-blur preventing effect may occur, for example, because of strobe light emission. In the night-view mode or in the night-view and red-eye mode, the image detection by the AF sensor cannot be implemented since an object has low intensity at night. Thus, correct camera-blur detection cannot be achieved. Therefore, the mode is not switched to the camera-blur detecting mode but is switched to the normal mode (step S40). If it is determined at the step S35 that the remote control mode is not set (NO), it is determined that the camera-blur detecting mode is set. Then, the back-up flag for the camera-blur detecting mode is cleared, and the processing goes to the step S40 where the normal mode is set.

Figure 21:
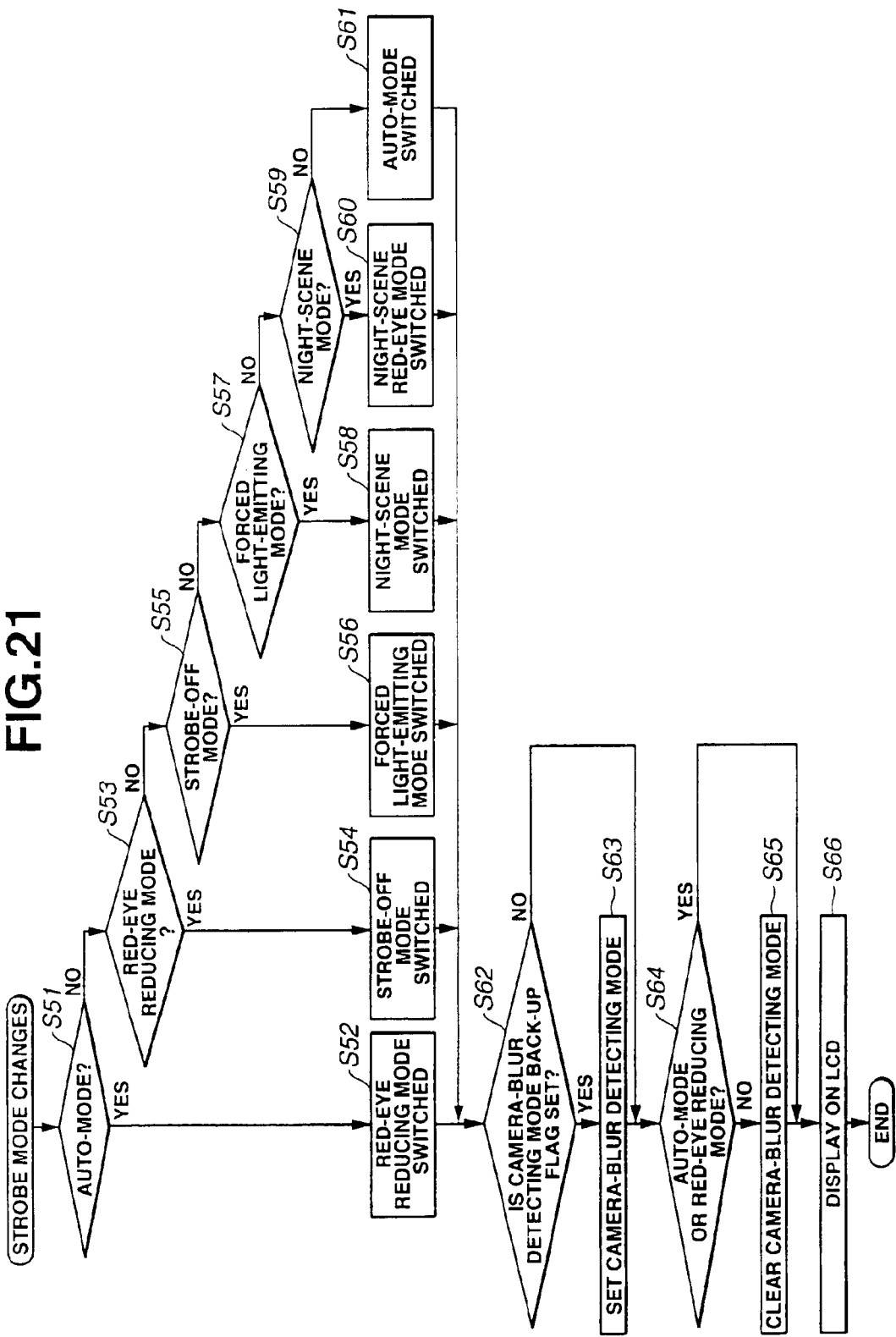
FIG. 21 is a flowchart for describing the changing of the strobe mode in the camera in FIG. 9.

The changing of the strobe mode will be described with reference to a flowchart shown in FIG. 21.

Since a user needs to set the strobe mode, this sequence is started by manipulating the mode switching switch 35. First of all, it is determined whether the current strobe mode is set in the auto mode or not (step S51). Here, if the auto mode is set (YES), the auto mode is switched to the red-eye reducing mode (step S52). On the other hand, if the auto mode is not set (NO), it is determined whether the red-eye reducing mode is set or not (step S53). Here, if the red-eye reducing mode is set (YES), the mode is switched to the strobe off mode (step S54). On the other hand, if the red-eye reducing mode is not set (NO), it is determined whether the strobe-off mode is set or not (step S55).

If it is determined that the strobe off set mode is set (YES), the mode is switched and is set to the forced-light emission mode (step S56). On the other hand, if the strobe off mode is not set (NO), it is determined whether the forced light emission mode is set or not (step S57). If it is determined that the forced-light emission mode is set (YES), the mode is switched and is set to the night-view mode (step S58). If the forced light emission mode is not set (NO), it is determined whether the night-view mode is set or not (step S59). If the night-view mode is set (YES), the night-view and red-eye reducing mode is set (step S60). If the night-view mode is not set (NO), it is determined that the night-view and red-eye mode is set. Then, the auto-mode is set (step S61).

Next, after the setting of these modes, it is determined whether the back-up flag for the camera-blur detecting mode is set or not (step S62). Here, if the flag is set (YES), the camera-blur detecting mode is set (step S63).

Next, it is determined whether the strobe mode (auto mode, red-eye reducing mode or strobe-off mode) allowing the selection of the camera-blur detecting mode is set or not (step S64). If it is determined that the strobe mode allowing the selection is set (YES), the camera-blur detecting mode is cleared (step S65). Then, the set modes are displayed on the LCD, and the above-described processing ends (step S66).

As described above, according to the third embodiment, the execution and termination of the camera-blur detecting mode may be switched in accordance with the setting of the strobe mode of the camera. Thus, when camera-blurs may easily occur in shooting, the camera-blur detecting mode may be set. Then, a warning is given when a camera-blur occurs such that the shooting person can recognize the occurrence of the camera blur. As a result, shooting without camera-blur failures can be achieved.

Furthermore, for detecting camera blurs for determining the correct holding, an optical sensor installed in the camera as a conventional sensor for distance measurement is used. Therefore, the occurrence of camera blurs can be determined in a highly reliable manner without any increase in costs.

By using a camera according to the third embodiment, the correct camera blur detection can be performed with a simple construction and without any increase in costs such that warnings against camera blurs can be given to a shooting person clearly.

Figure 22:
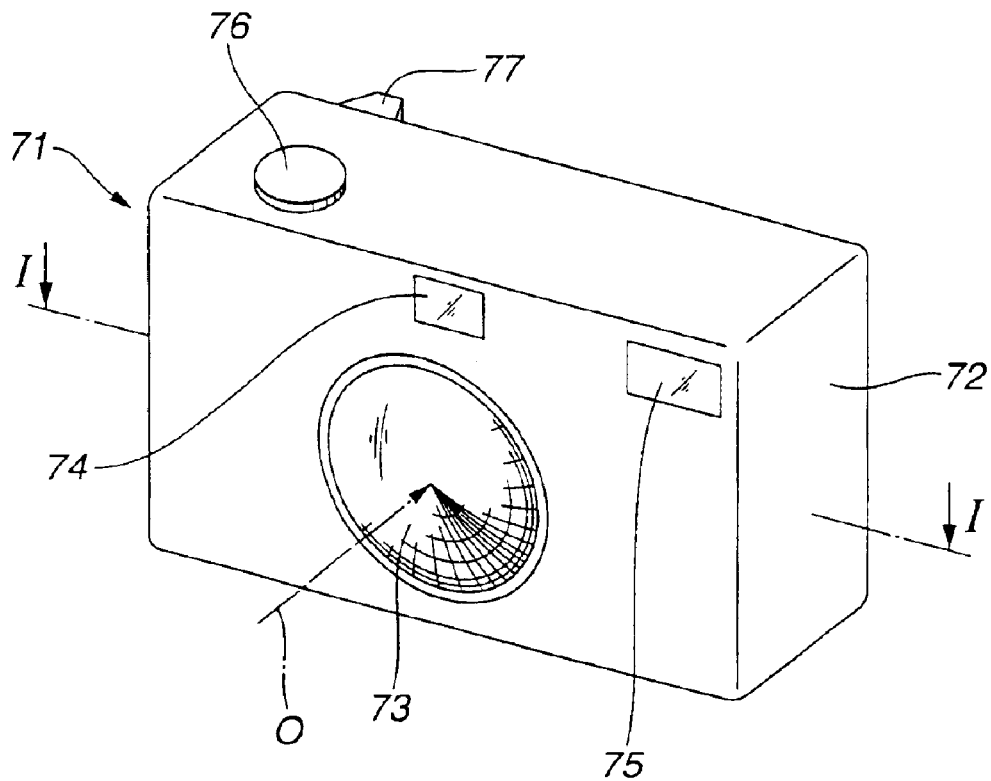
FIG. 22 is a perspective diagram showing an exterior of a camera containing a strobe apparatus according to a fourth embodiment of the invention.
Figure 23:
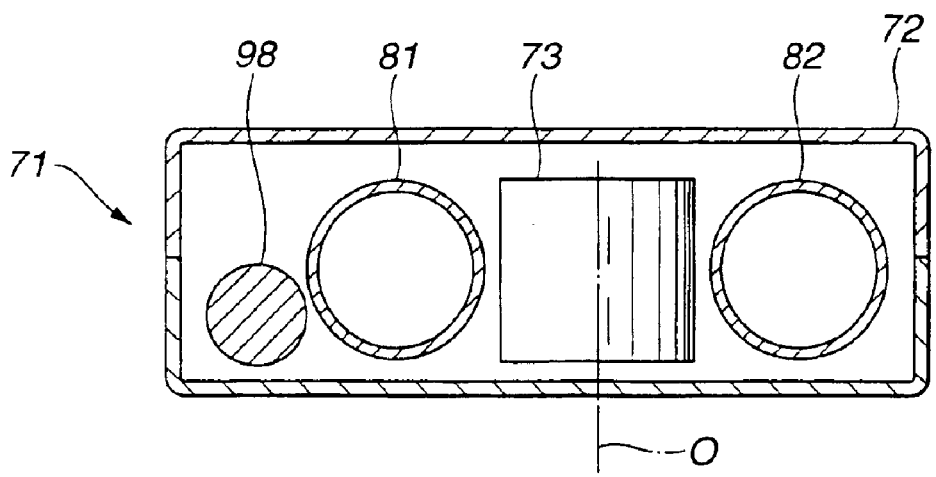
FIG. 23 is a section diagram taken at the line A—A in FIG. 22 and shows an internal arrangement of main components of the camera in FIG. 22.
Figure 24:
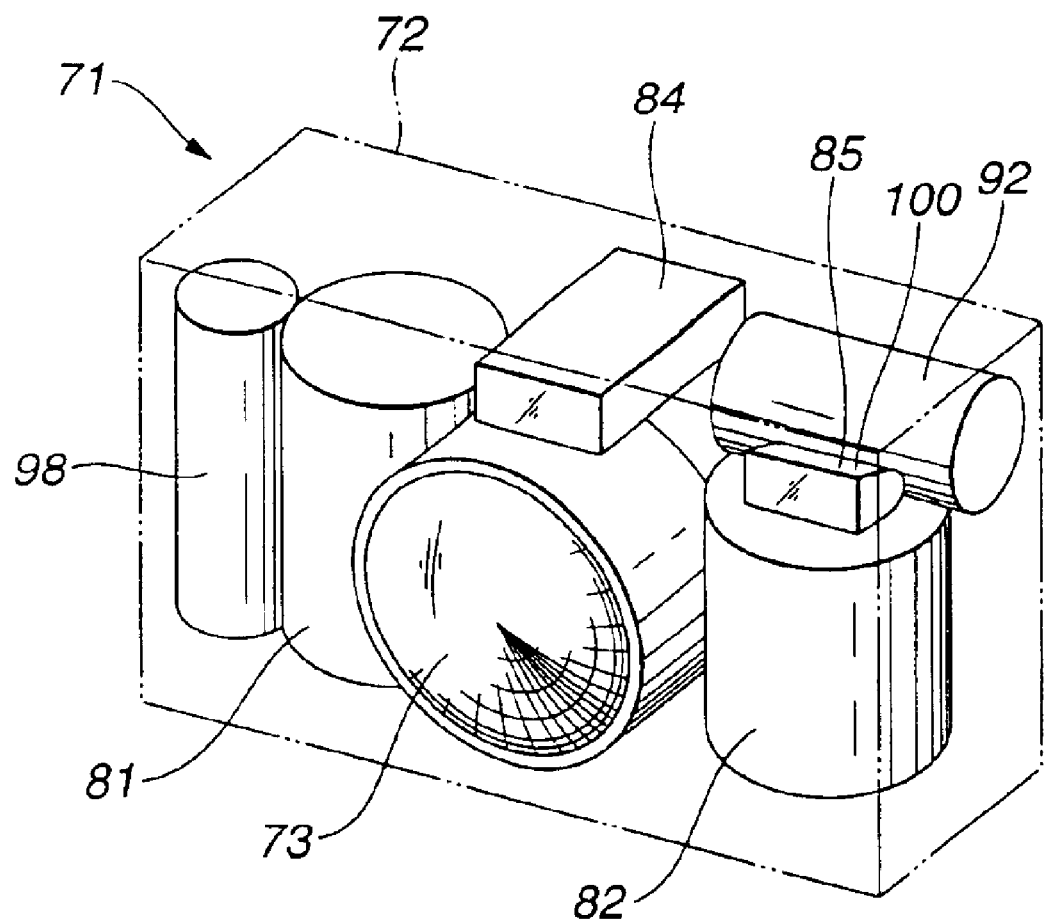
FIG. 24 is a perspective diagram showing the internal arrangement of the main components of the camera in FIG. 22.

FIG. 22 is a perspective diagram showing an exterior of a camera containing a strobe apparatus according to a fourth embodiment of the invention. FIG. 23 is a section diagram taken at the line I—I in FIG. 22 and shows an internal arrangement of main components of the camera. FIG. 24 is a perspective diagram showing an internal arrangement of main components of the camera in FIG. 22.

As shown in FIG. 22, a lens barrel unit 73, a finder window 74 and a strobe light-emitting window 75 are arranged on the front surface of an exterior (camera body cover) 72 of the camera 71 according to this embodiment. A release switch operation button 76 is arranged on the top surface of the exterior 72. A slidable zoom operation lever 77 is arranged on the back surface of the exterior 72.

As shown in FIG. 23, a cassette installing chamber 81 and a spool chamber 82 are located next to the lens barrel unit 73 in the camera 71. A main capacitor 98 for light emission of the strobe apparatus is arranged outside of the cassette installing chamber 81.

Furthermore, as shown in FIG. 24, a finder unit 84 is located above the lens barrel unit 73 and behind the finder window 74 in the camera 71. A strobe light emitting unit 85 of the strobe apparatus and a power source battery 92 are provided above the spool chamber 82 and behind the strobe window 85.

Figure 25:
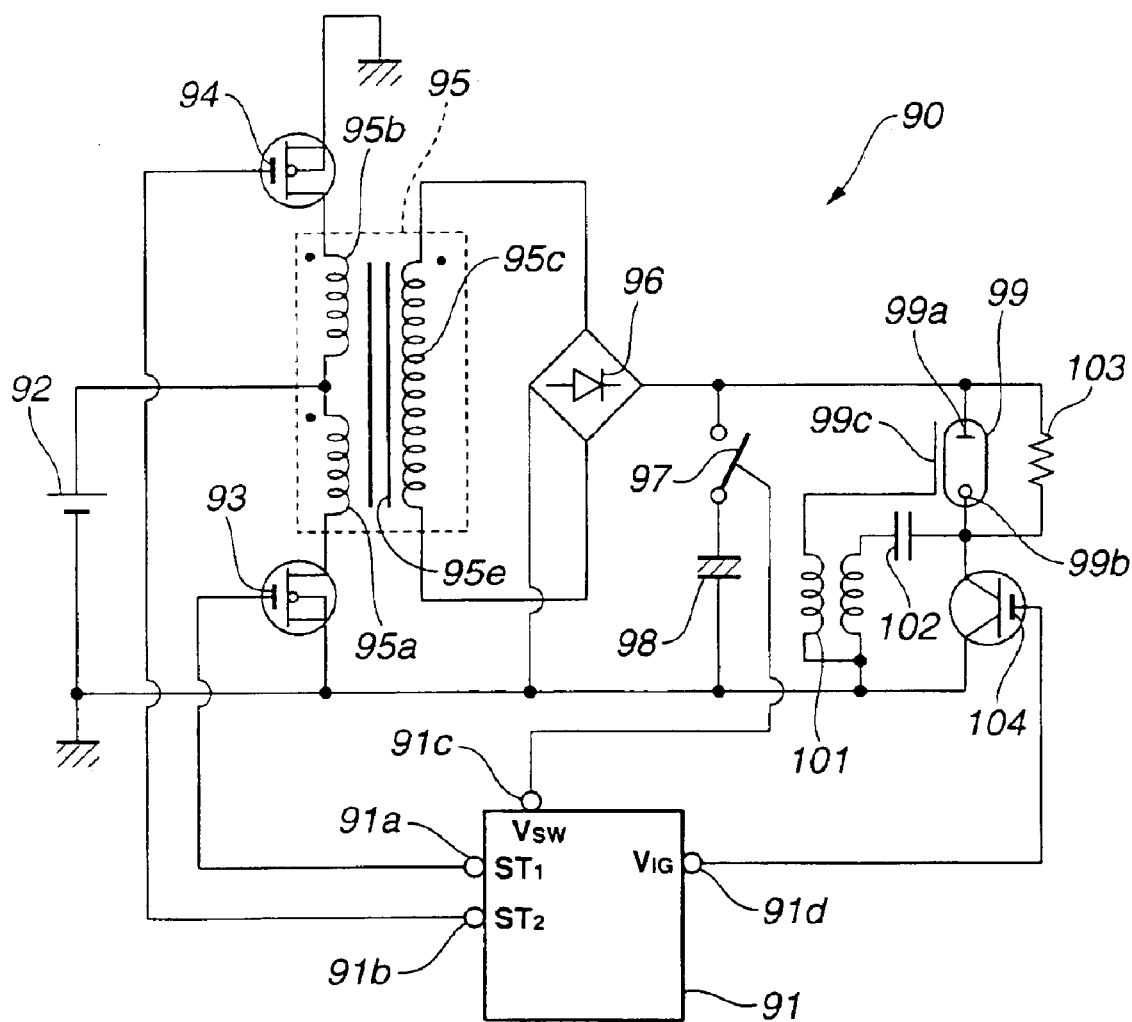
FIG. 25 is a strobe light emitting circuit of the strobe apparatus contained in the camera in FIG. 22.

The construction of the strobe apparatus in the camera 71 according to this embodiment will be described with reference to FIG. 25 showing a circuit for emitting strobe light.

The strobe apparatus has the strobe light emitting unit 85 and a strobe light emitting circuit 90.

The strobe light emitting unit 85 has a Xe tube 99 (in FIG. 25) and a reflection umbrella 100 (in FIG. 24). The Xe tube 99 is a single discharge tube containing xenon gas.

The Xe tube 99 has an anode side electrode 99a, a cathode side electrode 99b and a clear external electrode 99c. The external electrode 99c is a trigger electrode and is coated on the exterior of a glass tube so as not to prevent the light transmission.

As shown in FIG. 25, the strobe light emitting circuit 90 includes a control circuit portion 91, a battery 92, a step-up oscillation transformer 95, switching elements 93 and 94, a bridge diode 96, a light emission main capacitor 98, a relay switch 97, a trigger transformer 101, a trigger capacitor 102, a resistance element 103, and an insulated-gate bipolar transistor (IGBT) 104. The control circuit portion 91 is a control unit for controlling strobe light emission. The battery 92 is a power source for driving the camera. A step-up oscillation transformer 95 is a second light emitting unit and is used for applying high voltage to the Xe tube 99. The switching elements 93 and 94 are two MOS-FET. The main capacitor 98 is a first light emitting unit for storing charges for light emission. The relay switch 97 is connected to the main capacitor 98 and switches charge states. The trigger transformer 101, trigger capacitor 102 and resistance element 103 establish a trigger circuit. The IGBT 104 is a switching element for light emission.

The control circuit portion 91 is responsible for strobe light emission control and for control relating to shooting by the camera 71. The control circuit portion 91 includes an ST1 terminal 91a, an ST2 terminal 91b, a V-SW terminal 91c and a V-IG terminal 91d. The ST1 terminal 91a is an output terminal for turning ON/OFF the switching elements 93 and 94. The V-SW terminal 91c is an output terminal for turning ON/OFF the relay switch 97. The V-IG terminal 91d is an output terminal for turning ON/OFF the IGBT 104.

The oscillation transformer 95 mainly includes an iron core 95e, two primary windings 95a and 95b wounded about the iron core 95e and connected in series, and a secondary winding 95c wound about the iron core 95e and having more number of winds than that of the primary winding to generate high voltage.

One ends of the primary windings 95a and 95b are connected to the battery 92 in parallel, while the other ends are connected to the source sides of the switching elements 93 and 94.

Both ends of the secondary winding 95c are connected to two-input ends of the bridge diode 96.

One output terminal of the bridge diode 96 is connected to the relay switch terminal 97, the anode of the Xe tube 99 and the resistance element 103. The output voltage of the secondary winding 95c is applied to the anode side of the Xe tube 99 through the bridge diode 96.

The output terminal of the bridge diode 96 is connected to the primary side of the trigger transformer 101 of the trigger circuit through the resistance element 103 and the trigger capacitor 102. The secondary side of the trigger transformer 101 is connected to the external electrode 99c of the Xe tube 99, and high trigger voltage is applied to the secondary side of the trigger transformer 101.

The IGBT 104 is connected to the cathode side of Xe tube 99 together with the resistance element 103 and trigger capacitor 102 and turns ON/OFF the light-emission current I-ex of the Xe tube 99.

Next, an operation for strobe light-emission control in the strobe apparatus of the camera according to this embodiment having the above-described embodiment will be described with reference to the circuit diagram in FIG. 25 and FIGS. 26A to 26D, 27A to 27G, 28A to 28G.

The FIGS. 26A to 28G are time charts for signal waveforms in the strobe apparatus. FIGS. 26A to 26D are time charts while main capacitor for light emission is being charged. FIGS. 27A to 27G are time charts for an operation for emitting a large amount of light. FIGS. 28A to 28G are time charts for an operation for emitting a small amount of light.

The strobe apparatus allows the control for emission of a large amount of light by using charges stored in the main capacitor 98 for light emission and the control for emission of a small amount of light for causing the Xe tube 99 to emit light directly by using the output voltage of the oscillation transformer 95 by using the battery. The control for emission of a large amount of light is implemented when an amount of light required for exposure to a photograph medium (such as a photo-film and a CCD) in strobe-shooting is beyond a predetermined value. The control for emission of a small amount of light is implemented when an amount of light required for exposure to a photograph medium (such as a photo-film and a CCD) in the strobe shooting is equal to or below the predetermined value.

First of all, when charging operation to the main capacitor 98 for light emission will be described. An ON signal is output from the V-SW terminal of the control circuit portion 91 in an initial state, and the relay switch 97 is held in an ON state. Then, the main capacitor 98 becomes chargeable.

Then, pulse signals, which are ON/OFF signals, are output alternately from the ST1 terminal and ST2 terminal of the control circuit 91, and the switching elements 93 and 94 are alternately turned on and off. Thus, current is fed from the battery 92 to the primary winding 95a and primary winding 95b of the oscillation transformer 95. When current flows through the primary windings 95a and 95b, energy is conducted to the secondary winding 95c side of the oscillation transformer 95. Then, charges are stored into the main capacitor 98 through the bridge diode 96.

After the switching elements 93 and 94 are turned on and off repeatedly as shown in FIGS. 26A to 26D and the charging voltage Vc of the main capacitor 98 reaches a predetermined full charging voltage Vc0, the outputs of the ST1 terminal and ST2 terminal of the control circuit portion 91 are turned off. Furthermore, an OFF signal is output from the V-SW terminal to switch off the relay switch 97. Then, the charging operation ends. When the main capacitor 98 is charged, the trigger capacitor 102 is also charged. During the charging period, the V-IG terminal of the control circuit portion 91 is turned off, and the IGBT 104 is kept in the OFF state.

After the completion of the charging, the control for emission of a large amount of light is performed (FIGS. 27A to 27G). For example, when the release switch of the camera 71 is turned on (FIG. 27G), an ON signal is output from the V-SW terminal (FIG. 27A) by keeping the ST1 and ST2 terminals of the control circuit portion 91 in the OFF state. Then, the relay switch 97 is turned on. By turning on the relay switch 97, the main capacitor 98 can communicate with the anode side of the Xe tube 99.

Subsequently, an ON signal is output from the V-IG terminal of the control circuit portion 91 (FIG. 27D) when the shutter of the camera 71 is opened. Then, the IGBT 104 is switched to the conductive state, and charges stored in the trigger capacitor 102 are fed between the IGBT 104 and the primary winding of the trigger transformer 101. Then, energy is transmitted to the secondary winding side because of the current flowing through the primary winding. The energy having been transmitted to the secondary winding is converted to high voltage and is applied to the external electrode 99c of the Xe tube 99. Since the exterior electrode 99c of the Xe tube 99 exposes a very high resistance value, high trigger voltage is applied to the exterior electrode 99c.

In the Xe tube 99, xenon gas is excited because of the application of the trigger voltage, and insulating resistance decreases rapidly. Then, charges stored in the main capacitor 98 are fed to the ground side through the Xe tube 99 and the IGBT 104 as light emitting current I-xe (FIG. 27E), and the Xe tube 99 emits light.

When the amount of light emitted by the Xe tube 99 reaches a predetermined value, or when the light is emitted for a predetermined period of time, the output of the V-IG terminal of the control circuit portion 91 is turned off. Then, the IGBT 104 is brought into nonconduction, and the light emitting current I-xe is cut (FIG. 27E). Then, the light emission is terminated. The ST1 and ST2 terminals of the control circuit portion 91 are kept off even during the light emitting period of time (FIGS. 27B and 27C).

The control for emission of a large amount of light is suitable for strobe shooting, which discharges a large amount of charges stored in the light emission main capacitor 98 for a short period of time and requires a large amount of light to be emitted.

Next, the control for emission of a small amount of light will be described with reference to FIGS. 28A to 28G. The emission of small amount of light requires charging to the trigger capacitor 102 but does not require charging to the light emission main capacitor 98. Irrespective of the charging state of the main capacitor 98, the emission of a small amount of light described below is allowed, and the Xe tube 99 can emit light directly by using the power supply from the battery.

In the control for emission of a small amount of light, an OFF signal is output from the V-SW terminal of the control circuit portion 91 (FIG. 28A), and the relay switch 97 is kept in the OFF state. When the release switch of the camera 71 is turned on (FIG. 28G), the trigger capacitor 102 having a much smaller capacity than that of the main capacitor 98 is charged through the oscillation transformer 95. Then, the V-IG terminal of the control circuit portion 91 is turned on (FIG. 28D). When the IGBT 104 is brought to conduction in response to ON of the V-IG terminal, the charges stored in the trigger capacitor 102 flow between the IGBT 104 and the primary winding of the trigger transformer 101. Because of the current fed to the primary winding, energy is transmitted to the secondary winding side. The energy having been transmitted to the secondary winding side is converted to voltage, and the voltage is applied to the exterior electrode 99c of the Xe tube 99. Since the exterior electrode 99c of the Xe tube 99 has a very high resistance value, high trigger voltage is applied to the exterior electrode 99c.

The xenon gas in the Xe tube 99 is excited because of the application of the trigger voltage, and the insulating resistance decreases rapidly.

After the V-IG terminal of the control circuit portion 91 is turned on, ON and OFF signals are output alternately from the ST1 terminal and ST2 terminal, and the switching elements 93 and 94 are turned on and off alternately. Because of the ON and OFF, current is fed from the battery 92 alternately to the primary winding 95a and primary winding 95b of the oscillation transformer 95. When current flows through the primary windings 95a and 95b, energy is transmitted to the secondary winding 95c side of the oscillation transformer 95. Then, pulsating discharging voltage is applied to the anode side of the Xe tube 99 through the bridge diode 96. Since the Xe tube 99 is exciting as described above, light-emission current I-xe flows therethrough (FIG. 28E) and emits light. During the light emission, the shutter of the camera 71 is open (FIG. 28F).

When the light emission time of the Xe tube 99 reaches a predetermined time, the outputs of the V-IG terminal, ST1 terminal and ST-2 terminal of the control circuit portion 91 are turned off. Thus, the light emission by the Xe tube 99 is terminated (FIGS. 28B to 28E).

The control for emission of a small amount of light is suitable for strobe shooting using a small amount of emitted light and having a longer light emitting time. This is because the light emission current I-ex is a series of small energy occurring in the primary winding 95a or 95b of the oscillation transformer 95 in a short cycle where the ST1 terminal or ST2 terminal of the control circuit portion 91 is ON.

Next, strobe light emitting processing to be invoked in the shooting sequence processing in the camera 71 according to this embodiment will be described with reference to FIGS. 29 and 30.

Figure 29:
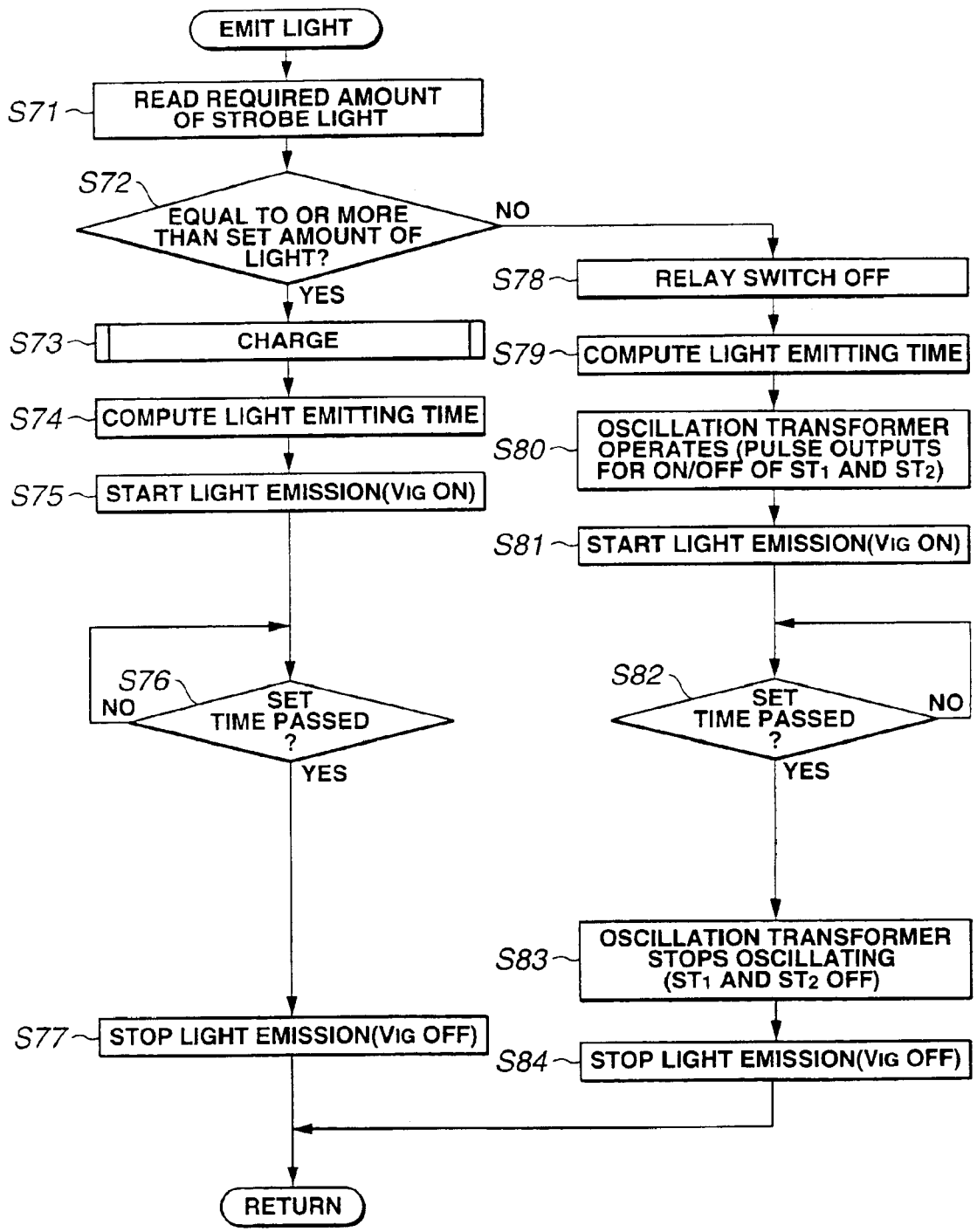
FIG. 29 is a flowchart of strobe light emitting processing in the strobe apparatus in FIG. 25.

FIG. 29 is a flowchart for the strobe light-emitting processing. FIG. 30 is a flowchart for charging processing, which is a sub-routine to be invoked during the strobe light emitting processing.

The strobe light emitting processing in FIG. 29 is performed under the control of the control circuit portion 91. First of all, at a step S71, an amount of strobe light required for strobe shooting is read and is set in the control circuit portion 91. It is determined at a step S72 whether the set strobe light amount is equal to or above a predetermined value or not. If the strobe light amount is equal to or above the predetermined value, the processing goes to a step S73 where processing for emitting a large amount of light is performed. If the strobe light amount is below the predetermined value, the processing goes to a step S78 where processing for emitting a small amount of light is performed.

Figure 30:
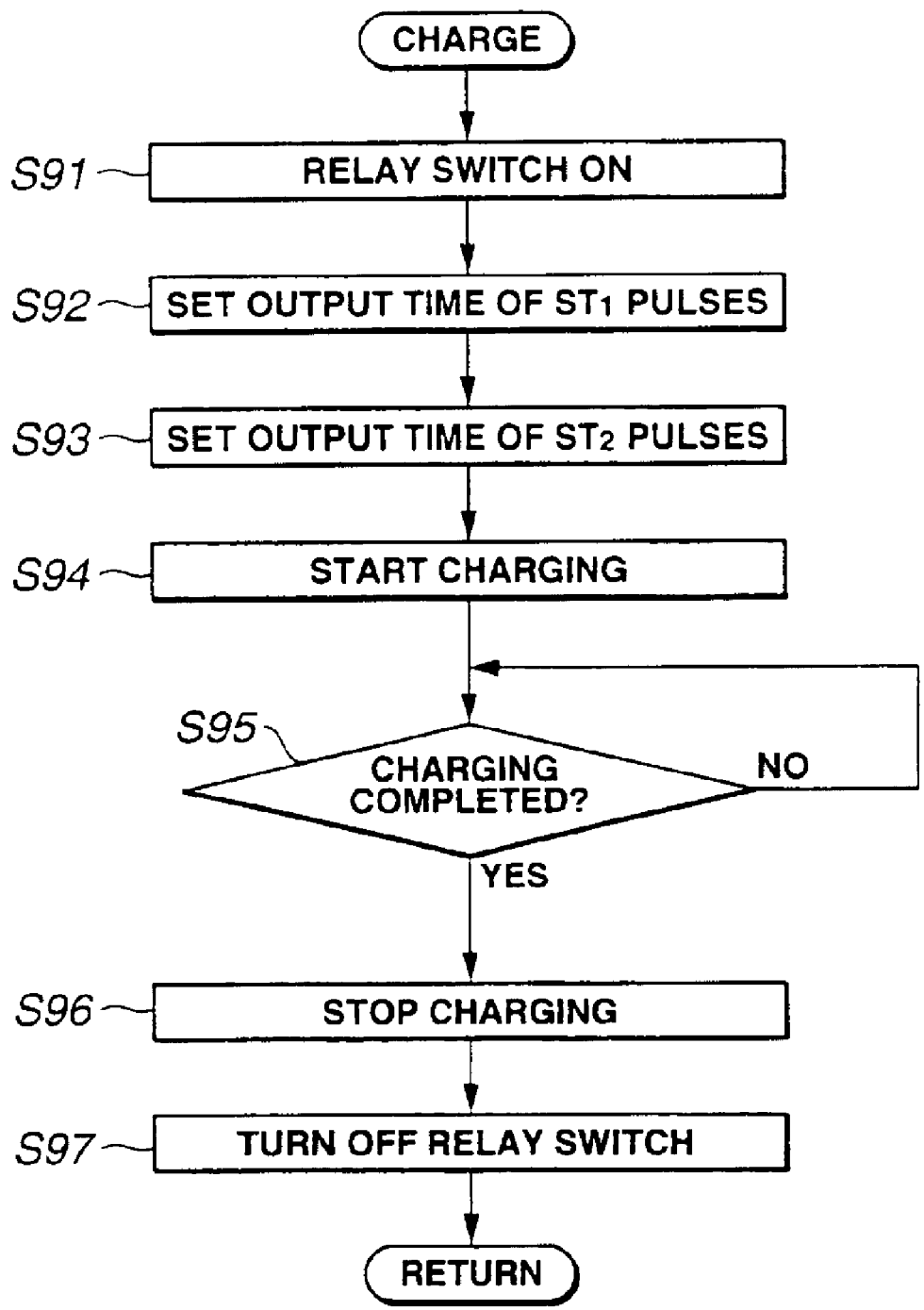
FIG. 30 is a flowchart of charging processing, which is a sub-routine invoked in the strobe light emitting processing in FIG. 29.

At the step S73, the sub-routine, the charging processing, shown in FIG. 30 is invoked. In other words, the relay switch 97 is turned on at a step S91, and the pulse output time for turning on/off the ST1 terminal and ST2 terminal of the control circuit portion 91 are set at steps S92 and S93.

ON/OFF pulse signals are output from the ST1 terminal and ST2 terminal of the control circuit portion 91 at a step S94, and the charging to the main capacitor 98 is started. When the completion of the charging is detected at a step S95, the outputs of the ST1 terminal and ST2 terminal of the control circuit portion 91 are turned off at a step S96. Then, the charging is terminated.

The output signal of the V-SW terminal of the control circuit portion is turned off at a step S97, and the relay switch 27 is turned off. Then, this sub-routine ends, and the processing returns to a step S74 of the light-emitting processing routine.

At the step S74, the light emitting time for emitting a set amount of light is computed. At a step S75, the output of the V-IG terminal of the control circuit portion 91 is turned on, and the IGBT 104 is turned on. At the same time, the relay switch 97 is turned on, and a large amount of the light-emission of the Xe tube 99 is started. While a large amount of light emitting current I-xe is fed to the Xe tube 99 as shown in FIG. 27, and a much larger amount of light than the light emitted in the mode for emitting a small amount of light is emitted.

After a lapse of the set time for light emission is determined at a step S76, the processing goes to a step S77. At the step S77, the output of the V-IG terminal of the control circuit portion 91 is turned off, and the IGBT 104 is turned off. Then, the light emission is terminated, and this routine ends.

On the other hand, when it is determined at a step S72 that the set amount of light is small, the processing jumps to a step S78. At the step S78, the output signal of the V-SW terminal of the control circuit portion 91 is turned off, and the relay switch 97 is kept in the OFF state. At a step S79, a light emitting time for emitting the set amount of light is computed. At a step S80, ON/OFF pulses are output from the ST1 terminal and ST2 terminal of the control circuit portion 91, and the oscillation transformer 95 becomes active. Furthermore, at a step S81, the V-IG terminal of the control circuit portion 91 is turned on, and the IGBT 104 is turned on. Thus, the light emission by the Xe tube 99 is started. In the light emission state here, a small amount of light is continuously emitted as shown in FIG. 28.

At a step S82, if a lapse of the set time for emitting light is detected, the processing goes to a step S83. At the step S83, the output signals of the ST1 terminal and ST2 terminal of the control circuit portion 91 are turned off, and the oscillation by the oscillation transformer 95 is terminated. At a step S84, the V-IG terminal of the control circuit portion 91 is turned off, and the IGBT 104 is turned off. Then, the light emission is terminated, and this routine ends.

By using a single Xe tube in the camera 71 containing a strobe apparatus according to the fourth embodiment, the emission of a large amount of light using a conventional main capacitor for light emission or the emission of a small amount of light using power supply directly from a battery can be selected in accordance with the amount of required light to be emitted. Thus, the strobe shooting in a wider range can be achieved. Especially, the strobe shooting by using the emission of a small amount of light is suitable for serial shooting since the time for charging to a main capacitor is not necessary. Furthermore, since snapping only depends on the oscillation of the oscillation transformer, any shutter timing cannot be missed during time for waiting a charging operation.

By using a strobe apparatus of a camera according to the fourth embodiment, a single discharge tube may be applied to implement the emission of a large to small amount of light required for strobe shooting. Therefore, a camera, which can snap well in serial shooting, can be provided.

Figure 31:
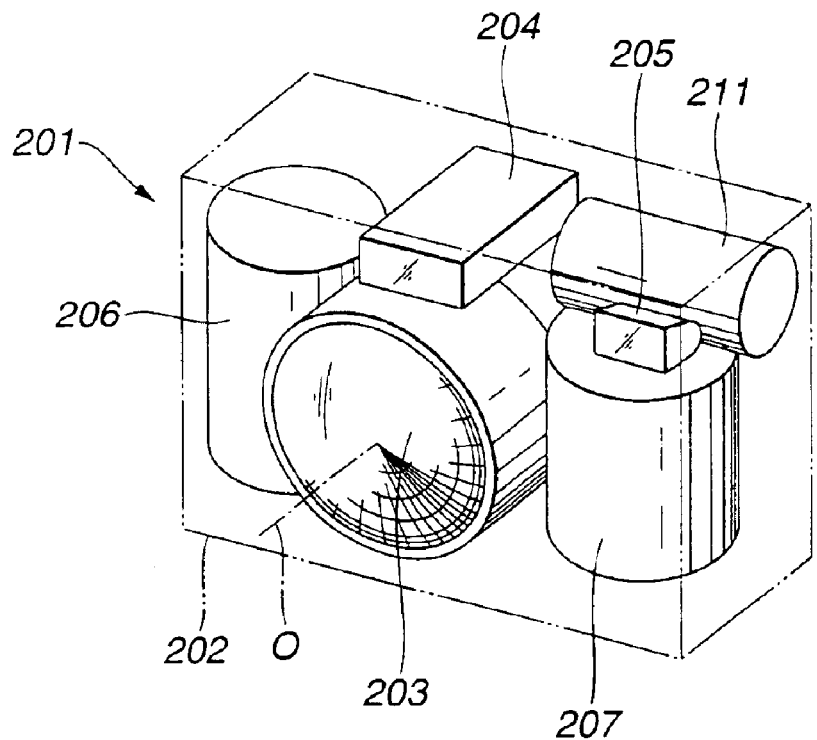
FIG. 31 is a show-through perspective diagram showing an internal arrangement of a camera containing a strobe apparatus, which is a discharge light emitting apparatus, according to a fifth embodiment of the invention.
Figure 32:
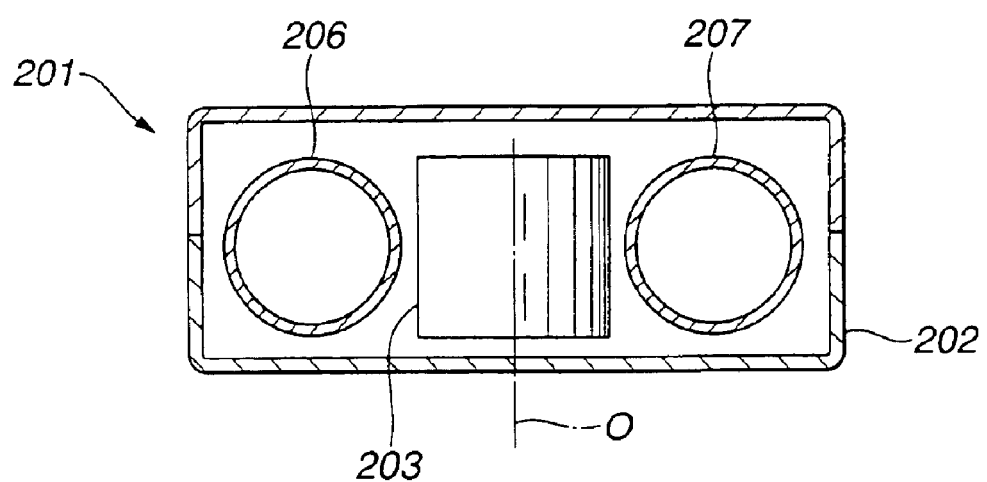
FIG. 32 is a cross section diagram at the center of the camera in FIG. 31 and shows an internal arrangement of main components of the camera.
Figure 33:
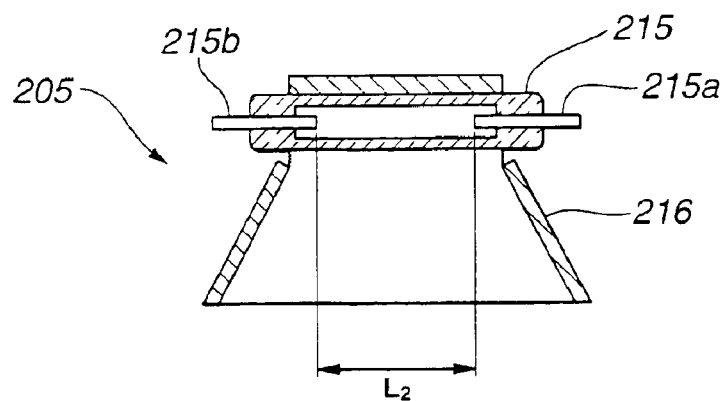
FIG. 33 shows a section diagram of a strobe light emitting unit of the strobe apparatus contained in the camera in FIG. 31.
Figure 34:
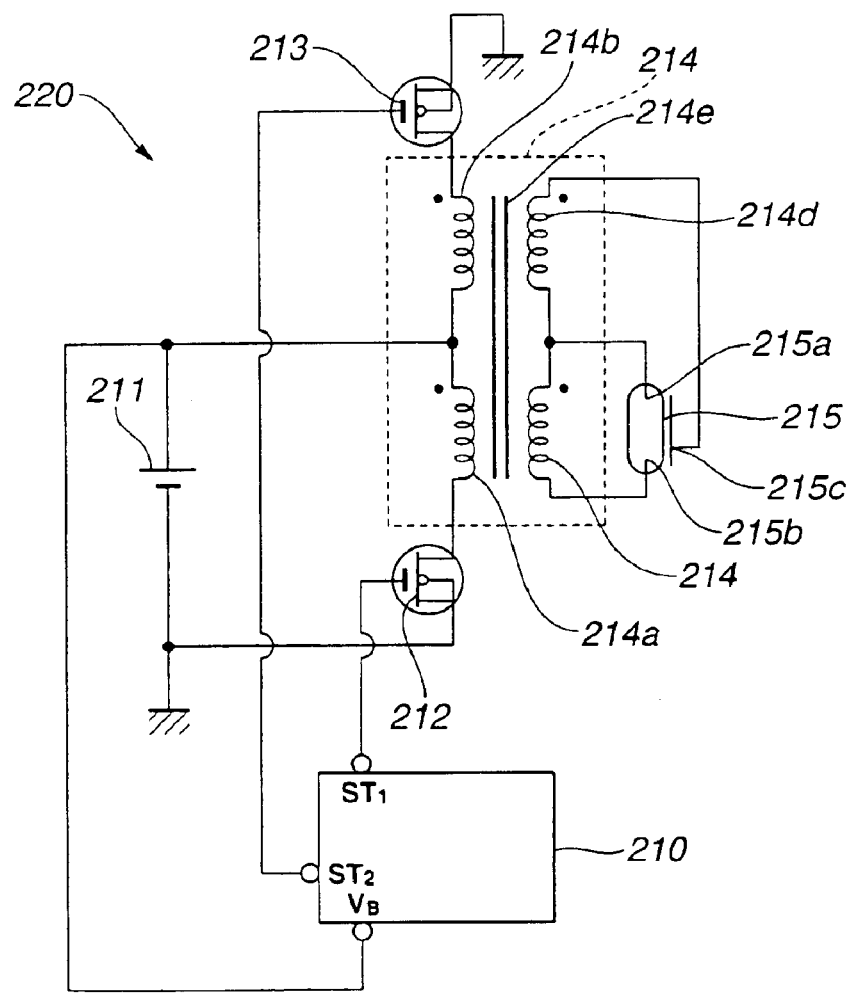
FIG. 34 is a circuit diagram of the strobe light emitting circuit of the strobe apparatus contained in the camera in FIG. 31.

FIG. 31 is a show-through perspective diagram showing an internal arrangement of a camera containing a strobe apparatus, which is a discharge light emitting apparatus, according to a fifth embodiment of the invention. FIG. 32 is a cross-sectional diagram of a center part of the camera and shows an arrangement of main components within the camera body. FIG. 33 shows a section diagram of a strobe light emitting unit of the strobe apparatus. FIG. 34 is a circuit diagram of a strobe light emitting circuit in the strobe apparatus.

As shown in FIGS. 31 and 32, the camera 201 according to this embodiment is a compact type camera. Under the exterior (camera body cover) 202, a lens barrel unit 203 having an optical axis O is provided. Furthermore, a cassette installing chamber 206 and a spool chamber 207 are located on both sides of the lens barrel unit 203. A finder unit 204 is located above the lens barrel 203, and a strobe light emitting unit 205 and a power source battery 211 are located next to the finder unit 204.

The strobe apparatus includes the strobe light emitting unit 205 and a strobe light emitting circuit 220 (FIG. 34), which will be described later. The strobe light emitting unit 205 has an Xe tube 215 and a reflection umbrella 216 as shown in FIG. 33. The Xe tube 215 is a light emitting discharge tube containing xenon gas.

The Xe tube 215 has discharge electrodes 215a and 215b and a clear exterior electrode 215c. The discharge electrodes 215a and 215b do not have any polarities. The exterior electrode 215c is a trigger electrode and is coated on the exterior of a glass tube so as not to prevent light transmission. As shown in FIG. 33, the discharge electrodes 215a and 215b are spaced apart by an inter-electrode distance L2. The inter-electrode distance L2 is set shorter than an inter-electrode distance L1 of an Xe tube to be applied in the strobe apparatus using the conventional light emission capacitor. This is because the discharge application voltage for the light emission by the Xe tube 215 is lower than the discharge application voltage for the light emission by the conventional Xe tube. Therefore, the strobe light emitting unit 205 takes up less space within the camera 201.

As shown in FIG. 34, the strobe light emitting circuit 220 has a control circuit portion (such as a CPU) 210, a battery 211, a step-up oscillation transformer 214, a first switching element 212 and a second switching element 213. The control circuit portion 210 is a control unit for controlling strobe light emission. The battery 211 is a power source for driving a camera. The step-up oscillation transformer 214 is used for applying high voltage to the Xe tube 215. The first switching elements 212 and second switching element 213 are two MOS-FET.

The control circuit portion 210 is responsible for strobe light emission control and for control relating to shooting by the camera 201.

The oscillation transformer 214 mainly includes an iron core 214e, two primary windings 214a and 214b wounded about the iron core 214e and connected in series to each other, a first secondary winding 214c and a second secondary winding 214d. The first and second secondary windings 214c and 214d are wound about the iron core 214. The second secondary winding 214d is a high-voltage applying unit.

One common end of the primary windings 214a and 214b is connected to the battery 211 in parallel. The other ends are connected to the source side of the switching elements 212 and 213.

One end of the first secondary winding 214c is an output end common to the second secondary winding 214d and is connected to one discharge electrode 215a of the Xe tube 215. The other output end of the first secondary winding 214c is connected to the other discharge electrode 215b of the Xe tube 215. Discharge voltage (light emitting voltage) for feeding light emitting current I-xe is applied between the common terminal and the other output end of the first secondary winding. The output terminal side of the second secondary winding 214d is connected to the exterior electrode 215c, which is a trigger electrode of the Xe tube 215. Trigger voltage V-tr is high voltage for excitation and is applied between the other output end of the second secondary winding 214d and the common terminal.

The control circuit portion 210 includes an ST1 terminal, an ST2 terminal and a VB detecting terminal for power source voltage detection. The ST1 terminal and ST2 terminal are connected to the gates of the switching elements 212 and 213 for switching-driving the switching elements 212 and 213 alternately. The VB detecting terminal is connected to the battery connecting end of the primary windings 214a and 214b.

Next, a control operation for strobe light emission in a strobe apparatus of a camera according to this embodiment having the above-described construction will be described with reference to FIGS. 34 and 35A to 35H.

FIGS. 35A to 35H are time charts for signal waveforms in the strobe apparatus.

When strobe shooting is performed by using the camera 201 according to this embodiment, ON and OFF signals are alternately output (FIGS. 35A and 35B) as pulse signals from the ST1 and ST2 terminals of the control circuit portion 210 for performing oscillation for trigger application based on the ON signal at the release switching (FIG. 35H). Then, current is alternately fed to the primary windings 214a and 214b of the oscillation transformer 214 through the switching elements 212 and 213. In other words, when an ON signal is output from the ST1 terminal of the control circuit portion 210, the switching element 212 is turned on. Thus, current is fed from the battery 211 to the primary winding 214a of the oscillation transformer 214. Energy from the current to the primary winding 214a is transmitted to the secondary windings 214c and 214d side. Here, since the Xe tube 215 has not emitted light yet, the inter-electrode resistance value is infinite. Thus, the output sides of the secondary windings 214c and 214d have a high impedance. Therefore, high voltage in the opposite direction against the current direction of the primary winding 214a occurs in the secondary winding 214d. The high voltage is applied to the external electrode 215c of the Xe tube 215 as the trigger voltage V-tr (FIG. 35C).

Subsequently, an OFF signal is output from the ST1 terminal while an ON signal is output from the ST2 terminal at the same time. Because of the OFF and ON signals, the switching element 212 is turned off while the switching element 213 is turned on. Thus, current can flow through the primary winding 214b. The current to flow through the primary winding 214b flows in the opposite direction of the current flowing the primary winding 214a. Thus, the direction of the current flowing through the secondary windings 214c and 214d are switched to the opposite direction, and the direction of the occurring energy is switched to the opposite direction. As a result, the trigger voltage V-tr to be applied to the external electrode 215c of the Xe tube 215 has the opposite sign of the one for turning on the ST1 terminal at the output terminal of the secondary winding 214d.

As described above, the ST1 and ST2 terminals of the control circuit portion 210 are alternately turned on and off, and when the trigger voltage V-tr is applied to the Xe tube 215, xenon gas within the Xe tube 215 is excited. Then, the resistance between the discharging electrodes 215a and 215b is reduced, and current I-xe tries to flow into the Xe tube 215. In this case, since the output signals of the ST1 and ST2 terminals of the control circuit portion 210 are repeatedly and alternately turned on and off, the direction of the light emitting current I-xe flowing between the discharging electrodes 215a and 215b of the Xe tube 215 changes in accordance with the ON and OFF (FIG. 35D). When the light emitting current I-xe can flow, high voltage does not occur in the external electrode 215c of the Xe tube 215.

When the current I-xe flows through the Xe tube 215 in this way, the Xe tube 215 emits light (FIG. 35F). When the current I-xe flows, the impedance in the secondary windings 214c and 214d of the oscillation transformer 214 decreases. Therefore, the current flowing through the primary windings 214a and 214b increases. With the increase in current flowing through the primary windings 214a and 214b, the power source voltage of the battery 211 decreases. The decrease in power source voltage is monitored through the VB detecting terminal for the power source voltage of the control circuit portion 210 such that the start of light emission can be recognized (FIG. 35E).

After the start of the light emission by the Xe tube 215 is detected, the ON/OFF cycles of the ST1 and ST2 terminals are set at proper values, such as values for shorter cycles, suitable for the adjustment of a light amount in the control circuit portion 210. Since the light emitting current I-xe repeatedly flows as shown in FIG. 35D, the xe tube 215 has a so-called flat light-emitting state where a predetermined amount of light is continuously emitted multiple times.

After the start of the light emission by the Xe tube 215, the ST and ST2 terminals of the control circuit portion 210 are turned off in accordance with the instruction for the termination of the light emission from the camera control portion. Thus, the light emission by the Xe tube 215 is terminated. At the same time, the shutter of the camera is closed.

Next, a shooting sequence including strobe shooting in the camera 201 according to this embodiment will be described with reference to a flowchart for shooting processing in FIG. 36.

Figure 36:
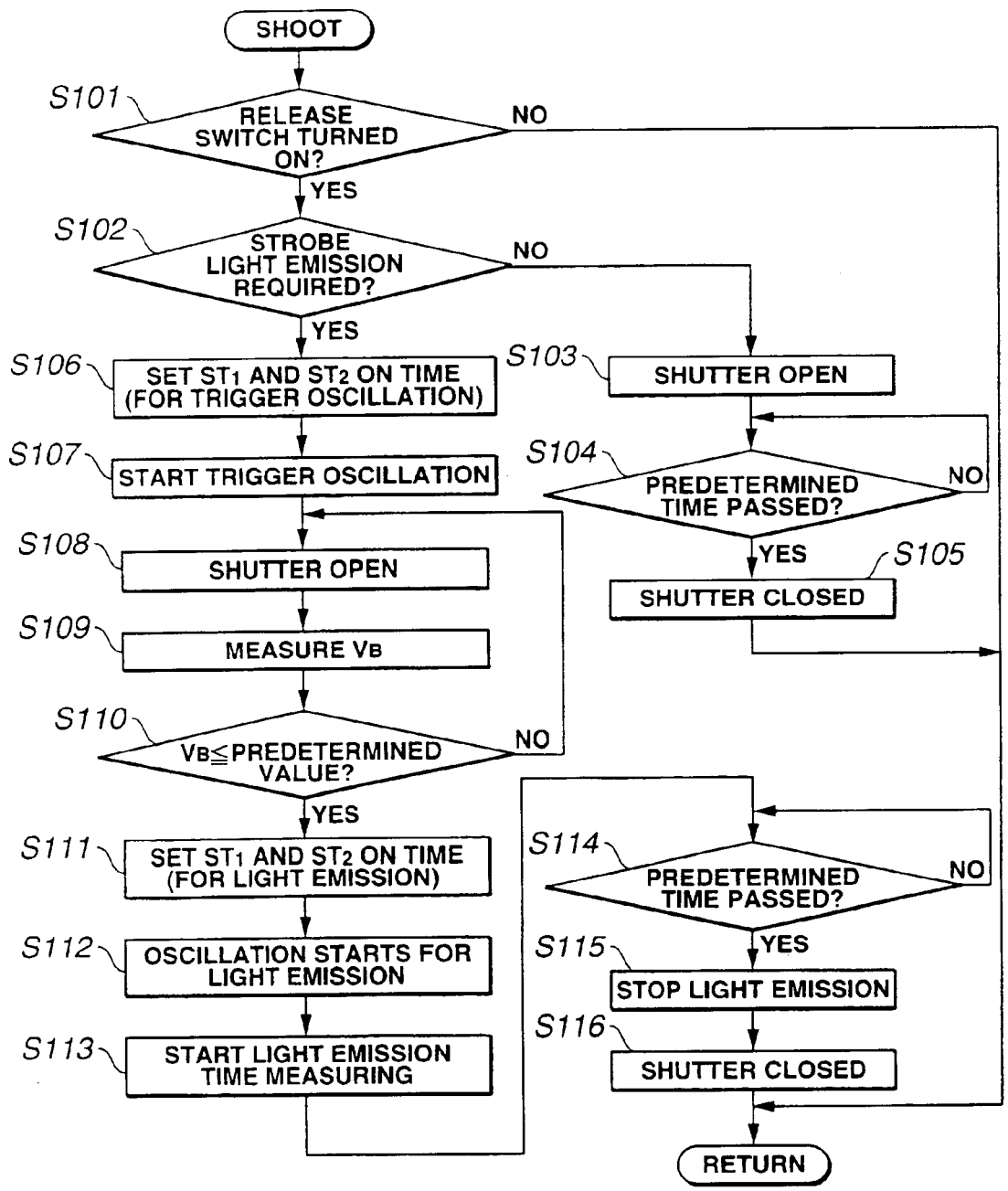
FIG. 36 is a flowchart of shooting processing in the camera in FIG. 31.

The shooting processing in the camera 201 as shown in FIG. 36 is performed under the control of the control circuit portion 210. First of all, when ON of the release switch is detected at a step S101, the processing goes to a step S102 where it is determined based on light measurement data of an object whether strobe light emission is required during the exposure or not. If it is determined that the strobe light emission is not required, the processing jumps to the step S103. If it is determined that the strobe light emission is required, the processing goes to a step S106.

At the step S103, the shutter is opened, and a lapse of a predetermined exposure time is waited without strobe light emission at a step S104. Then, the shutter is closed at a step S105, and this routine ends.

At the step S106, the ON times of the ST1 and ST2 terminals of the control circuit portion 210 is set as a trigger oscillation cycle. At a step S107, the ST1 and ST2 terminals are turned on and off in the cycle of the set time. Thus, current is fed to the primary windings 214a and 214b alternately, and the trigger oscillation is started. Then, trigger voltage V-tr is applied to the external electrode of the Xe tube 215 through the second secondary winding 214d. At a step S108, the shutter is opened.

At a step S109, the power source voltage of the VB detecting terminal of the control circuit portion 210 is checked. If a fact that the voltage of the VB terminal decreases to or below a predetermined value is detected, light emitting current I-xe is fed to the Xe tube 215 through the primary windings 214a and 214b. Thus, it is determined that the Xe tube 215 has started light emission, and the processing goes to a step S111.

At the step S111, the ON times of the ST1 and ST2 terminals of the control circuit portion 210 are set as an oscillation cycle for light emission. At a step S112, the primary windings 214a and 214b are turned on and off in the oscillation cycle for light emission set at the step S111, and the light emission by the Xe tube 215 is implemented.

At a step S113, the measurement of the light emitting time is started. At a step S114, if it is detected that the light emitting time reaches a predetermined time set in the control circuit portion 210 and the exposure ends. The processing goes to a step S115. At the step S115, the ST1 and ST2 terminals of the control circuit portion 210 are turned off, and the light emission of the Xe tube 215 is terminated. At a step S116, the shutter is closed, and this routine ends.

In a strobe apparatus contained in the camera 201 according to this embodiment, a light emission capacitor is not required for storing charges for light emission, which has been applied in a conventional strobe apparatus. Therefore, the storage space is not necessary. Furthermore, a trigger transformer and/or trigger capacitor are not necessary. Therefore, the size of the camera can be reduced, and the construction of the strobe apparatus can be simplified, which also simplifies the assembly.

Since the capacitor for light emission is not required, charging time, which is usually long, is not required. Thus, any shutter chance cannot be missed due to the time for waiting the charging operation. The period for applying the trigger voltage V-tr to the external electrode 215c of the Xe tube 215 through the second secondary winding 214d is very short. Therefore, shutter chances may not be missed.

Continuous light emission can be achieved because the light emission state of the Xe tube 215 is controlled by repeating ON and OFF of the ST1 and ST2 terminals of the control circuit portion 210. Thus, a proper amount of light can be emitted.

As described above, by using a discharge light emitting apparatus according to the fifth embodiment of the invention, the energy of the power source can be directly used by the discharge tube to emit light. Therefore, a capacitor for storing charges is not required, and the time for charging to the capacitor for storing charges is not necessary. As a result, the light emission can be started fast.

Next, a camera having a strobe apparatus according to a sixth embodiment of the invention will be described with reference to FIGS. 37 to 39.

Figure 37:
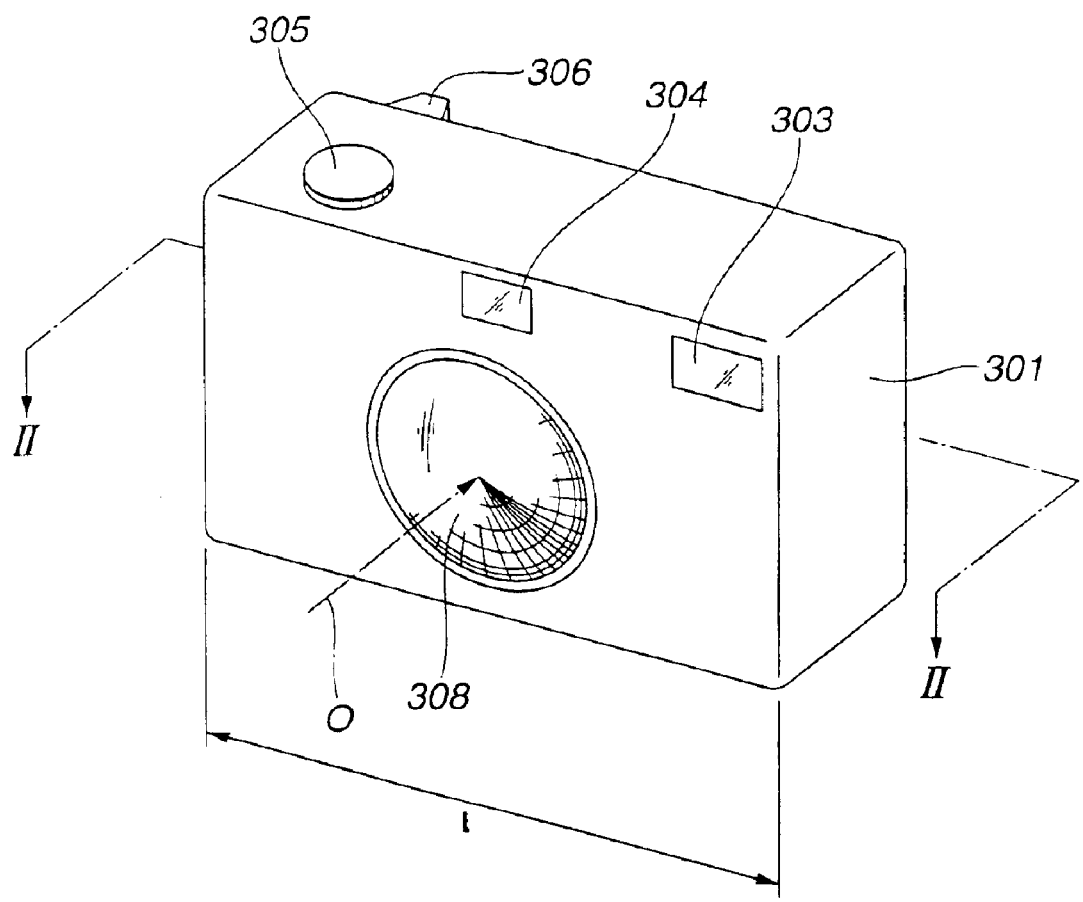
FIG. 37 is an exterior perspective diagram of a camera having a strobe apparatus according to a sixth embodiment of the invention, which is diagonally viewed from the upper right.

FIG. 37 is an exterior perspective diagram of the camera having a strobe apparatus according to the sixth embodiment, which is viewed from the upper right side. FIG. 38 is a section diagram taken at the line II—II in FIG. 37. FIG. 39 is a show-through perspective diagram schematically showing an internal construction of the camera in FIG. 37.

As shown in FIG. 37, a lens barrel 308 is located at the center of the front surface of an external cabinet 301 forming the camera body. The lens barrel 308 has a shooting optical system for shooting an object. A finder window 304 is located above the lens barrel 308. The finder window 304 is used for optically observing an object. Furthermore, a strobe light emission window 303 is provided at the upper right of the lens barrel 308. The strobe light emission window 303 is used for irradiating strobe light to an object.

A release button 305 is located on the left side of the upper surface of the camera exterior cabinet 301. Furthermore, a zoom button 306 is located on the left side of the back surface of the camera exterior cabinet 301. The zoom button 306 is used by a shooting person for shooting in order to drive the lens barrel 308 for setting an arbitrary magnification for shooting an object.

In the sixth embodiment, the longitudinal length of the camera exterior cabinet 301 is "l".

Figure 38:
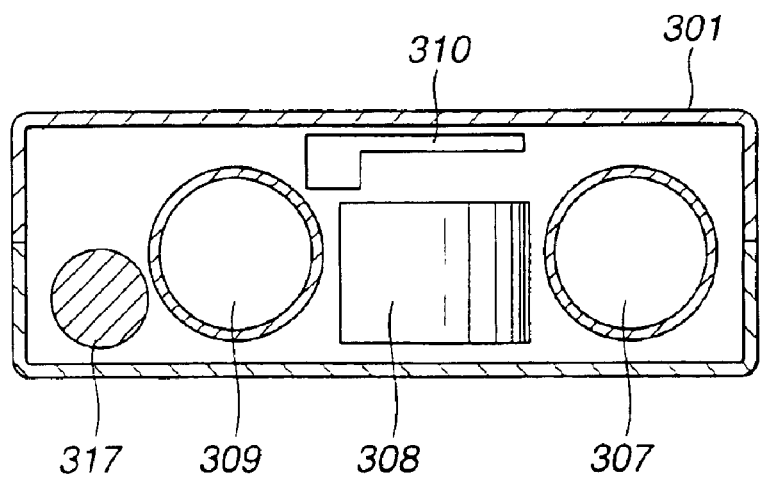
FIG. 38 is a section diagram taken at the line II—II in FIG. 37.

As shown in FIG. 38, the lens barrel 308 is held at the center of the camera exterior cabinet 301 movably in an optical axis direction O. A file cassette chamber 309 is provided on the left. A file spool chamber 307 for winding the film is provided on the right of the lens barrel 308. Furthermore, a focal plane shutter 310 is provided on the back surface of the lens barrel 308. A main capacitor 317 for strobe is provided on the left of the film cassette chamber 309.

Figure 39:
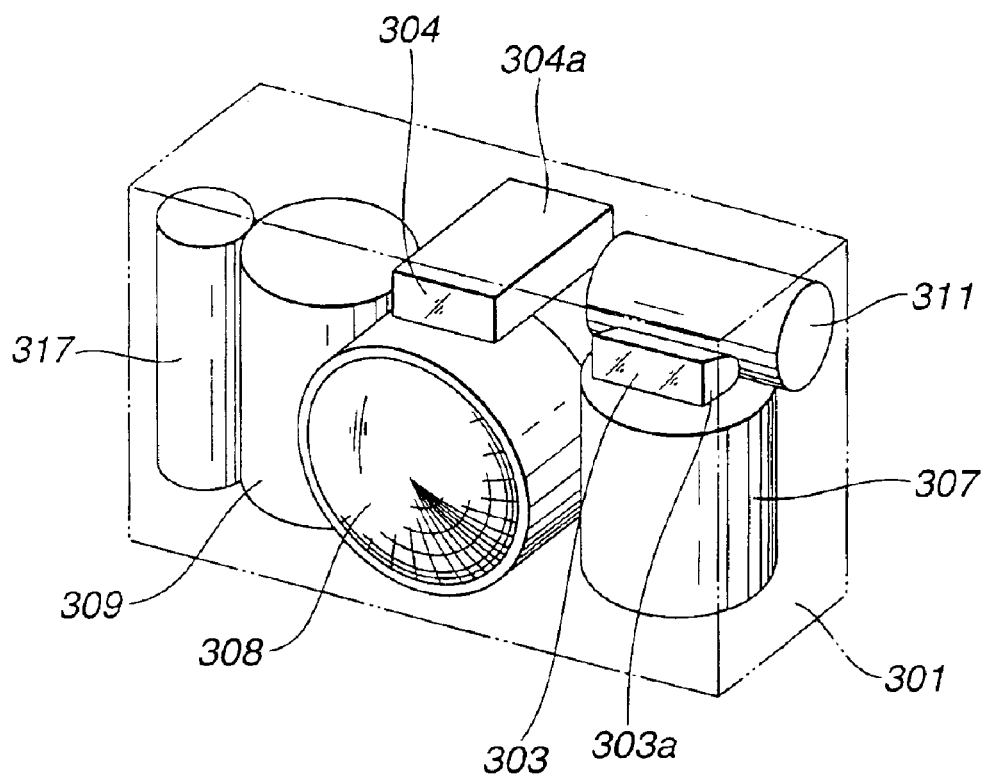
FIG. 39 is a show-through perspective diagram schematically showing an internal construction of the camera in FIG. 37.

Furthermore, as shown in FIG. 39, a finder optical system 304a is provided above the lens barrel 308. The finder optical system 304a includes a finder window 304. A strobe light emitting portion 303a is provided on the right of the finder optical system 304a and at the upper right of the front surface of the camera exterior cabinet 301. The strobe light emitting portion 303a includes the strobe light emitting window 303. Furthermore, a battery 311 is provided on the back surface of the strobe light emitting portion 303a. The battery 311 supplies power source to the entire driving device for the camera.

Figure 40:
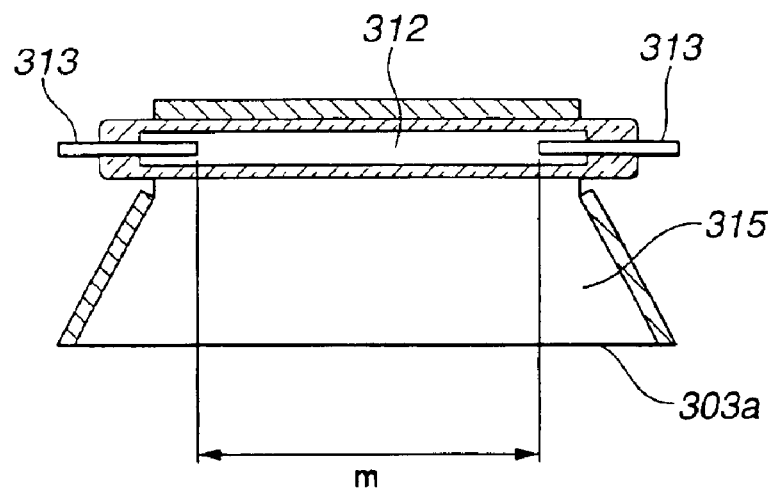
FIG. 40 is a section diagram showing a construction of a strobe light emitting portion in the camera in FIG. 37.

The strobe light emitting portion 303a includes, as shown in FIG. 40, a reflection umbrella 315, a light emission discharge tube (called Xe tube herein after) 312, an electrode tube 313 for the Xe tube, and a trigger electrode on the exterior of the Xe tube 312. The reflection umbrella 315 reflects the light emitted by the Xe tube 312 toward a predetermined irradiating range. The Xe tube 312 starts light emission in response to a control signal from a control circuit 430 (see FIG. 41), which will be mentioned later. In the sixth embodiment, the longitudinal length of the Xe tube is "m".

Figure 41:
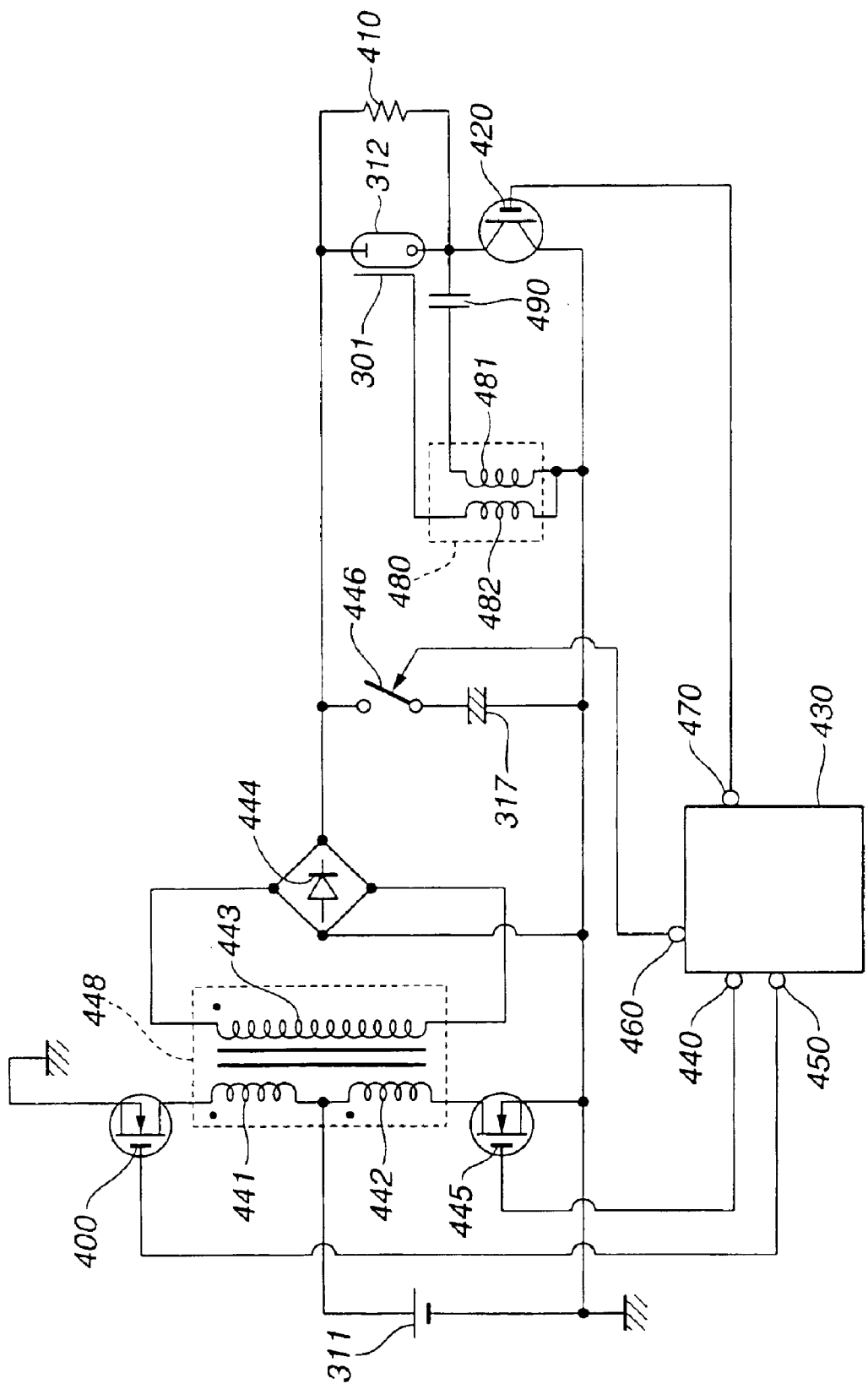
FIG. 41 is an electric circuit diagram showing a light emitting circuit of the strobe apparatus of the camera in FIG. 37.

FIG. 41 is an electric circuit diagram showing a light emitting circuit for the strobe apparatus. FIGS. 42A to 42E are time charts showing outputs of components for an operation for charging to a main capacitor of the light emitting circuit shown in FIG. 41. FIG. 43 is a flowchart describing a light emitting operation in order to emit auxiliary light for AD distance measurement by using the light emitting circuit shown in FIG. 41. FIGS. 44A to 44G are time charts showing outputs of components for a light emitting operation in FIG. 43. FIG. 45 is a flowchart describing a light emitting operation in order to emit light for red-eye reduction by using the light emitting circuit shown in FIG. 41. FIGS. 46A to 46F are time charts showing outputs of components of the light emitting operation in FIG. 45. FIGS. 47A to 47G are time charts showing outputs of components for a light emitting operation for shooting by the light emitting circuit shown in FIG. 41.

The light emitting circuit of the strobe apparatus according to the sixth embodiment has a first light emitting portion and a second light emitting portion. The first light emitting portion causes the Xe tube 312 to emit light by using charges (energy) stored in a main capacitor 317, which will be described later. The second light emitting portion supplies power of the power source battery 311 from an oscillation transformer 448, which will be described later, directly to the Xe tube 312 for emitting light. The light emitting circuit has, as shown in FIG. 41, the power source battery 311, a control circuit 430, switching elements 400 and 445 for charging, the oscillation transformer 448, a bridge diode 444, a relay switch 446 for light-emission switching, a resistance 410, a light-emission switching element 420, a trigger capacitor 490, a trigger coil 480, a strobe main capacitor 317, and the Xe tube 312. The control circuit 430 has output terminals 440, 450, 460 and 470 and functions as a control portion for light emission. The oscillation transformer 448 includes a first primary winding 441, a second primary winding 442, and a secondary winding 443. The trigger coil 480 includes a primary winding 481 and a secondary winding 482. A clear electrode (trigger electrode) 401 is coated on the surface of the Xe tube 312.

A serial connecting circuit of the first primary winding 441 of the oscillation transformer 448 and the switching element 400 for charging and a serial connecting circuit of the second primary winding 442 of the oscillation transformer 448 and the switching element 445 for charging are connected to the power source battery 311 in parallel.

The gate terminal of the switching element 400 for charging is connected to the output terminal 450 of the control circuit 430. The gate terminal of the switching element 445 is connected to the output terminal 440 of the control circuit 430. Both ends of the secondary winding 443 of the oscillation transformer 448 are connected to the input end of the bridge diode 444.

A serial connecting circuit of the relay switch 446 for light-emission switching and the strobe main capacitor 317, a serial connecting circuit of the Xe tube 312 and the switching element 420 for light emission and a serial circuit of the resistance 410, the trigger capacitor 490 and the primary winding 481 of the trigger coil 480 are connected to the output terminal of the bridge diode 444 in parallel.

The control terminal of the relay switch 446 for light-emission switching is connected to the output terminal 460 of the control circuit 430. The gate terminal of the switching element 420 for light emission is connected to the output terminal 470 of the control circuit 430. Furthermore, the connecting point of the resistance 410 and the trigger capacitor 490 is connected to the connecting point of the Xe tube 312 and the switching element 420 for light emission.

Next, an operation for charging to the main capacitor of the strobe light emitting circuit having the above-described construction will be described with reference to time charts in FIGS. 41 and 42A to 42E.

When an ON signal, "H" is output from the output terminal 460 of the control circuit 430 in an initial state (FIG. 42B), the relay switch 446 for light-emission switching is closed. Thus, the charging to the main capacitor 317 can be performed.

Next, when an ON signal, "H" is output from the output terminal 450 of the control circuit 430 (FIG. 42C), current is fed from the power source battery 311 to the first primary winding 441 of the oscillation transformer 448 and the switching element 400 for charging.

When current flows through the first primary winding 441, electric energy occurs in the primary winding. The electric energy is transmitted to the secondary winding 443 of the oscillation transformer 448 because of an electromagnetic induction effect. The magnetic energy is converted to electric energy in the secondary winding 443, and current is fed to the secondary winding 443. The current is converted to direct current by the bridge diode 444 and is stored in the main capacitor 317 and the trigger capacitor 490 as charges.

When the discharging of the energy generated by the first primary winding 441 ends, the ON signal from the output terminal 450 of the control circuit 430 is turned off (FIG. 42C), and, at the same time, an ON signal is output from the output terminal 440 of the control circuit 430 (42D).

When an ON signal "H" is output from the output terminal 440, current is fed from the battery 311 to the second primary winding 442 of the oscillation transformer 448 and the switching element 445 for charging.

When current flows through the second primary winding 442, electric energy occurs in the primary winding. The electric energy is transmitted to the secondary winding 443 of the oscillation transformer 448 because of an electromagnetic induction effect. The magnetic energy is converted to electric energy in the secondary winding 443, and current is fed to the secondary winding 443. The current is stored by the bridge diode 444 in the main capacitor 317 and the trigger capacitor 490 as charges.

As described above, by alternately turning on and off the output terminals 450 and 440 of the control circuit 430 (FIGS. 42C and 42D), the switching elements 400 and 445 for charging are alternately turned on and off, and charges are stored in and are charged to the main capacitor 317 and the trigger capacitor 490. Then, when the charging voltage (V) of the main capacitor 317 reaches a predetermined voltage (Va) (FIG. 42E), the output from the control circuit 430 is terminated. After that, an OFF signal "L" is output from the output terminal 460 of the control circuit 430 (FIG. 42B), and the relay switch 446 for light-emission switching is opened. Then, the charging operation ends. The output terminal 470 of the control circuit 430 here is off during the charging period (FIG. 42A).

Next, an operation for emitting auxiliary light for AF distance measurement to be performed by using the strobe light emitting circuit according to the invention will be described in detail with reference to FIGS. 41, 43 and 44A to 44G. After the completion of the charging described with reference to FIG. 42, the first release switch is turned on (FIG. 44A) in response to the pressing of the release button 305 in FIG. 37 at a step S201 as shown in FIG. 43. Then, at a step S202, light measurement and distance measurement operations are performed, and the processing goes to a step S203.

At the step S203, it is determined whether an object has a lower intensity or not based on the results of the light measurement and distance measurement at the step S202. If the object has a lower intensity, the processing goes to a step S204. If the object does not have a lower intensity, the emission of the auxiliary light for AF distance measurement is not required. Then, the processing jumps to a step S214 and returns.

If it is determined at the step S203 that the object has a lower intensity, an ON signal is output (FIG. 44E) from the output terminal 470 by keeping the output terminal 460 of the control circuit 430 off (FIG. 44B) at a step S204. In response to the ON signal, the switching element 420 for light emission is turned on, and the processing goes to a step S205. When the switching element 420 for light emission is turned on, the charges stored in the trigger capacitor 490 are fed to the switching element 420 for light emission and the primary winding 481 of the trigger coil 480.

When current is fed to the primary winding 481 of the trigger coil 480, the current is induced to the secondary winding 482 because of an electromagnetic induction effect. The secondary winding 482 is connected to the trigger electrode 401 on the exterior of the Xe tube 312. Since the Xe tube 312 has a very high resistance value, the energy induced in the secondary winding 482 of the trigger coil 480 is converted to voltage. Thus, high voltage is applied to the trigger electrode 401 on the exterior of the Xe tube 312. When high voltage is applied to the trigger electrode of the Xe tube 312, xenon gas within the Xe tube is excited, and the insulating resistance is reduced.

At the step S205 following the step S204, the number of times of light emission is set (initially set to twice), and the processing goes to a step S206 where a distance measuring operation is started. In this distance measuring operation, an ON signal is output (FIG. 44C) from the output terminal 450 of the control circuit 430 at the next step 207. Thus, energy occurs in the first primary winding 441 of the oscillation transformer 448 as described above. Then, the energy is transmitted to the secondary winding 443, and current I-xe (FIG. 44G) is fed to the Xe tube 312 through the bridge diode 444. When current is fed to the Xe tube 312, the Xe tube 312 performs a first series of multiple times of light emission.

Figure 44:
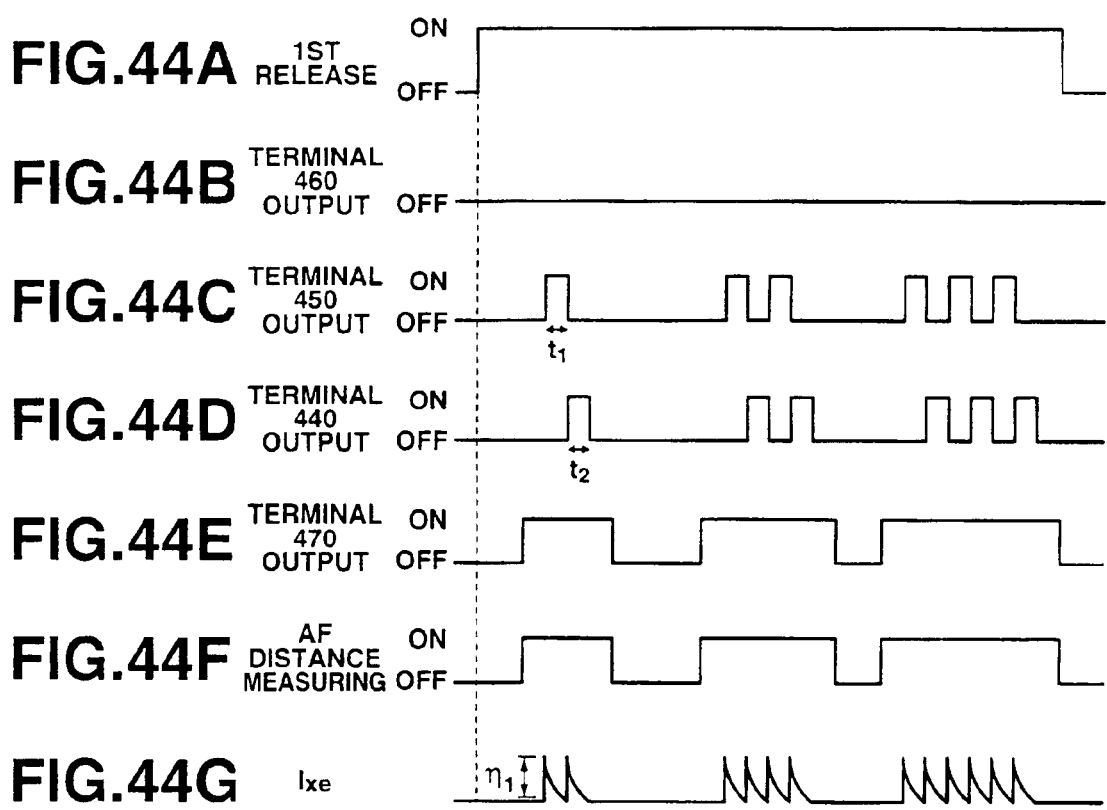
FIG. 44A is a time chart of a first release signal of a camera containing a strobe apparatus in FIG. 41.
FIG. 44B is a time chart showing an output waveform of an output terminal 460 of a control circuit in the light emitting circuit when auxiliary light for AF distance measurement is emitted by using the light emitting circuit in FIG. 41.
FIG. 44C is a time chart showing an output waveform of an output terminal 450 of a control circuit in the light emitting circuit when auxiliary light for AF distance measurement is emitted by using the light emitting circuit in FIG. 41.
FIG. 44D is a time chart showing an output waveform of an output terminal 440 of a control circuit in the light emitting circuit when auxiliary light for AF distance measurement is emitted by using the light emitting circuit in FIG. 41.
FIG. 44E is a time chart showing an output waveform of an output terminal 470 of a control circuit in the light emitting circuit when auxiliary light for AF distance measurement is emitted by using the light emitting circuit in FIG. 41.
FIG. 44F is a time chart showing a period for AF distance measurement processing when auxiliary light for AF distance measurement is emitted by using the light emitting circuit in FIG. 41.
FIG. 44G is a time chart showing light emitting current I-xe when auxiliary light for AF distance measurement is emitted by using the light emitting circuit in FIG. 41.
Figure 45:
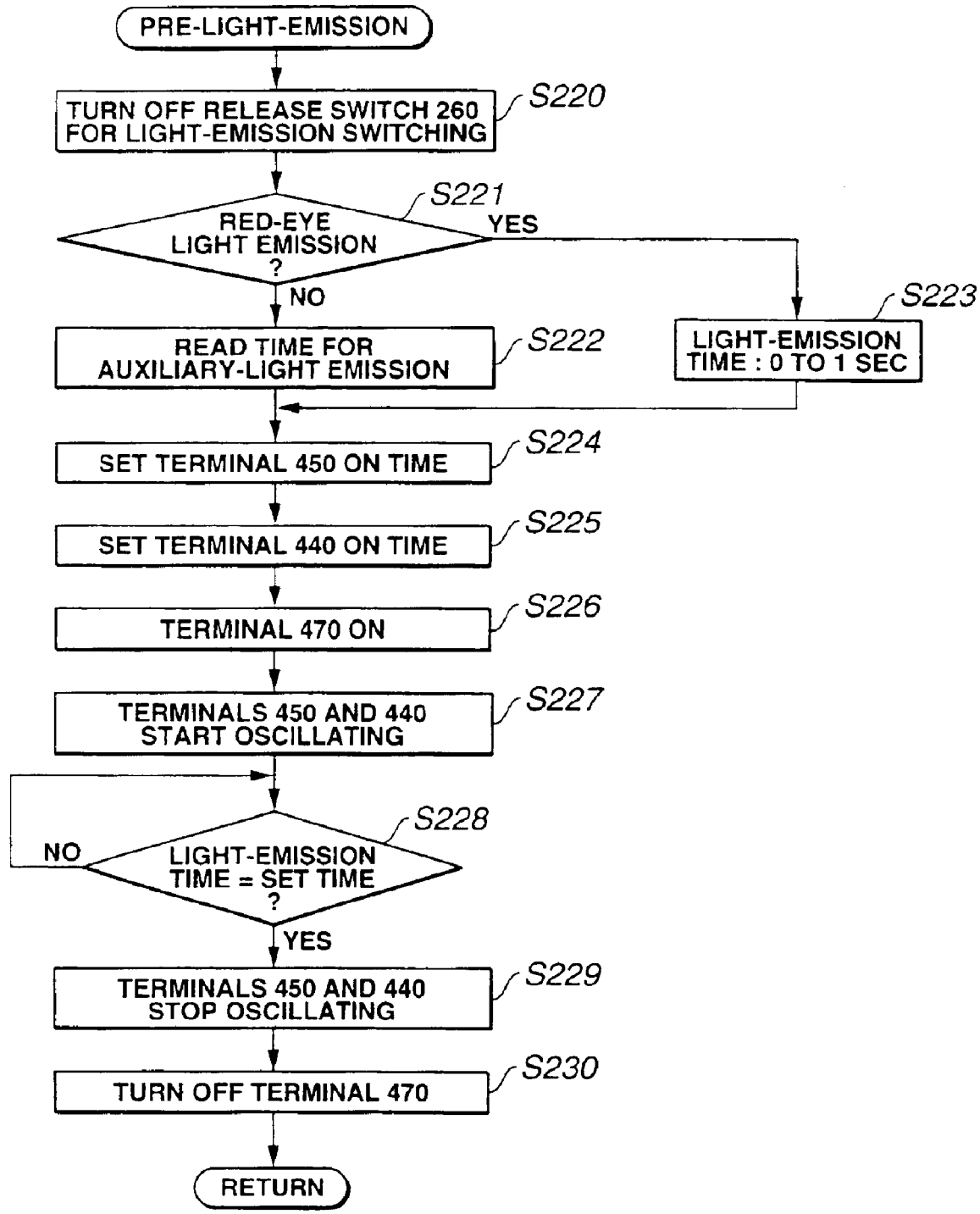
FIG. 45 is a flowchart describing a light emitting operation in order to emit red-eye reducing light by using the light emitting circuit in FIG. 41.

Here, since a small amount of energy occurs in the first primary winding 441 of the oscillation transformer 448, the time for emitting light by the Xe tube 312 is short (FIGS. 44C and 44G).

Then, when the output terminal 450 of the control circuit 430 is turned off at the next step S208, an ON signal is output from the output terminal 440 (FIGS. 44C and D). Thus, energy occurs in the second primary winding 442 of the oscillation transformer 448, and the energy is transmitted to the secondary winding 443. Then, current I-xe is fed to the Xe tube 312 through the bridge diode 444 (FIG. 44G). When current is fed to the Xe tube 312, the Xe tube 312 performs a second series of multiple times of light emission.

In this way, two series of light emission are performed for distance measurement, which is set at the step S205, and the AF distance measurement is performed (FIG. 44F). Then, the processing goes to a step S209. Here, the amount of light emitted through two series of light emission is η1.

At the step S209, it is determined whether light emission is performed the number of times set at the step S205. If not, the processing returns to the step S207. If so, the processing goes to a step S210 where the output terminals 450 and 440 of he control circuit are turned off. Then, the distance measuring operation is terminated. Furthermore, the switching element 420 for light emission is turned off, and the light emission is terminated (FIGS. 44C, 44D, 44E, 44F and 44G). Then, the processing goes to a step S211, and the computing for the distance measurement is performed. Then, the processing goes to a step S212.

At the step S212, it is determined whether or not the distance measurement has completed normally with the number of times of light emission set at the step S205. If the distance measurement has completed normally with two series of the multiple times of light emission initially set at the step S205, the processing goes to a step S214 and returns. If the distance measurement has not completed normally with two series of multiple times of light emission, the processing branches off. At a step S213, for example, the number of series of the multiple times of light emission is increased to four. Then, the processing returns to a step S206 where a distance measuring operation is performed again.

In this way, the output terminals 450 and 440 of the control circuit 430 are alternately turned on and off until the distance measurement has completed normally by increasing the number of series of multiple times of light emission, such as four, six, and eight times. Thus, the first primary winding 441 and second primary winding 442 of the oscillation transformer 448 alternately occur energy (FIGS. 44C and 44D). Then, current I-xe is fed to the Xe tube 312 the increased number of series of multiple times of light emission (FIG. 44G), and the operation for emitting light is repeated at the steps S 206 to S212. At the step S212, if it is determined that the distance measurement has completed normally from the increased number of series of multiple times of light emission, the processing goes to a step S214 and returns.

The output terminal 460 is kept off during the operation for emitting auxiliary light for distance measurement (FIG. 44B).

Next, a pre-light-emitting operation for red-eye reduction by using the strobe light emitting circuit will be described in detail with reference to FIGS. 41, 45 and 46A to 46F.

Figure 42:
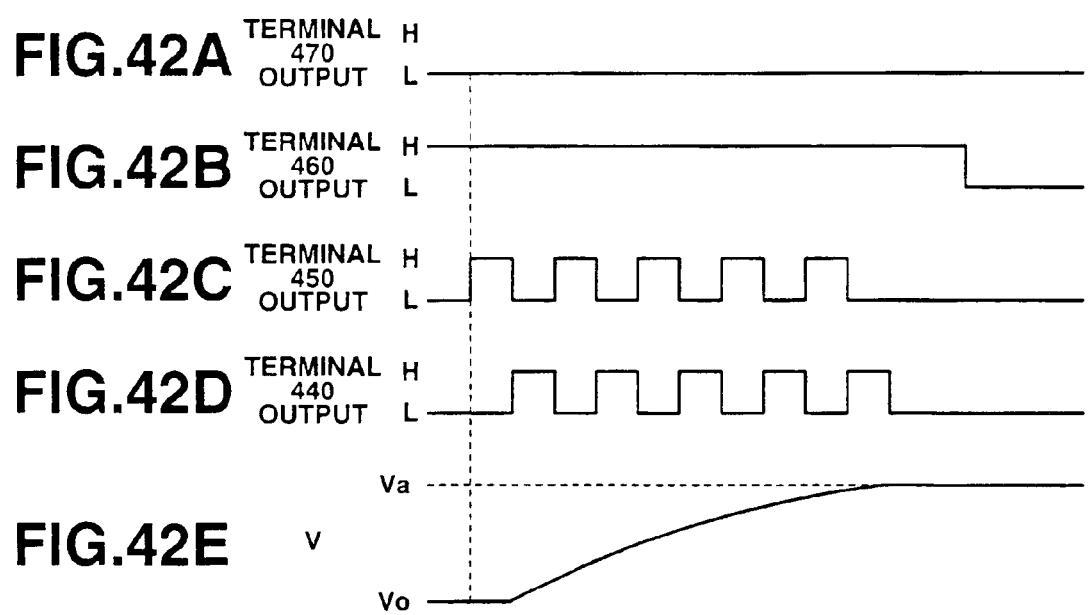
FIG. 42A is a time chart showing an output waveform of an output terminal 470 of a control circuit in charging to a main capacitor in the light emitting circuit in FIG. 41.
FIG. 42B is a time chart showing an output waveform of an output terminal 460 of the control circuit in charging to a main capacitor in the light emitting circuit in FIG. 41.
FIG. 42C is a time chart showing an output waveform of an output terminal 450 of the control circuit in charging to a main capacitor in the light emitting circuit in FIG. 41.
FIG. 42D is a time chart showing an output waveform of an output terminal 440 of the control circuit in charging to a main capacitor in the light emitting circuit in FIG. 41.
FIG. 42E is a time chart showing an output waveform of charging voltage V of the control circuit in charging to a main capacitor in the light emitting circuit in FIG. 41.
Figure 43:
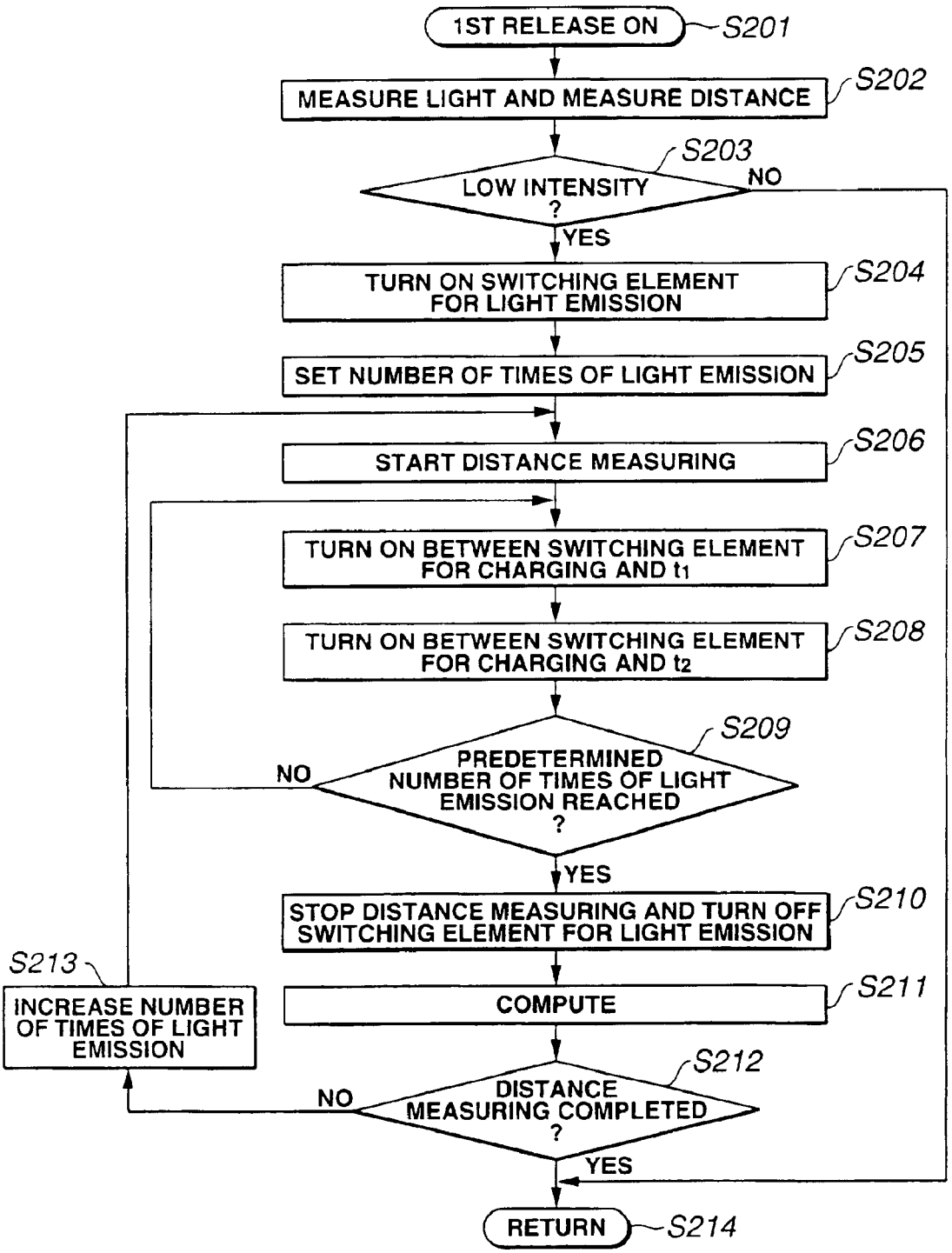
FIG. 43 is a flowchart describing a light emitting operation when auxiliary light for AF distance measurement is emitted by using the light emitting circuit in FIG. 41.

After the completion of the charging as described in FIG. 42, the output terminal 460 is turned off (FIG. 46A) at a step S220 as shown in FIG. 45. Then, the relay switch 446 for light emission switching is turned off. Then, the processing goes to a step S221 where it is determined whether the light emission is pre-light-emission for red eye reduction or not.

If it is determined at the step S221 that it is not pre-light-emission for red eye reduction, the processing goes to a step S222. At the step S222, a time for emitting AF auxiliary light for the same distance measurement as the operation described with reference to FIGS. 43 and 44A to 44G is read. Then, the processing goes to a step S224. In the routine as described in the flowchart in FIG. 43, the number of times for emitting AF auxiliary light is used for control. On the other hand, in the routine as described in the flowchart in FIG. 45, the light emitting time is used for control.

On the other hand, if it is the pre-light-emission for red-eye reduction, the processing branches off. Then, at a step S223, the time for emitting light is set to zero to one second, and the processing goes to a step S224.

At the step S224, the output terminal 450 of the control circuit 430 is set to be turned on for the light emitting time set at the step S222 or S223, and the processing goes to a step S225. At the step S225, the output terminal 440 of the control circuit 430 is set to be turned on for the light emitting time set at the step S222 or S223, and the processing goes to a step S226.

At the step S226, an ON signal is output from the output terminal 470 (FIG. 46D) by keeping the output terminal 460 of the control circuit 430 off (FIG. 46A). The switching element 420 for light emission is turned on in response to the ON signal, and charges stored in the trigger capacitor 490 are fed to the switching element 420 and the primary winding 481 of the trigger coil 480.

When current is fed to the primary winding 481 of the trigger coil 480, electric energy occurs in the primary winding 481. The electric energy is transmitted to the secondary winding 482 because of an electromagnetic induction effect, and current is fed to the secondary winding 482. The secondary winding 482 is connected to the trigger electrode 401 on the exterior of the Xe tube 312, and the Xe tube 312 has a very high resistance value. Therefore, the electric energy having been transmitted to the secondary winding 482 of the trigger coil 480 is converted to voltage, and high voltage is applied to the trigger electrode 401 of the Xe tube 312. When high voltage is applied to the trigger electrode 401 of the Xe tube 312, xenon gas within the Xe tube is excited. As a result, the insulating resistance is reduced.

At the next step S227, ON signals are alternately output from the output terminals 450 and 440 of the control circuit 430 for the time set at the steps S224 and S225 (FIGS. 46B and 46C). Then, as described above, energy occurs in the first primary winding 441 of the oscillation transformer 448. Thus, energy is induced in the secondary winding 443, and current I-xe is fed to the Xe tube 312 through the bridge diode 444 (FIG. 46E). When current is fed to the Xe tube 312, the Xe tube 312 performs pre-light-emission multiple times for red-eye reduction. Here, an amount of the emitted light is ρ2.

In this way, the pre-light-emission for red-eye reduction is performed for a time set at the step S223, and the processing then goes to a step S228.

At the step S228, it is determined whether the light emitting time set at the step S223 has passed or not. If not, the light emission is performed until the light emitting time has passed. If so, the processing goes to a step S229 where the output terminals 450 and 440 of the control circuit are turned off (FIGS. 46B and 46C), and the oscillation is terminated. At a step S230, the output terminal 470 of the control circuit 430 is turned off (FIG. 46D), and the switching element 420 for light emission is turned off. Then, the light emission is terminated (FIG. 46E), and the processing then returns.

After that, the relay switch 446 for switching light emission is turned on, and the actual light emission is performed while the focal plane shutter is open (FIG. 46F).

Next, an operation for the actual light emission will be described with reference to time charts in FIGS. 41 and 47. In this case, the operation is for emitting a large amount of light by using the main capacitor of the strobe light emitting circuit.

After the completion of the charging as described with reference to FIG. 42, a release signal is input to a CPU, not shown, (FIG. 47A) through a manipulation for pressing the release button 5 in FIG. 37. Then, an ON signal is output from the output terminal 460 of the control circuit 430 (FIG. 47B), and the relay switch 446 for switching light emission is turned on. Thus, the main capacitor 317 and the Xe tube 312 can be conducted.

When an ON signal is output from the output terminal 470 under this condition (FIG. 47E), the switching element 420 for light emission is turned on in response to the ON signal. Then, charges stored in the trigger capacitor 490 are fed to the switching element 420 for light emission and the primary winding 481 of the trigger coil 480.

When current is fed to the primary winding 481 of the trigger coil 480, electric energy of the primary winding 481 is transmitted to the secondary winding 482 of the trigger coil 480. Then, the secondary winding 482 is connected to the trigger electrode 401 on the exterior of the Xe tube 312, and the Xe tube 312 has a very high resistance value. Therefore, the electric energy having been transmitted to the secondary winding 482 of the trigger coil 480 is converted to voltage. As a result, high voltage is applied to the trigger electrode 401 on the exterior of the Xe tube 312.

When high voltage is applied to the trigger electrode 401 on the exterior of the Xe tube 312, xenon gas within the Xe tube is excited, and the insulating resistance is reduced. Then, charges stored in the main capacitor 317 fed to the Xe tube 312 through the switching element 420 for light emission as current I-xe (FIG. 47F). When current is fed to the Xe tube 312, the Xe tube 312 emits light.

In this way, a large amount of light can be emitted from the Xe tube 312 from the time when the focal plane shutter is opened until the focal place shutter is shut-off (FIG. 47G).

In the emission of a large amount of light, charges having been stored in the main capacitor 317 are discharged. Thus, the amount η' of light (where η' is the large amount of light to be emitted) is much larger than the amounts η1 and η2 of light (FIGS. 44G and 46E) for pre-light-emission by using the power source battery 311 and oscillation transformer 448.

When the actual light emission has been performed for a predetermined period of time, the output terminal 470 of the control circuit 430 is turned off. Thus, the light emission is terminated (FIG. 47E). The output terminals 450 and 440 of the control circuit 430 are kept off during the light emission (FIGS. 47C and 47D).

As described above, in the strobe apparatus according to the sixth embodiment of the invention, output voltage of the oscillation transformer for stepping up the voltage of the power source battery 311 without using the main capacitor 317 is used in order to emit auxiliary light for AF distance measurement or light for red-eye reduction by switching on/off the relay switch 446 for switching light emission. For performing actual light emission in shooting, the main capacitor 317 may be selected to use. Thus, even after the emission of the auxiliary light for AF or light for red-eye reduction is performed before the actual light emission, the charges in the main capacitor do not decrease. Thus, a large amount of light can be emitted, and the time required for the AF measurement operation can be reduced.

Figure 48:
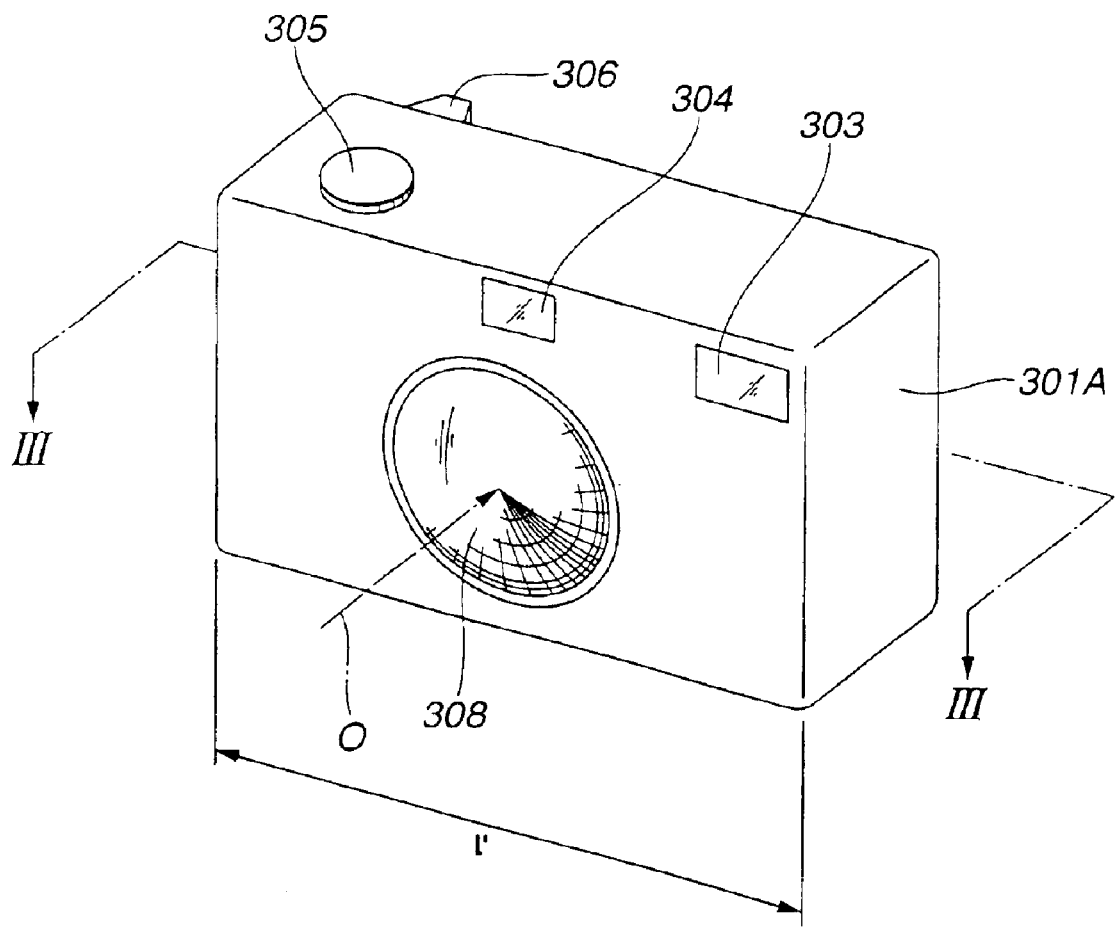
FIG. 48 is an exterior perspective diagram of a camera having a strobe apparatus according to a seventh embodiment of the invention, which is diagonally viewed from the upper right.
Figure 49:
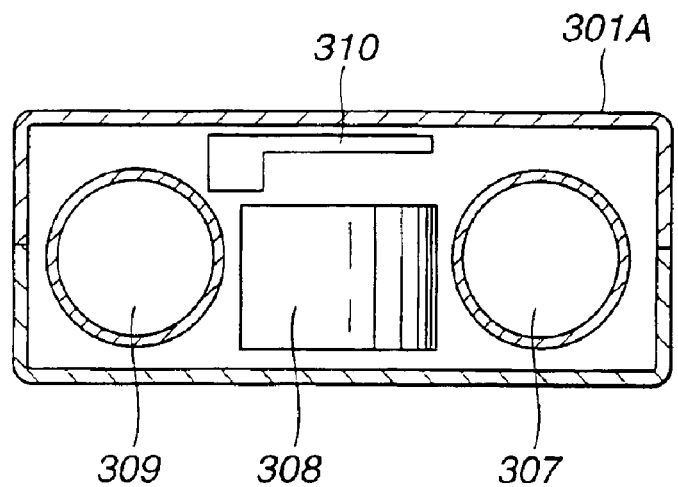
FIG. 49 is a section diagram taken at the line III—III in FIG. 48.
Figure 50:
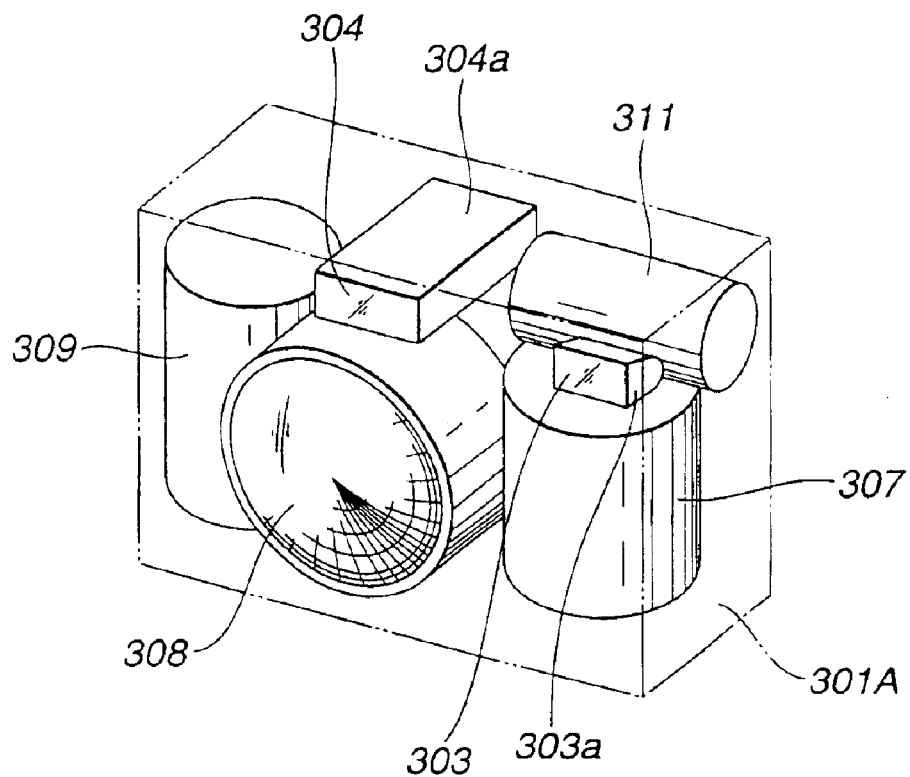
FIG. 50 is a show-through perspective diagram schematically showing an internal construction of the camera in FIG. 48.

FIG. 48 is an exterior perspective diagram of a camera having a strobe apparatus according to a seventh embodiment of the invention, which is viewed diagonally from the upper right side. FIG. 49 is a section diagram taken at the line III—III in FIG. 48. FIG. 50 is a show-through perspective diagram schematically showing an internal construction of the camera shown in FIG. 48.

In the camera according to the seventh embodiment, the camera external cabinet and the internal construction of the camera are schematically and substantially the same as those of the camera according to the sixth embodiment shown in FIG. 37 to 40. The seventh embodiment is different from the sixth embodiment in that the main capacitor for strobe is removed from the construction within the camera exterior cabinet and a strobe circuit for directly supplying energy to be supplied to an Xe tube from an oscillation transformer for stepping up voltage of a power source battery. Therefore, only the differences will be described. The same reference numerals are given to the same components as those of the sixth embodiment, and the description will be omitted.

As shown in FIG. 48, by removing the main capacitor for strobe from the construction within the camera exterior cabinet 301, the longitudinal length of the camera exterior cabinet 301 is "l" and is shorter than the longitudinal length "l" of the camera exterior cabinet 301 according to the sixth embodiment. Therefore, the size of the camera exterior cabinet can be reduced.

Figure 51:
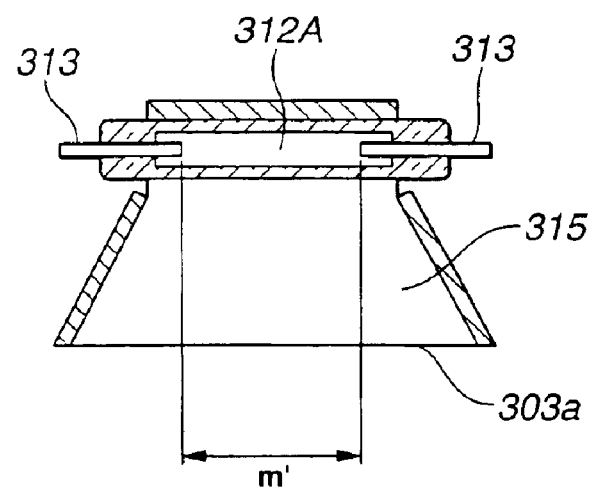
FIG. 51 is a section diagram showing a construction of a strobe light emitting portion in the camera in FIG. 48.

FIG. 51 is a section diagram showing a construction of a strobe light emitting portion 303a in FIG. 50. When the main capacitor for strobe is removed therefrom, the longitudinal length of the Xe tube 312A is determined as "m" in accordance with the amount of emitted light and is shorter than the longitudinal length "m" of the Xe tube 312 shown in FIG. 39. Thus, the longitudinal length of the strobe light emitting portion 303a is reduced.

Figure 52:
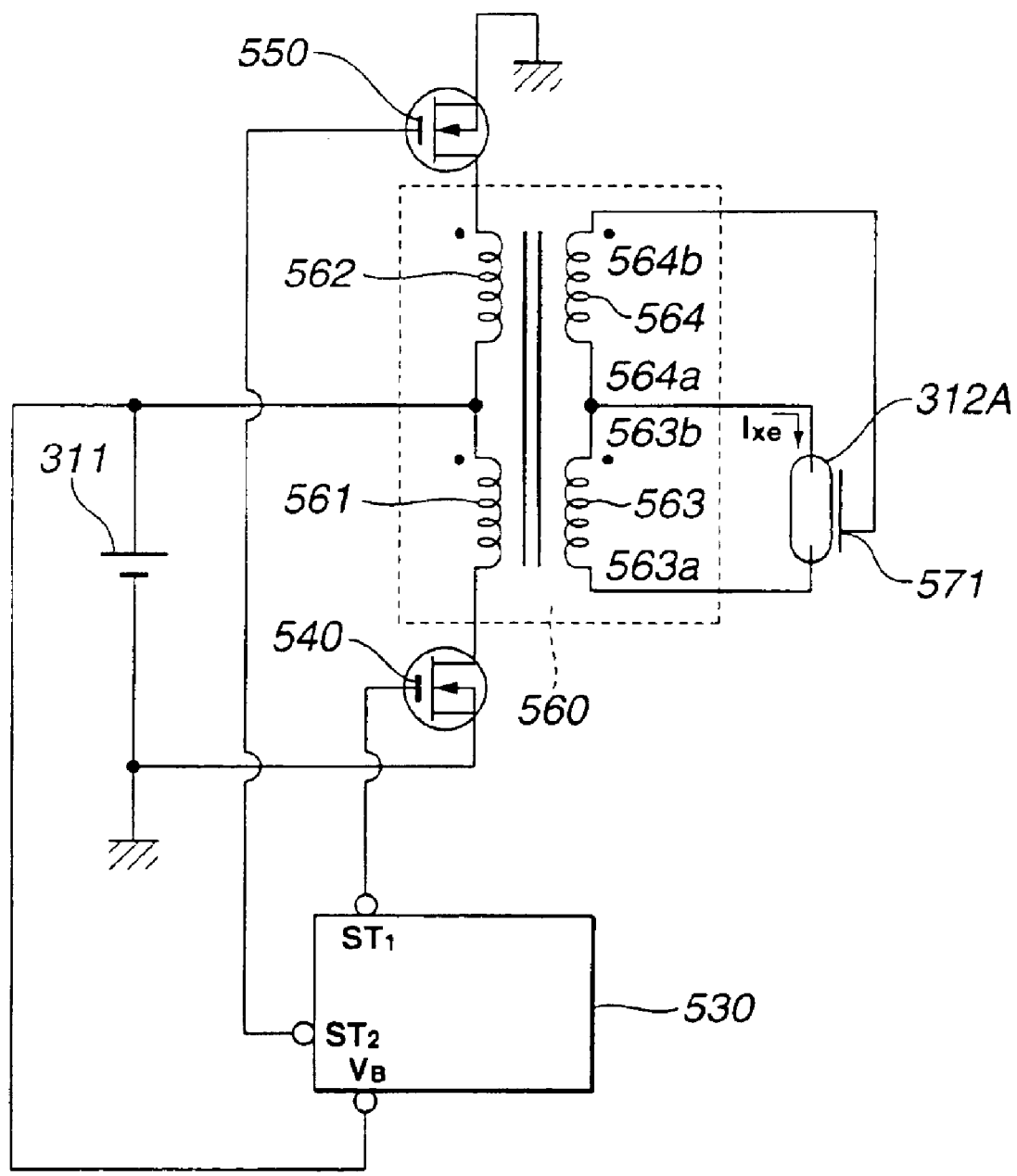
FIG. 52 is an electric circuit diagram showing a light emitting circuit of the strobe apparatus of the camera in FIG. 48.

FIG. 52 is an electric circuit diagram showing a light emitting circuit for a strobe apparatus according to the seventh embodiment of the invention. FIGS. 53A to 53F are time charts of operations of components of the light emitting circuit, which is described for a light emitting operation for emitting auxiliary light for AF distance measurement or light for red-eye reduction by using the light emitting circuit shown in FIG. 52.

As shown in FIG. 52, the light emitting circuit includes a control circuit 530, switching elements 540 and 550 having an FET, an oscillation transformer 560, and the Xe tube 312A. The control circuit 530 has a power source battery 311, an ST1 terminal and ST2 terminal for outputs for switching, and a VB measuring terminal for power source voltage and functions as a control portion for light emission. The oscillation transformer 560 includes a first primary winding 561, a second primary winding 562, a first secondary winding 563, a second secondary winding 564. The number of times of winding in the first secondary winding 563 is more than the number of winds of the primary windings 561 and 562. The number of times of winding in the second secondary winding 564 is more than the numbers of winds of the primary windings 561 and 562 and the number of winding of the first secondary winding 563 and functions as a trigger coil. For easier light emission, a transparent electrode (trigger electrode) 571 is coated on the surface of the Xe tube 312A.

A serial connecting circuit of the first primary winding 561 and the switching element 540 and a serial connecting circuit of the second primary winding 562 and the switching element 550 are connected to the power source battery 311 in parallel.

The Xe tube 312A containing Xe gas is connected to both ends of the first-secondary winding 563 in parallel. Furthermore, the output terminal of the second secondary winding 564 is connected to the trigger electrode 571 on the exterior of the Xe tube 312A.

The ST1 output terminal of the control circuit 530 is connected to the gate terminal of the switching element 540 while the ST2 output terminal is connected to the gate terminal of the switching element 550.

Next, an operation for emitting auxiliary light for AF distance measurement and light for red-eye reduction by the strobe light emitting circuit having the above-described construction will be described with reference to the time charts in FIGS. 53A to 53F.

First of all, when a release signal is input to a CPU, not shown, in response to a manipulation for pressing the release button 305 in FIG. 48, the camera enters into the shooting mode (FIG. 53A). Then, an ON signal "H" (HIGH) is output from the ST1 output terminal of the control circuit 530 shown in FIG. 52 (FIG. 53B), the switching element 540 is brought into conduction. Then, current from the power source battery 311 is fed to the switching element 540 through the first primary winding 561.

When current is fed to the primary winding of the transformer 560, electric energy occurs in the primary winding. Then, the electric energy is transmitted to the secondary winding 563 because of an electromagnetic induction effect.

The magnetic energy having been transmitted to the secondary winding 563 is converted to electric energy, and current is fed from the secondary winding 563 to the second secondary winding 564. Here, the voltage of the lower end 563a (in FIG. 52) of the first secondary winding 563 is the lowest while the upper end 564b (in FIG. 52) of the second secondary winding 564 is the highest. Under this condition, current is not fed to the Xe tube 312A. Thus, the resistance value becomes infinite, and the output side of the secondary winding 563 has a high impedance.

Furthermore, under this condition, electric energy occurs in the secondary winding side in the opposite direction of the current having been fed to the primary winding 561. Then, the electric energy is converted to voltage. Therefore, high voltage occurs in the upper end 563b (in FIG. 52) of the first secondary winding. Furthermore, higher voltage than the voltage occurring in the upper end 563b of the first secondary winding occurs in the upper end 564b (in FIG. 52) of the second secondary winding. Therefore, high voltage is applied to the trigger electrode 571 on the exterior of the Xe tube 312A, and the Xe tube 312A is excited (FIG. 53D).

Here, since Xe tube 312A is not excited only through the switching element 540, an OFF signal "L" (LOW) is output (FIG. 53B) from the ST1 output terminal. At the same time an ON signal "H" is output to the ST2 output terminal (FIG. 53C). Then, the current flowing through the switching element 540 and first primary winding 561 is turned off. Then, the switching element 550 is brought into conduction. Therefore, current from the battery 311 is fed to the switching element 550 through the second primary winding 562.

When current is fed to the primary winding 562, electric energy occurs in the primary winding. The electric energy is transmitted to the secondary winding 564 because of an electromagnetic induction effect.

The magnetic energy having been transmitted to the secondary winding 564 is converted to electric energy, and current is fed from the secondary winding 564 to the first secondary winding 563. Here, the current flows through the second primary winding 562 in the direction opposite to the direction of current being fed to the first primary winding 561. Therefore, the energy occurs in the secondary windings 563 and 564 in the direction opposite to the energy caused when the ON signal is output from the ST1 output terminal. Then, high voltage having the sign opposite to the energy caused when the ON signal is output from the ST1 output terminal is applied to the trigger electrode 571 on the exterior of the Xe tube 312A (FIG. 53D).

In this way, by outputting an ON signal "H" alternately from the ST1 and ST2 output terminals of the control circuit 530 an arbitrary number of times (FIGS. 53B and 53C), Xe gas in the Xe tube 312A is excited. Then, the resistance value decreases. When the resistance value decreases, the resistance values of both ends of the first secondary winding 563 decrease. Thus, current I-xe (FIG. 53E) is attempted to feed to the Xe tube 312A. In this way, since the ST1 and ST2 output terminals of the control circuit 530 repeatedly and alternately output ON and OFF signals, the direction of the current I-xe flowing through the Xe tube 312A is inverted every output of the ON/OFF signal from the output terminals (FIG. 53E).

As the resistance value of the Xe tube 312A decreases, the current I-xe is fed from both ends of the first secondary winding 563, and the Xe tube 312A emits light. When the Xe tube 312A emits light, the impedance in the secondary winding side of the transformer 560 decreases. Therefore, a rapidly increased amount of current is fed to the primary winding side of the transformer 560. Therefore, when current in the primary winding increases, the voltage of the power source battery 311 changes. The VB measuring terminal of the control circuit 530 monitors the voltage and checks the light emission (FIG. 53G). Then, the output cycles of the ON/OFF signals of the ST1 and ST2 output terminals are gradually changed in accordance with the voltage of the battery 311 (FIGS. 53B and 53C).

The strobe light emitting circuit is controlled in this way so that AF auxiliary light for distance measurement and/or red-eye reducing light can be used before shooting. When the light emission by the Xe tube 312A is started and when a light emission stopping signal is sent from a control device, not shown, to the control circuit 530, both of the ST1 and ST2 output terminals of the control circuit 530 are turned off (FIGS. 53B and 53C). Then, the light emission is terminated (FIG. 53E).

According to the seventh embodiment, the auxiliary light for AF distance measurement is emitted once. However, the number of times of emission is not limited thereto. Like the sixth embodiment, the light emission can be repeated any number of times until the AF distance measurement succeeds.

According to the seventh embodiment, the light emission form is flat light emission in which a small amount of light can be continuously emitted multiple number of times for a predetermined period of time in second. Therefore, in the case of a camera using a focal plane shutter, the light emission can be used as strobe light in the strobe shooting mode at a shutter time period in second, which is faster than the flash synchronization.

As described above, in a strobe apparatus for a camera according to the seventh embodiment of the invention, a capacitor is not used for the light emission in a Xe tube. Therefore, the size of the camera external cabinet can be reduced, and the costs can be also reduced.

Furthermore, a strobe apparatus can be provided which can emit light directly from a battery without a main capacitor.

As described above, according to the sixth or seventh embodiment, a strobe apparatus for a camera can be provided. In the strobe apparatus, a light-emission source to be supplied to a discharge tube is selected such that the amount of light to be used in the actual light emission for shooting is not reduced even after the emission of auxiliary light for AF distance measurement and/or light for red-eye reduction. Furthermore, the time required for AF distance measurement can be reduced.

Figure 54:
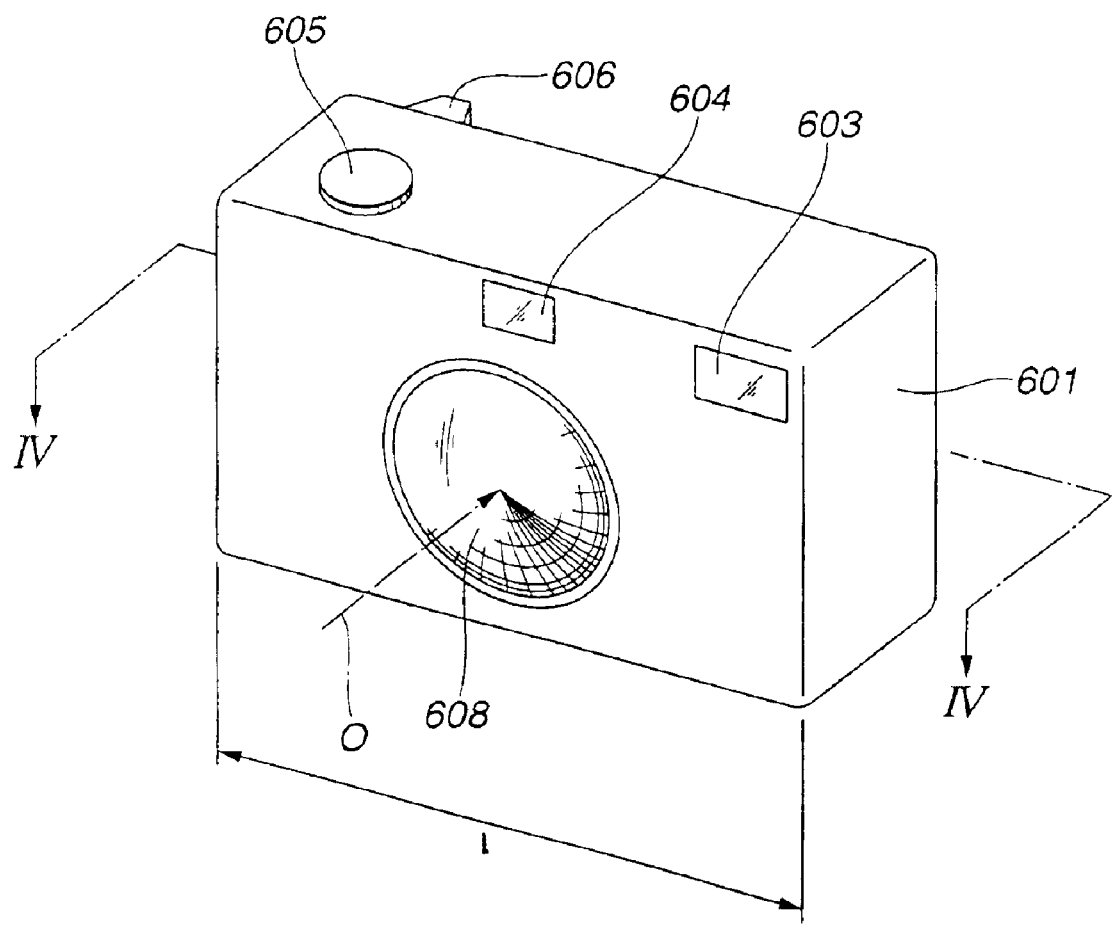
FIG. 54 is an exterior perspective diagram of a camera having a strobe apparatus according to an eighth embodiment of the invention, which is diagonally viewed from the upper right.
Figure 55:
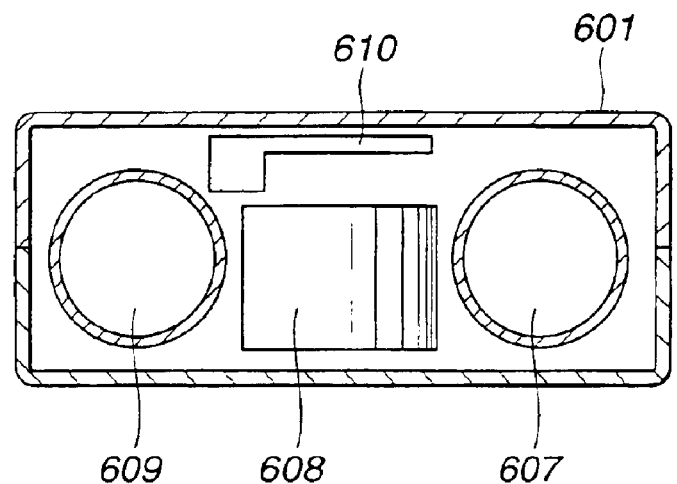
FIG. 55 is a section diagram taken at the line IV—IV in FIG. 54.
Figure 56:
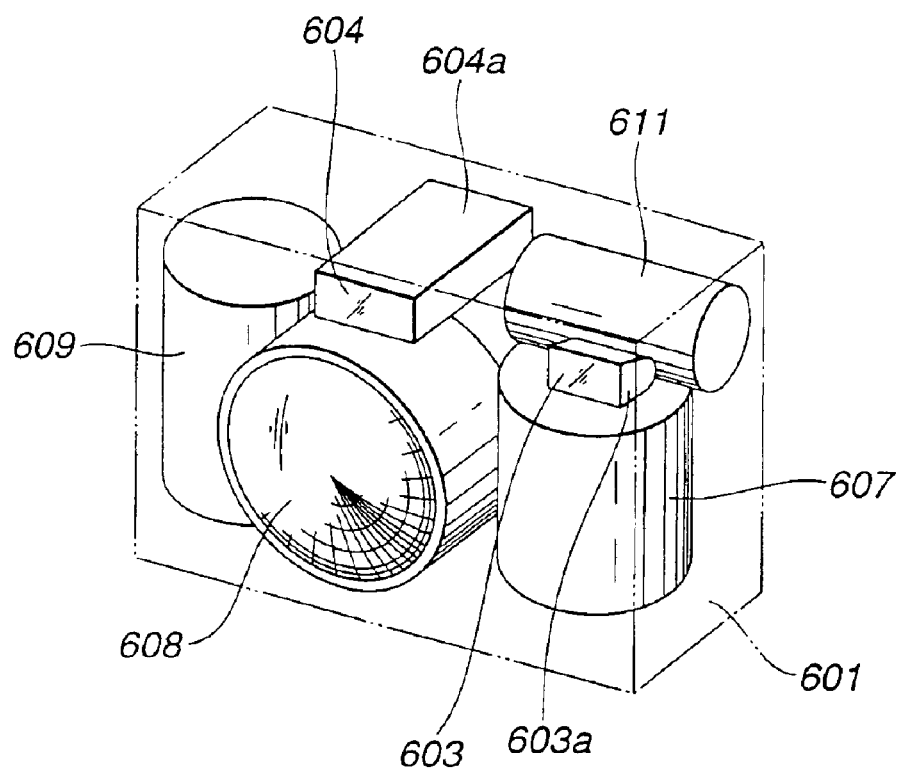
FIG. 56 is a show-through perspective diagram schematically showing an internal construction of the camera in FIG. 54.

FIG. 54 is an external perspective diagram of a camera having a strobe apparatus according to an eighth embodiment of the invention, which is diagonally viewed from the upper right. FIG. 55 is a section diagram taken at the line IV—IV in FIG. 54. FIG. 56 is a show-through perspective diagram schematically showing the internal construction of the camera in FIG. 54.

According to the eighth embodiment, a strobe apparatus for a camera is provided which can emit strobe light in shooting only by using a battery installed in the camera without any capacitor when the exposure time in second is shorter than the flash synchronization time in second of a focal place shutter.

As shown in FIG. 54, a lens barrel 608 having a shooting optical system for shooting an object is provided at the center of the front of the external cabinet 601 forming the camera body. A finder window 604 is provided thereabove for optically observing an object. Furthermore, a strobe light emitting window 603 for irradiating strobe light to an object is provided at the upper right of the lens barrel 608.

A release button 605 for starting shooting is provided on the left side of the upper surface of the camera external cabinet 601. Furthermore, a zoom button 606 is provided on the left side of the back surface of the camera external cabinet 601. The zoom button 606 is used by a shooting person for driving the lens barrel 608 in shooting and for setting an arbitrary shooting magnification for shooting an object.

According to the eight embodiment, the longitudinal length of the camera exterior cabinet 601 is "l".

As shown in FIG 55, the lens barrel 608 is provided movably in an optical axis direction 0 at the center in the camera external cabinet 601. A film cassette chamber 609 is provided on the left and a film spool chamber 607 is provided on the right. Furthermore, a focal plane shutter 610 is provided on the back surface.

Furthermore, as shown in FIG. 56, a finder optical system 604a including a finder window 604 is provided above the lens barrel 608. Furthermore, a strobe light emitting portion 603a including the strobe light emitting window 604 is provided on the right of the finder optical system 604a and at the upper right side of the front surface of the camera exterior cabinet 601. Furthermore, a battery 611 for supplying power to the entire camera driving device is provided on the back surface of the strobe light emitting portion 603a.

Figure 57:
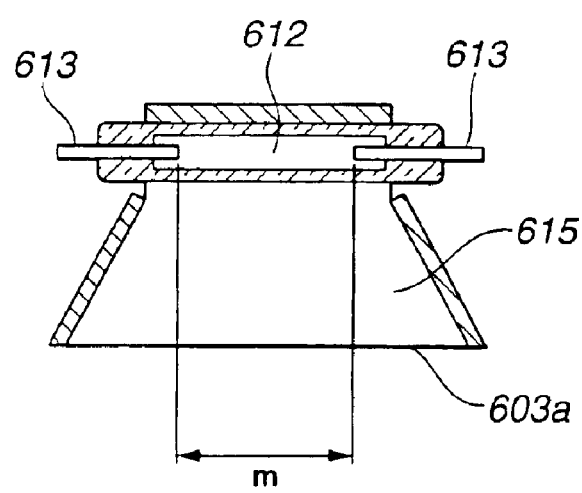
FIG. 57 is a section diagram showing a construction of a strobe light emitting portion in the camera in FIG. 56.

As shown in FIG. 57, the strobe light emitting portion 603a includes a reflection umbrella 615, a light emitting discharge tube (called Xe tube hereinafter) 612, an electrode terminal 613 of the Xe tube, and a trigger electrode on the exterior of the Xe tube 612. The reflection umbrella 615 reflects light emitted from the Xe tube 612 toward a predetermined irradiating range. The Xe tube 612 starts light emission in response to a control signal from the control circuit 630 (see FIG. 58), which will be described later.

In the eighth embodiment, the longitudinal length of the Xe tube is "m".

Figure 58:
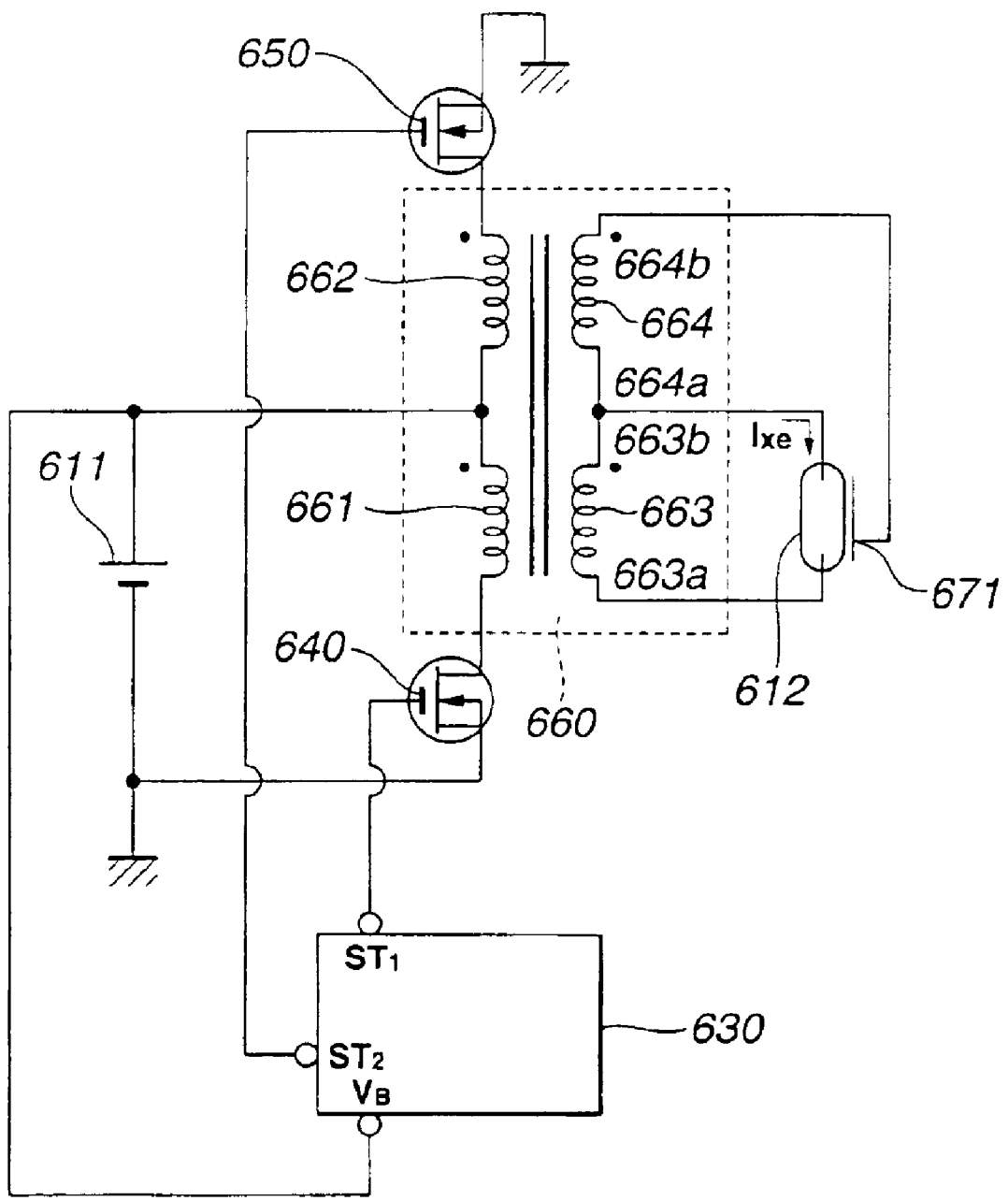
FIG. 58 is an electric circuit diagram showing a light emitting circuit of the strobe apparatus according to the eighth embodiment in FIG. 54.

FIG. 58 is an electric circuit diagram showing a light emitting circuit of strobe apparatus for a camera according to the eighth embodiment of the invention. FIGS. 59A to 59G are time charts for operations of components of the light emitting circuit shown in FIG. 58.

As shown in FIG. 58, the light emitting circuit includes a power source battery 611, a control circuit 630, switching elements 640 and 650, an oscillation transformer 660, and the Xe tube 612. The control circuit 630 has ST1 and ST2 output terminals for switching and a VB power source voltage measuring terminal and functions as a light emission control portion. The switching elements 640 and 650 include FET. The oscillation transformer 660 includes a first primary winding 661, a second primary winding 662, a first secondary winding 663, and a second secondary winding 664. The first secondary winding has more winds than those of the primary winding. The second secondary winding 664 has more winds than those of the primary windings 661 and 662 and the number of winds of the first secondary winding 663.

The second secondary winding 664 functions as a trigger coil. A transparent electrode (trigger electrode) 671 is coated on the surface of the Xe tube 612.

A serial connecting circuit of the first primary winding 661 and the switching element 640 and a serial connecting circuit of the second primary winding 662 and the switching element 650 are connected to the power source battery 611 in parallel.

The Xe tube 612 containing Xe gas is connected to both ends of the first secondary winding 663 in parallel. The output end of the second secondary winding 664 is connected to the trigger electrode 671 on the exterior of the Xe tube 612.

Furthermore, the ST1 output terminal of the control circuit 630 is connected to the gate terminal of the switching element 640. The ST2 output terminal is connected to the gate terminal of the switching element 650.

Next, a flash light emitting operation by the strobe light emitting circuit having the above-described construction will be described with reference to time charts in FIGS. 59A to 59G.

First of all, when a release signal is input to a CPU, not shown, in response to a manipulation for pressing the release button 5 in FIG. 54, the camera enters into the shooting mode (FIG. 59A). Then, an ON signal "H" (HIGH) is output from the ST1 output terminal of the control circuit 630 shown in FIG. 58 (FIG. 59B), the switching element 640 is brought into conduction. Then, current from the power source battery 611 is fed to the switching element 640 through the first primary winding 661.

When current is fed to the primary winding of the transformer 660, electric energy occurs in the primary winding. Then, the electric energy is transmitted to the secondary winding 663 because of an electromagnetic induction effect.

The magnetic energy having been transmitted to the secondary winding 663 is converted to electric energy, and current is fed from the secondary winding 663 to the second secondary winding 664. Here, the voltage of the lower end 663a of the first secondary winding 663 is the lowest while the upper end 664b of the second secondary winding 664 is the highest (FIG. 58). Under this condition, current is not fed to the Xe tube 612. Thus, the resistance value becomes infinite, and the output side of the secondary winding 663 has a high impedance.

Furthermore, under this condition, electric energy occurs in the secondary winding side in the opposite direction of the current having been fed to the primary winding 661. Then, the electric energy is converted to voltage. Therefore, high voltage occurs in the upper end 663b of the first secondary winding. Furthermore, higher voltage than the voltage occurring in the upper end 663b of the first secondary winding occurs in the upper end 664b of the second secondary winding (FIG. 58). Therefore, high voltage is applied to the trigger electrode 671 on the exterior of the Xe tube 612, and the Xe tube 612 is excited (FIG. 59D).

Here, since Xe tube 612 is not excited only through the switching element 640, an OFF signal "L" (LOW) is output (FIG. 59B) from the ST1 output terminal. At the same time an ON signal "H" is output to the ST2 output terminal (FIG. 59C). Then, the current flowing through the switching element 640 and first primary winding 661 is turned off. Then, the switching element 650 is brought into conduction. Therefore, current from the battery 611 is fed to the switching element 650 through the second primary winding 662.

When current is fed to the primary winding 662, electric energy occurs in the primary winding. The electric energy is transmitted to the secondary winding 664 because of an electromagnetic induction effect.

The magnetic energy having been transmitted to the secondary winding 664 is converted to electric energy, and current is fed from the secondary winding 664 to the second secondary winding 663. Here, the current flows through the second primary winding 662 in the direction opposite to the direction of current being fed to the first primary winding 661. Therefore, the energy occurs in the secondary windings 663 and 664 in the direction opposite to the one caused when the ON signal is output from the ST1 output terminal. Then, high voltage having the sign opposite to the one caused when the ON signal is output from the ST1 output terminal is applied to the trigger electrode 671 on the exterior of the Xe tube 612 (FIG. 59D).

In this way, by outputting an ON signal "H" alternately from the ST1 and ST2 output terminals of the control circuit 630 an arbitrary number of times (FIGS. 59B and 59C), Xe gas in the Xe tube 612 is excited. Then, the resistance value decreases. When the resistance value decreases, the resistance values of both ends of the first secondary winding 663 decrease. Thus, current I-xe (FIG. 59E) is attempted to feed to the Xe tube 612. In this way, since the ST1 and ST2 output terminals of the control circuit 630 repeatedly and alternately output ON and OFF signals, the direction of the current I-xe flowing through the Xe tube 612 is inverted every output of the ON/OFF signal from the output terminals (FIG. 59E).

As the resistance value of the Xe tube 612 decreases, the current I-xe is fed from both ends of the first secondary winding 663, and the Xe tube 612 emits light. When the Xe tube 612 emits light, the impedance in the secondary winding side of the transformer 660 decreases. Therefore, a rapidly increased amount of current is fed to the primary winding side of the transformer 660. Therefore, when current in the primary winding increases, the voltage of the power source battery 611 changes. The VB measuring terminal of the control circuit 630 monitors the voltage and checks the light emission (FIG. 59G). Then, the output cycles of the ON/OFF signals of the ST1 and ST2 output terminals are gradually changed in accordance with the voltage of the battery 611 (FIGS. 59B and 59C).

The strobe light emitting circuit is controlled in this way so that a certain amount of light can be emitted from the Xe tube 612 multiple times from immediately before the front curtain of the focal plane shutter is opened to immediately after the rear curtain is shut (FIGS. 59E and 59F). When the light emission by the Xe tube 612 is started and when a light emission stopping signal is sent from a control device, not shown, to the control circuit 630, both of the ST1 and ST2 output terminals of the control circuit 630 are turned off (FIGS. 59B and 59C). Then, the light emission is terminated (FIG. 59E).

As described above, in a strobe apparatus for a camera according to the eighth embodiment of the invention, a capacitor is not used for the light emission in an Xe tube. Therefore, the size of the camera external cabinet can be reduced, and the costs can be also reduced.

Furthermore, when the exposure time in second for shooting is shorter than the flash synchronization time in second of the focal plane shutter, the Xe tube emits light from a battery through an oscillation transformer. Therefore, flat light can be emitted to an object uniformly.

Figure 60:
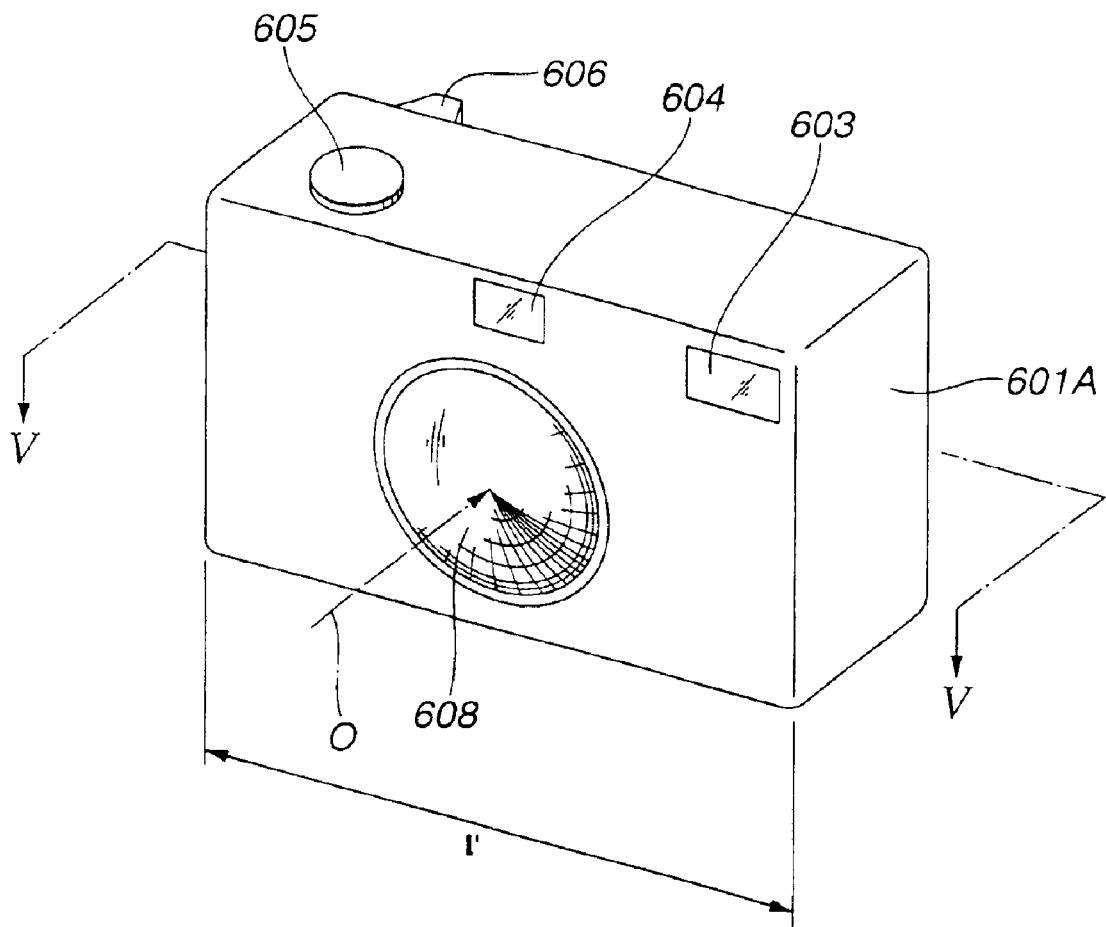
FIG. 60 is an exterior perspective diagram of a camera having a strobe apparatus according to a ninth embodiment of the invention, which is diagonally viewed from the upper right.
Figure 61:
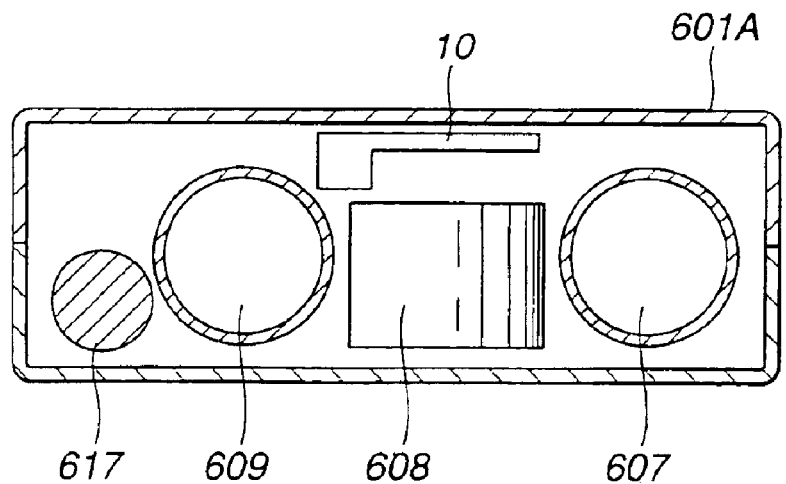
FIG. 61 is a section diagram taken at the line V—V in FIG. 60.
Figure 62:
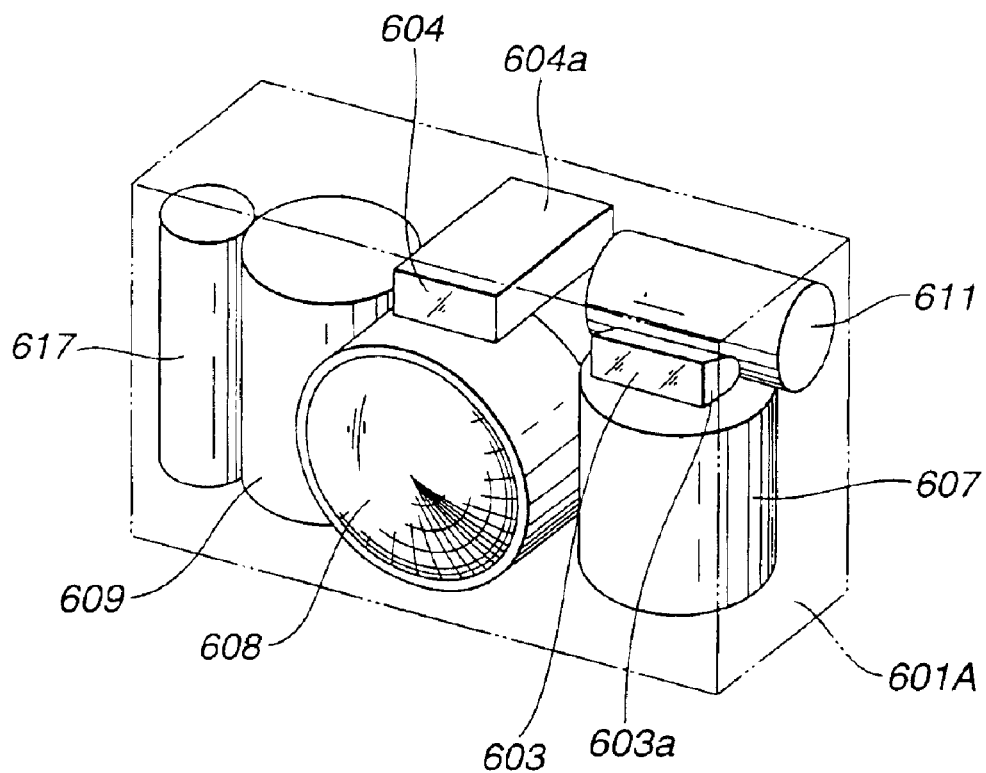
FIG. 62 is a show-through perspective diagram schematically showing an internal construction of the camera in FIG. 60.

FIG. 60 is an external perspective diagram of a camera having a strobe apparatus according to a ninth embodiment of the invention, which is diagonally viewed from the upper right. FIG. 61 is a section diagram taken at the line V—V in FIG. 60. FIG. 62 is a show-through perspective diagram schematically showing an internal construction of the camera in FIG. 60.

According to the ninth embodiment, a strobe apparatus for a camera is provided which allows the selection of a light-emission source to be supplied to a discharge tube in accordance with the shutter speed of a focal plane shutter.

In the strobe apparatus according to the ninth embodiment, the camera external cabinet and the internal construction of the camera are schematically and substantially the same as those of the camera according to the eighth embodiment shown in FIG. 54 or 55. The ninth embodiment is different from the eight embodiment in that a strobe circuit is provided, which has a main capacitor for strobe inside of the camera exterior cabinet and which allows the selection of a unit for directly supplying light emission energy to be supplied to an Xe tube from a power source battery and a unit for storing charges in a main capacitor and for supplying light emission energy to the Xe tube. Therefore, only the differences will be described. The same reference numerals are given to the same components as those of the eighth embodiment, and the description will be omitted.

As shown in FIGS. 61 and 62, a strobe main capacitor 617 is provided on the left of the cassette chamber 609 within the camera external cabinet 601A. Therefore, when the main capacitor 617 is provided within the camera external cabinet 601A in this way, the longitudinal length "l'" of the camera exterior cabinet 601A is longer than the longitudinal length "l" of the camera exterior cabinet 601A according to the eighth embodiment.

Figure 63:
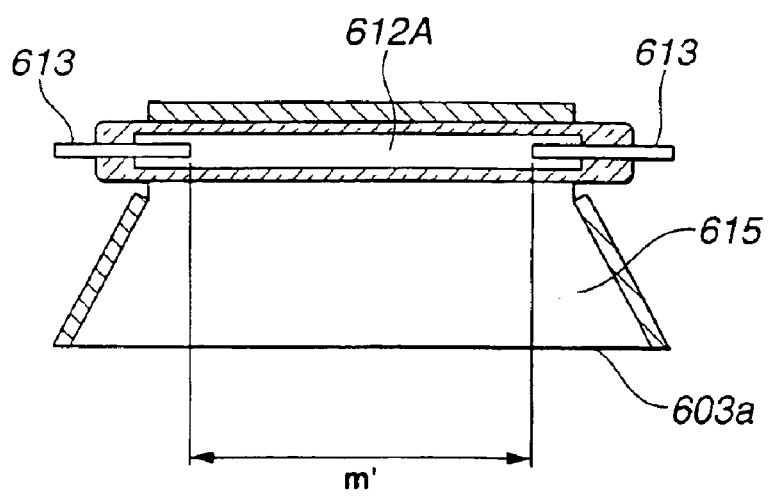
FIG. 63 is a section diagram showing a construction of a strobe light emitting portion in the camera in FIG. 62.

FIG. 63 is a section diagram showing a construction of the strobe light emitting portion 603a in FIG. 62. When the strobe main capacitor 617 is provided, a large amount of light can be irradiated. Therefore, the longitudinal length "m'" of the Xe tube 612A is longer than the longitudinal length "m" of the Xe tube 612 shown in FIG. 56. Thus, the longitudinal length of the strobe light emitting portion 603a increases.

Figure 64:
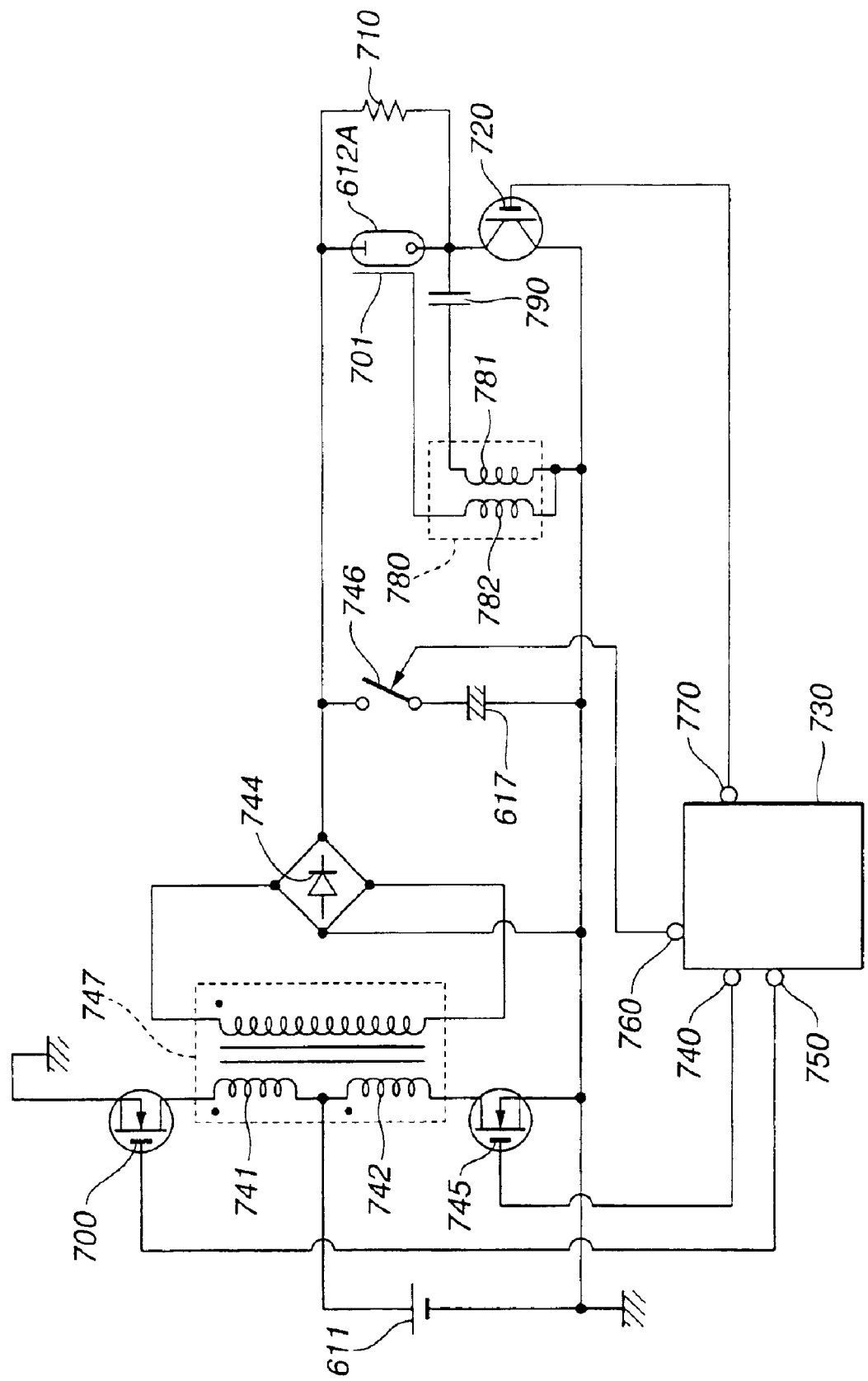
FIG. 64 is an electric circuit diagram showing a light emitting circuit of the strobe apparatus according to the ninth embodiment in FIG. 60.

FIG. 64 is an electric circuit diagram showing a light emitting circuit of the strobe apparatus for a camera according to the ninth embodiment of the invention. FIGS. 65A to 65E are time charts describing operations for charging to the main capacitor in the light emitting circuit shown in FIG. 64. FIGS. 66A to 66H are time charts describing a flat light emitting operation by the light emitting circuit shown in FIG. 64. FIGS. 67A to 67G are time charts describing a light emitting operation by the main capacitor of the light emitting circuit shown in FIG. 64.

The strobe light emitting circuit according to the ninth embodiment has a first light emitting portion and a second light emitting portion. The first light emitting portion causes the Xe tube 612A to emit light by using charges (energy) stored in the main capacitor 617, which will be described later. The second light emitting portion causes the Xe tube 612A to emit light by supplying power of the power source battery 611 directly to the Xe tube 612A from an oscillation transformer 747, which will be described later. As shown in FIG. 64, the strobe light emitting circuit includes a power source battery 611, a control circuit 730, switching elements 700 and 745 for charging, the oscillation transformer 747, a bridge diode 744, a relay switch 760 for light emission switching, a resistance 710, a switching element 720 for light emission, a trigger capacitor 790, a trigger capacitor 790, a trigger coil 780, the strobe main capacitor 617 and the Xe tube 612A. The control circuit 730 has output terminals 740, 750, 760 and 770 and functions as a light emission control portion. The oscillation transformer 747 includes a first primary winding 741, a second primary winding 742 and a secondary winding 743. The trigger coil 780 includes a primary winding 781 and a secondary winding 782. A transparent electrode (trigger electrode) 701 is coated on the surface of the Xe tube 612A for easy light emission.

A serial connecting circuit of the first primary winding 741 of the oscillation transformer 747 and the switching element 700 for charging and a serial connecting circuit of the second primary winding 742 of the oscillation transformer 747 and the switching element 745 for charging are connected to the power source battery 611 in parallel.

The gate terminal of the switching element 700 for charging is connected to the output terminal 750 of the control circuit 730. The gate terminal of the switching element 745 is connected to the output terminal 740 of the control circuit 730. Both ends of the secondary winding 743 of the oscillation transformer 747 are connected to the input end of the bridge diode 744.

A serial connecting circuit of the relay switch 746 for light-emission switching and the strobe main capacitor 617, a serial connecting circuit of the Xe tube 612A and the switching element 720 for light emission and a serial circuit of the resistance 710, the trigger capacitor 790 and the primary winding 781 of the trigger coil 780 are connected to the output terminal of the bridge diode 744 in parallel.

The control terminal of the relay switch 746 for light-emission switching is connected to the output terminal 760 of the control circuit 730. The gate terminal of the switching element 720 for light emission is connected to the output terminal 770 of the control circuit 730. Furthermore, the connecting point of the resistance 710 and the trigger capacitor 790 is connected to the connecting point of the Xe tube 612A and the switching element 720 for light emission.

Next, an operation for charging to the main capacitor of the strobe light emitting circuit having the above-described construction will be described with reference to time charts in FIGS. 64 and 65A to 65E.

When an ON signal, "H" is output from the output terminal 760 of the control circuit 730 in an initial state (FIG. 65B), the relay switch 746 for light-emission switching is closed. Thus, the charging to the main capacitor 617 can be performed.

Next, when an ON signal, "H" is output from the output terminal 750 of the control circuit 730 (FIG. 65C), current is fed from the power source battery 611 to the first primary winding 741 of the oscillation transformer 747 and the switching element 700 for charging.

When current flows through the first primary winding 741, electric energy occurs in the primary winding. The electric energy is transmitted to the secondary winding 743 of the oscillation transformer 747 because of an electromagnetic induction effect. The magnetic energy is converted to electric energy in the secondary winding 743, and current is fed to the secondary winding 743. The current is converted to direct current by the bridge diode 744 and is stored in the main capacitor 617 and the trigger capacitor 790 as charges.

When the discharging of the energy generated by the first primary winding 741 ends, the ON signal from the output terminal 750 of the control circuit 730 is turned off (see FIG. 65C), and, at the same time, an ON signal is output from the output terminal 740 of the control circuit 730 (65D).

When an ON signal "H" is output from the output terminal 740, current is fed from the battery 611 to the second primary winding 742 of the oscillation transformer 747 and the switching element 745 for charging.

When current flows through the second primary winding 742, electric energy occurs in the primary winding. The electric energy is transmitted to the secondary winding 743 of the oscillation transformer 747 because of an electromagnetic induction effect. The magnetic energy is converted to electric energy in the secondary winding 743, and current is fed to the secondary winding 743. The current is stored in the main capacitor 617 and the trigger capacitor 790 as charges by the bridge diode 744.

As described above, by alternately turning on and off the output terminals 750 and 740 of the control circuit 730 (FIGS. 65C and 65D), the switching elements 700 and 745 for charging are alternately turned on and off, and charges are stored in and are charged to the main capacitor 617 and the trigger capacitor 790. Then, when the charging voltage (V) of the main capacitor 617 reaches a predetermined voltage (Va) (see FIG. 65($e$)), the output from the control circuit 730 is terminated. After that, an OFF signal "L" is output from the output terminal 760 of the control circuit 730 (FIG. 65B), and the relay switch 746 for light-emission switching is opened. Then, the charging operation ends. The output terminal 770 of the control circuit 730 here is off during the charging period (FIG. 65A).

Next, a flat light emitting operation (light emitting operation when a small amount of light is required) in the strobe circuit according to the ninth embodiment of the invention will be described with reference to FIG. 64 and the time chart in FIG. 66.

After the completion of the charging as described with reference to FIGS. 65A to 65E, a release signal is input to a CPU, not shown, (FIG. 66A) through a manipulation for pressing the release button 605 in FIG. 60. Then, an ON signal is output from the output terminal 770 by keeping the output terminal 760 of the control circuit 730 off (FIG. 66B). The switching element 720 for light emission is turned on in response to the ON signal. Then, charges stored in the trigger capacitor 790 are fed to the switching element 720 for light emission and the primary winding 781 of the trigger coil 780.

When current is fed to the primary winding 781 of the trigger coil 780, electric energy occurs in the primary winding 781. The energy is transmitted to the secondary winding 782 of the trigger coil 780 because of an electromagnetic induction effect and is converted to voltage. Then, the secondary winding 782 is connected to the trigger electrode 701 on the exterior of the Xe tube 612A, and the Xe tube 612A has a very high resistance value. Therefore, the electric energy having been transmitted to the secondary winding 782 of the trigger coil 780 is converted to voltage. As a result, high voltage is applied to the trigger electrode 701 on the exterior of the Xe tube 612A.

When high voltage is applied to the trigger electrode 701 on the exterior of the Xe tube 612A, xenon gas within the Xe tube is excited, and the insulating resistance is reduced. Then, current can be fed thereto. When an ON signal is output (FIG. 66C) from the output terminal 750 of the control circuit 730, energy occurs in the first primary winding 741 of the oscillation transformer 747 as described above. The energy is transmitted to the secondary winding 743, and current I-xe is fed to the Xe tube 612A through the bridge diode 744 (FIG. 66F). When current is fed to the Xe tube 612A, the Xe tube 612A emits light.

Since a small amount of energy occurs in the first primary winding 741 of the oscillation transformer 747, the Xe tube 612A emits light in a short period of time (FIGS. 66C and 66F).

Then, when the output terminal 750 of the control circuit 730 is turned off, an ON signal is output from the output terminal 740 (FIGS. 66C and 66D). Thus, energy is generated in the second primary winding 742 of the oscillation transformer 747 this time, and the energy is transmitted to the secondary winding 743.

In this way, by alternately turning on and off the output terminals 750 and 740 of the control circuit 730, the first primary winding 741 and second primary winding 742 of the oscillation transformer 747 alternately and repeatedly generate energy (FIGS. 66C and 66D). Thus, current I-xe is fed to the Xe tube 612A (FIG. 66F), and a constant amount of flat light emission can be performed from the Xe tube 612A multiple times from the opening of the front curtain of the focal plane shutter to the shutting of the rear curtain (FIGS. 66G and 66H).

The flat light emission does not use charges stored in the main capacitor 617. Therefore, a small amount "η" of light is emitted here.

The flat light emission is performed for a predetermined period of time, both of the output terminals 750 and 740 of the control circuit are turned off. Then, the light emission is terminated (FIGS. 66C, 66D and 66F). The output terminal 760 is kept off during the flat light emission (FIG. 66B).

Next, an operation for emitting a large amount of light in the strobe light emitting circuit according to the ninth embodiment will be described with reference to FIG. 64 and the time charts in FIGS. 67A to 67G.

After the completion of the charging as described with reference to FIG. 65, a release signal is input to a CPU, not shown, (FIG. 67A) through a manipulation for pressing the release button 5 in FIG. 60. Then, an ON signal is output from the output terminal 760 of the control circuit 730 (FIG. 67B), and the relay switch 746 for switching light emission is turned on. Thus, the main capacitor 617 and the Xe tube 612A can be conducted.

When an ON signal is output from the output terminal 770 under this condition (FIG. 67E), the switching element 720 for light emission is turned on in response to the ON signal. Then, charges stored in the trigger capacitor 790 are fed to the switching element 720 for light emission and the primary winding 781 of the trigger coil 780.

When current is fed to the primary winding 781 of the trigger coil 780, electric energy of the primary winding 781 is transmitted to the secondary winding 782 of the trigger coil 780. Then, the secondary winding 782 is connected to the trigger electrode 701 on the exterior of the Xe tube 612A, and the Xe tube 612A has a very high resistance value. Therefore, the electric energy having been transmitted to the secondary winding 782 of the trigger coil 780 is converted to voltage. As a result, high voltage is applied to the trigger electrode 701 on the exterior of the Xe tube 612A.

When high voltage is applied to the trigger electrode 701 on the exterior of the Xe tube 612A, xenon gas within the Xe tube is excited, and the insulating resistance is reduced. Then, charges stored in the main capacitor 617 are fed to the Xe tube 612A through the switching element 720 for light emission as current I-xe (FIG. 67F). When current is fed to the Xe tube 612A, the Xe tube 612A emits light.

In this way, a large amount of light can be emitted from the Xe tube 612A from the time when the focal plane shutter is opened until the focal plane shutter is shut-off (FIG. 67G).

Since the emission of a large amount of light is performed by using charges stored in the main capacitor 617, the amount η' of emitted light is larger than the amount η (66F) of emitted light in the flat emission, and the amount of emitted light increases.

When a large amount of light is emitted for a predetermined time, the output terminal 770 of the control circuit 730 is turned off. Then, the light emission is terminated (FIGS. 67E and 67F). The output terminals 750 and 740 of the control circuit 730 are kept off during the light emission (FIGS. 67C and 67D).

In this way, in the strobe apparatus according to the ninth embodiment of the invention, by switching on/off the relay switch 746 for light emission switching, when the exposure time in second for shooting is shorter than the flash synchronization time in second of the focal plane shutter, flat light emission is performed. When the exposure time in second for shooting is equal to the flash synchronization time in second of the focal plane shutter or is longer than the flash synchronization time in second without the main capacitor 617, the actual light emission can be performed by selecting the use of the main capacitor 617. Even after the flat light emission is performed before the actual light emission, the amount of the charges in the main capacitor does not decrease. Therefore, a large amount of light can be emitted.

The flash synchronization time in second refers to an exposure time in second obtained in accordance with the installed focal plane shutter through an operation for starting the movement of the rear curtain in a shut-off direction when the front curtain reaches an open position.

According to the ninth embodiment of the invention, when the exposure time in second for shooting is shorter than the flash synchronization time in second of the focal plane shutter, flash light emission is performed without a main capacitor. However, when the exposure time in second for shooting is equal to the flash synchronization time in second or is longer than the flash synchronization time in second, the flat light emission can be apparently performed by using a main capacitor. Thus, a strobe apparatus for a camera can be provided which allows, in accordance with the shutter speed of the focal plane shutter, the selection of a light emission source to be supplied to a discharge tube.

When the shutter exposure time in second is longer than the flash synchronization time in second as described above, the charging time is not necessary when flash light emission is performed.

As described above, according to the eighth and ninth embodiments, a strobe apparatus can be provided which can perform flat light emission only by using a power source battery and without a main capacitor requiring a charging time when the exposure time in second is shorter than the flash synchronization time in second of the focal plane shutter. Therefore, the possibility for missing shutter chances can be reduced.

The present invention is not limited to the above-described embodiments, and various changes are possible without practically departing from the principle. Furthermore, the above-described embodiments include various aspects of the inventions. Various aspects of the invention can be extracted in proper combinations under the disclosed multiple construction requirements.

For example, even when several construction requirements are removed from the entire construction requirement disclosed in the embodiments, problems described in the section, Problems to be Solved by the Invention, can be solved. When the advantages described in the section, Advantages of the Invention, can be obtained, the construction without the construction requirement or requirements can be extracted as the invention.

What is claimed is:

1. A camera comprising:

a vibration detecting portion for detecting a vibration state of the camera;

a first operating member for setting a camera mode to a vibration detecting mode for operating the vibration detecting portion;

a second operating member for setting a strobe light emitting mode of the camera; and a control portion for controlling implementation and termination of operation of the vibration detecting portion in accordance with a type of the strobe light emitting mode set by the second operating member when the vibration detecting mode is set.

2. A camera according to claim 1, wherein the control portion terminates the operation of the vibration detecting portion when the vibration detecting mode is set and when the strobe light emitting mode is set to a night-view mode.

3. A camera according to claim 1, wherein the control portion operates the vibration detecting portion again without any operation of the first operation member when the camera mode is set to the vibration detecting mode and when the strobe light emitting mode is switched from a mode in which the operation of the vibration detecting portion is terminated to a mode in which the operation of the vibration detecting portion is implemented.

4. A camera according to claim 1, further comprising a warning portion for warning a user when at least a predetermined amount of vibration is detected by the vibration detecting portion.

* * * * *